US012640548B2

(12) United States Patent
Waterschoot et al.

(10) Patent No.: US 12,640,548 B2
(45) Date of Patent: May 26, 2026

(54) COLLAPSIBLE BUNDLE SPACER

(71) Applicant: PREFORMED LINE PRODUCTS CO., Mayfield Village, OH (US)

(72) Inventors: Dirk Waterschoot, Sint Niklaas (BE); Benjamin Franklin Ciesielczyk, Madison, OH (US); Cameron Clines, Chagrin Falls, OH (US); Douglas Bell, Mayfield Heights, OH (US); Derek Lenardos, Mayfield Village, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 236 days.

(21) Appl. No.: 18/562,044

(22) PCT Filed: May 17, 2022

(86) PCT No.: PCT/US2022/029595
§ 371 (c)(1),
(2) Date: Nov. 17, 2023

(87) PCT Pub. No.: WO2022/245799
PCT Pub. Date: Nov. 24, 2022

(65) Prior Publication Data
US 2024/0243565 A1       Jul. 18, 2024

Related U.S. Application Data

(60) Provisional application No. 63/189,346, filed on May 17, 2021.

(51) Int. Cl.
*H02G 7/12*           (2006.01)
(52) U.S. Cl.
CPC .................................... *H02G 7/12* (2013.01)

(58) Field of Classification Search
CPC ....................................................... H02G 7/12
See application file for complete search history.

(56) References Cited

U.S. PATENT DOCUMENTS 3,885,086 A * 5/1975 Houston ................ H02G 7/125
                                                      174/42
3,939,300 A    2/1976 Hawkins
                      (Continued)

FOREIGN PATENT DOCUMENTS

CN          112398074 A      2/2021
GB           1084102 A       9/1967
                (Continued)

OTHER PUBLICATIONS

International Search Report of corresponding Application No. PCT/US2022/029595; Aug. 30, 2022; 5 Pgs.

*Primary Examiner* — Sherman Ng
(74) *Attorney, Agent, or Firm* — Cooper Legal Group, LLC

(57)           ABSTRACT

A bundle spacer that includes a first line connector to be connected to a first electrical line, a second line connector to be connected to a second electrical line, and a body interposed between the first line connector and the second line connector. The body is actuatable to provide a variable distance between the first line connector and the second line connector and the first electrical line and the second electrical line connected thereto. It is to be appreciated that the bundle spacer may be constructed/configured with more than two line connectors for association with more than two electrical lines.

20 Claims, 38 Drawing Sheets

(56) References Cited

U.S. PATENT DOCUMENTS

| | | | | |
|---|---|---|---|---|
| 4,012,581 | A | * | 3/1977 | Hawkins ................ H02G 7/125 |
| | | | | 174/42 |
| 4,278,833 | A | * | 7/1981 | Hawkins ................ H02G 7/125 |
| | | | | 174/42 |
| 2008/0173462 | A1 | * | 7/2008 | Whapham .............. H02G 7/125 |
| | | | | 174/42 |

FOREIGN PATENT DOCUMENTS

| | | | |
|---|---|---|---|
| GB | 2286727 | A | 8/1995 |
| WO | 9602968 | A1 | 2/1996 |
| WO | 2015116396 | A1 | 8/2015 |

* cited by examiner

COLLAPSIBLE BUNDLE SPACER

RELATED APPLICATIONS

Benefit is claimed from U.S. Patent Application No. 63/189,346 filed May 17, 2021 entitled COLLAPSIBLE BUNDLE SPACER the entire contents and disclosure thereof is incorporated, in entirety, herein by reference.

FIELD

The present disclosure relates to electrical transmission conductor lines. Further, the present disclosure is directed towards a line bundle spacer for separating electrical lines.

BACKGROUND

Rigid spacers may be used in association with an electrical transmission conductor line (e.g., electrical line) bundle to maintain electrical lines spaced at a fixed distance apart from one another. Such spacing helps to mitigate the electrical lines from damaging each other. Within some examples, damage may occur without such spacing and during wind induced sway, line vibration events, and/or the like. Within some examples, several rigid spacers may be placed along a span between adjacent support towers/poles. Within some examples, such rigid spacers may be located approximately 30-60 meters apart from each other along the electrical lines of the bundle.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In accordance with one or more aspects, the present disclosure provides a bundle spacer that includes a first line connector to be connected to a first electrical line, a second line connector to be connected to a second electrical line, and a body interposed between the first line connector and the second line connector. It is to be noted that the present disclosure includes the aspect of more than two line connectors for association with more than two electrical lines. The body is actuatable to provide a variable distance between the first line connector and the second line connector and the first electrical line and the second electrical line connected thereto.

In accordance with one or more aspects, the present disclosure provides a bundle spacer. The bundle spacer includes a first arm to be connected to a first electrical line. The bundle spacer includes a second arm to be connected to a second electrical line. The first arm and the second arm are movable relative to each other to provide a variable distance between the first electrical line and the second electrical line. It is to be noted that the present disclosure includes the aspect of more than two line connectors for association with more than two electrical lines.

In accordance with one or more aspects, the present disclosure provides a bundle spacer. The bundle spacer includes a first arm to be connected to a first electrical line. The bundle spacer includes a second arm to be connected to a second electrical line. The first arm and the second arm are movable relative to each other. The bundle spacer includes a bias device that exerts a bias force on at least one of the first arm or the second arm. Relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance. It is to be noted that the present disclosure includes the aspect of more than two line connectors for association with more than two electrical lines.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DESCRIPTION OF THE DRAWINGS

FIG. 15 is a view similar to FIG. 14, but subsequent to a compressive force applied to the example bundle spacer and relative movement of some portions of the example bundle spacer.

US 12,640,548 B2

3

Figure 17:
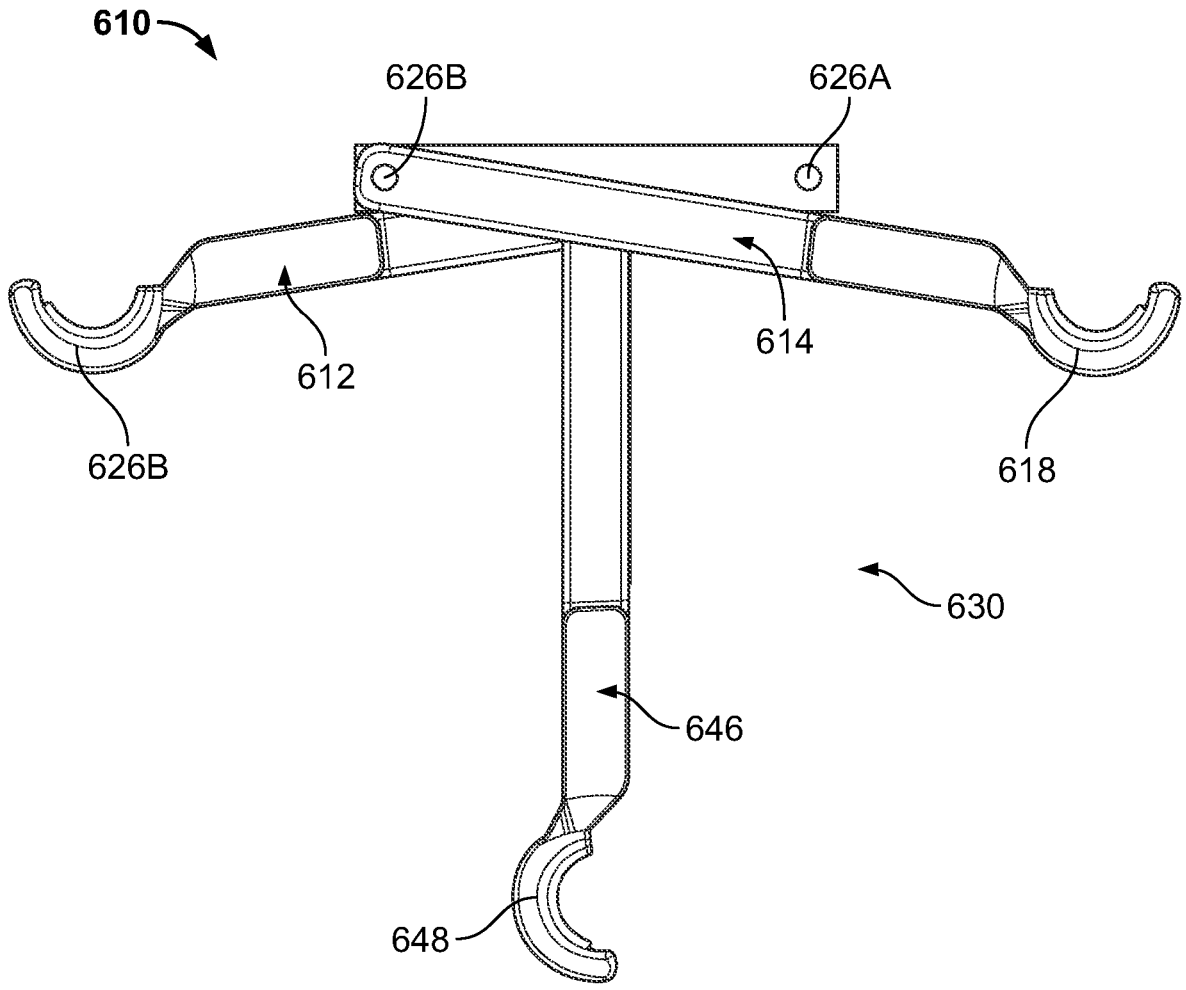

FIG. 17 is a plan view illustration of another example bundle spacer in accordance with at least one aspect of the present disclosure.

Figure 18:
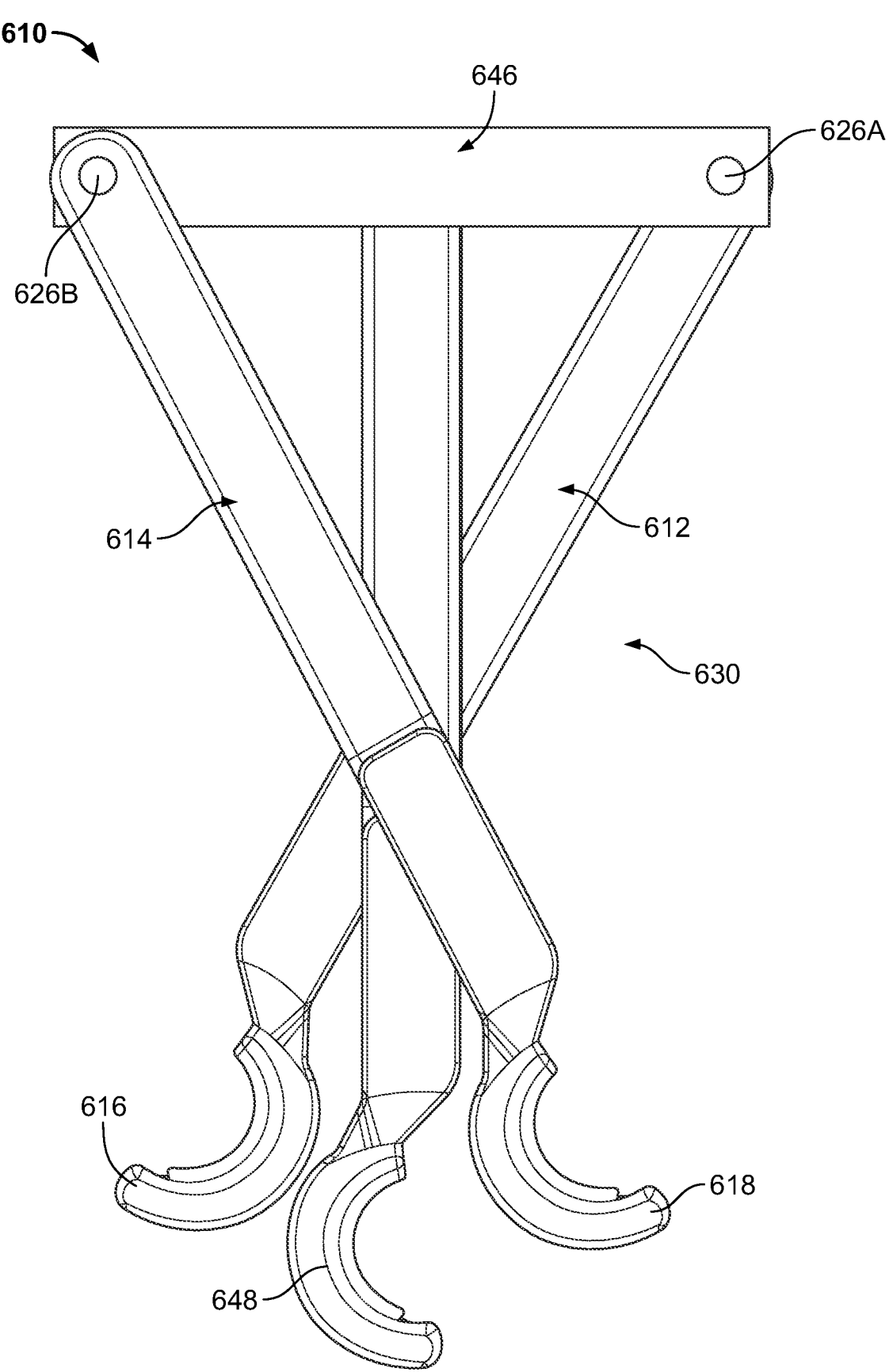

FIG. 18 is a plan view similar to FIG. 17, but subsequent to a compressive force applied to the example bundle spacer and relative movement of some portions of the example bundle spacer.

Figure 19:
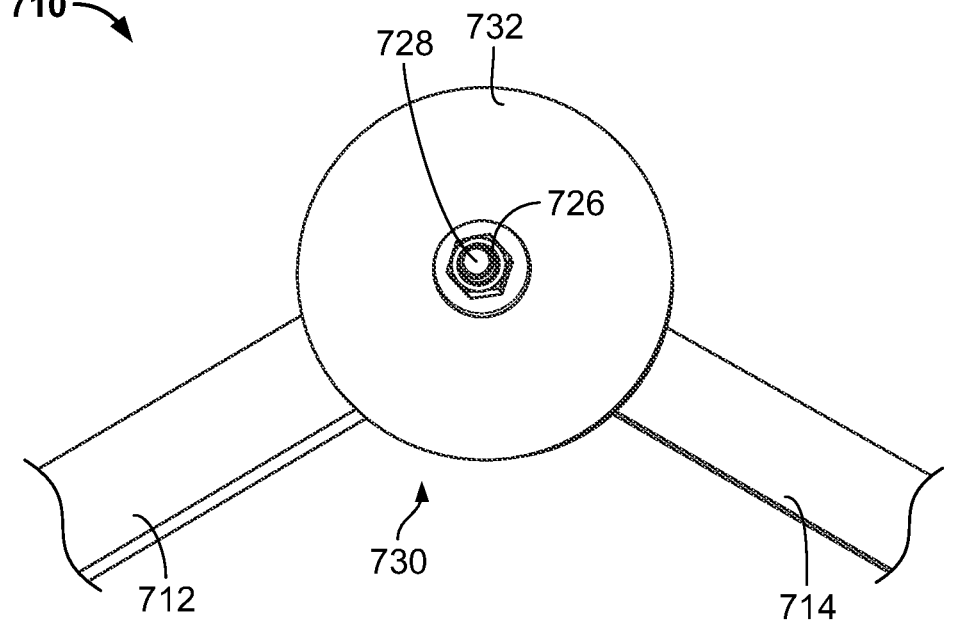

FIG. 19 is a plan view, partially torn away, illustration of another example bundle spacer in accordance with at least one aspect of the present disclosure.

Figure 20:
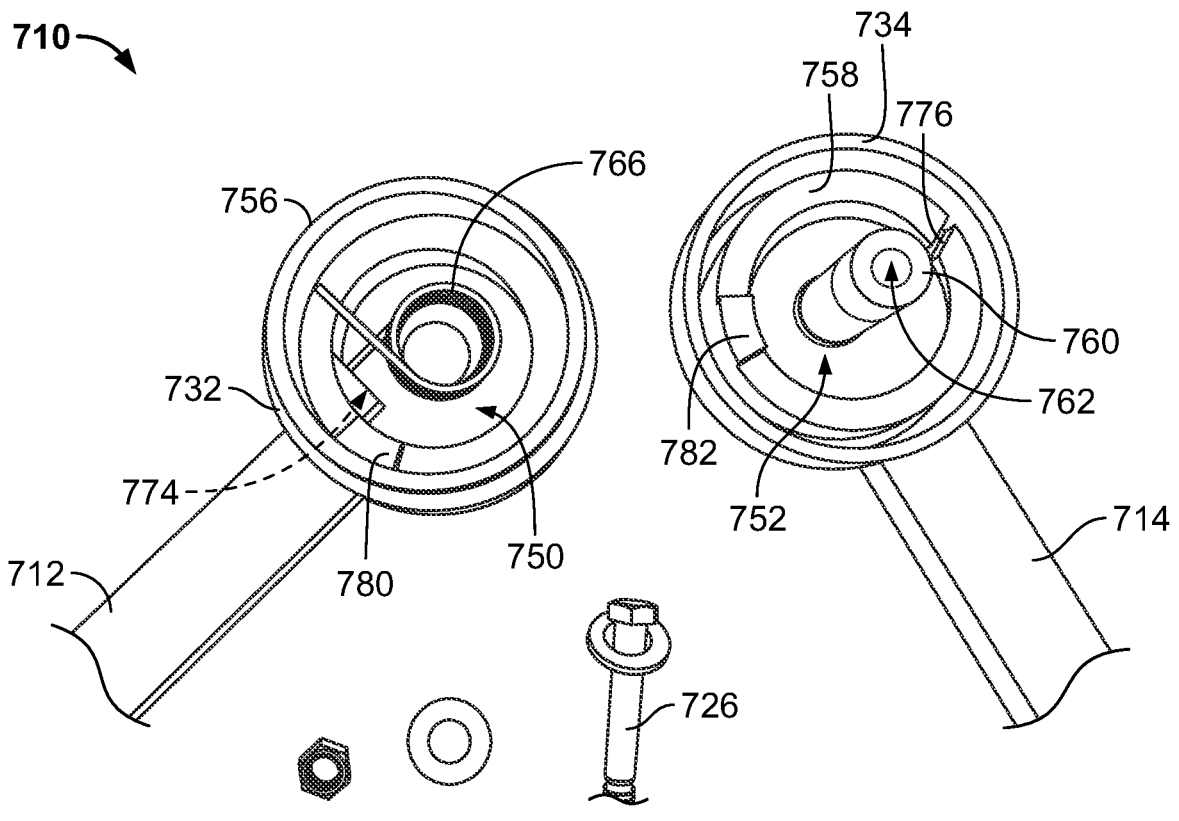

FIG. 20 is an illustration of the example bundle spacer of FIG. 19 in a mostly disassembled condition.

Figure 21:
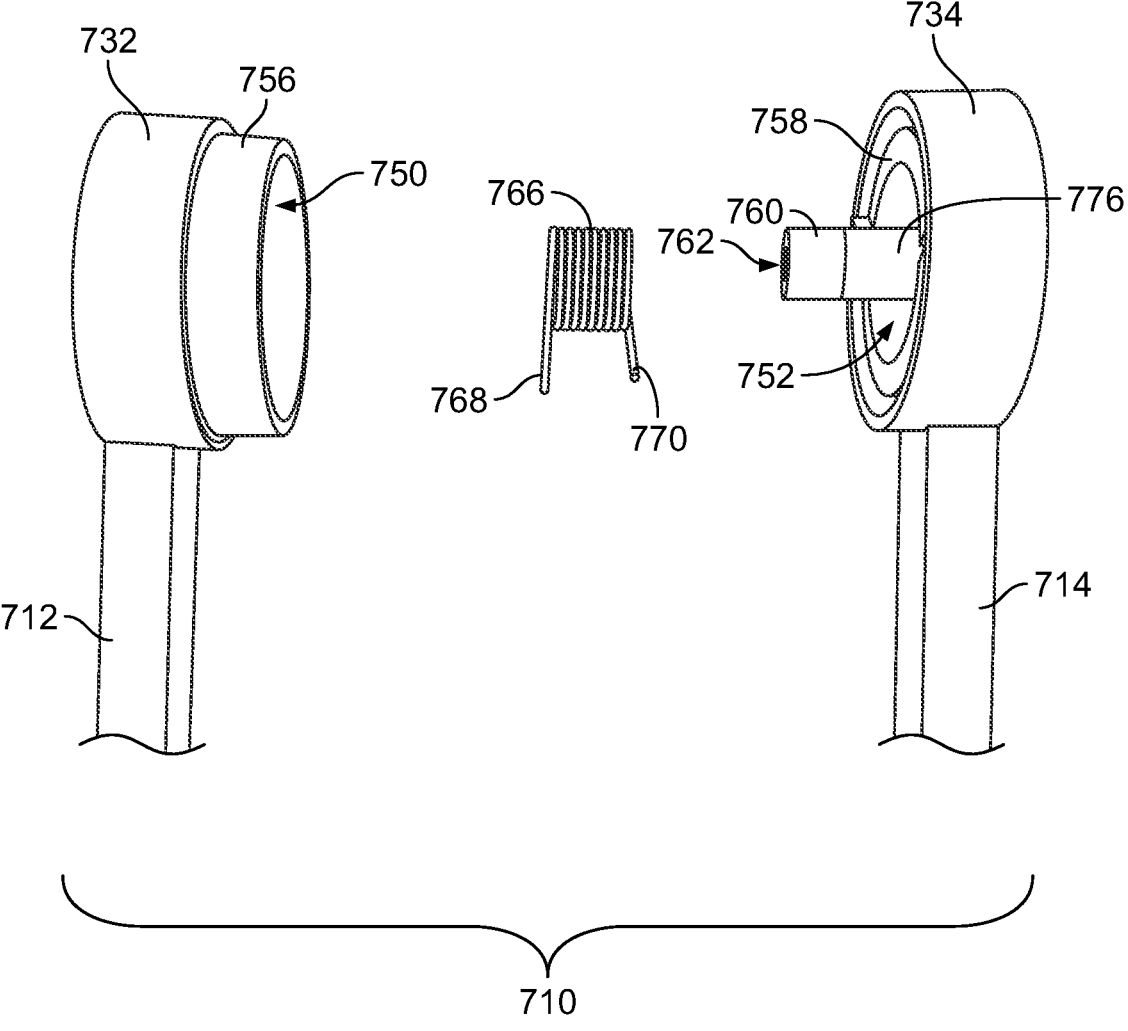

FIG. 21 is another illustration of the example bundle spacer of FIG. 19 in a mostly disassembled condition.

Figure 22:
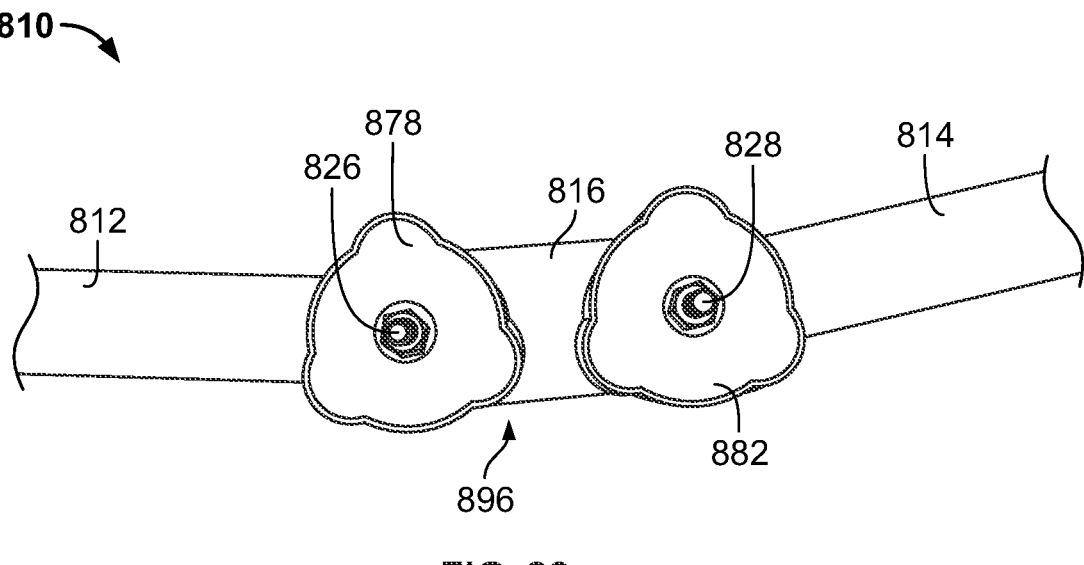

FIG. 22 is a plan view, partially torn away, illustration of another example bundle spacer in accordance with at least one aspect of the present disclosure.

Figure 23:
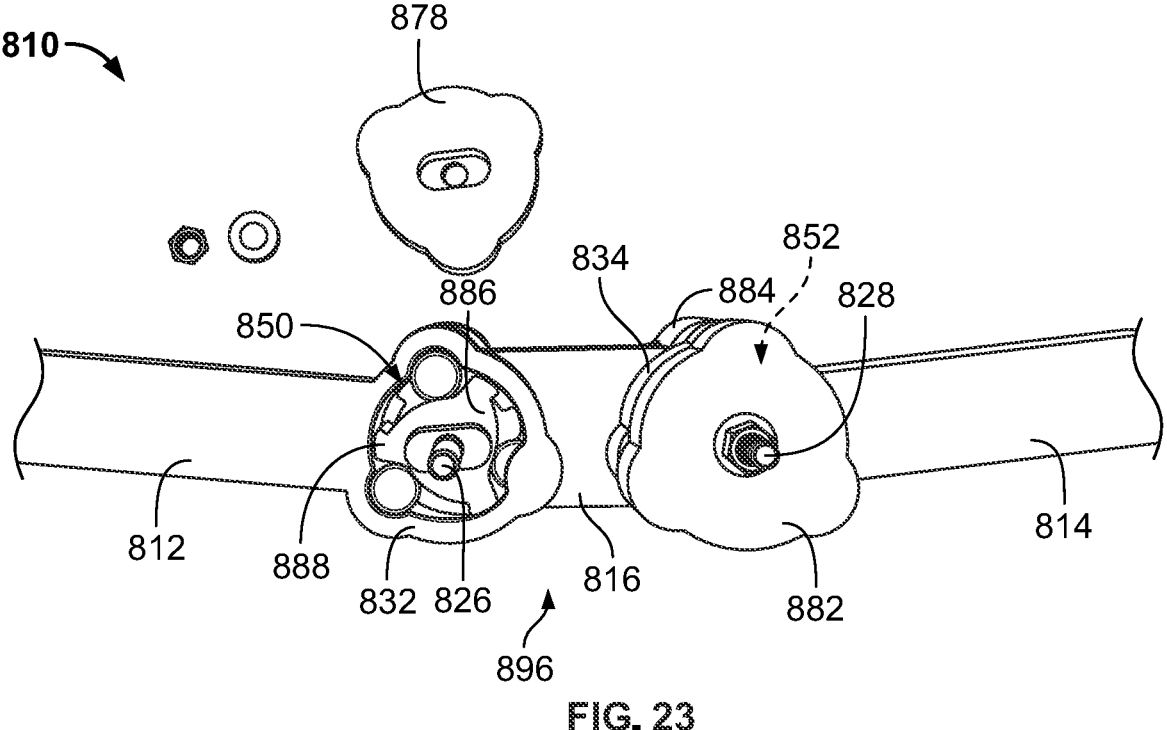

FIG. 23 is an illustration of the example bundle spacer of FIG. 22 in a partially disassembled condition.

Figure 24:
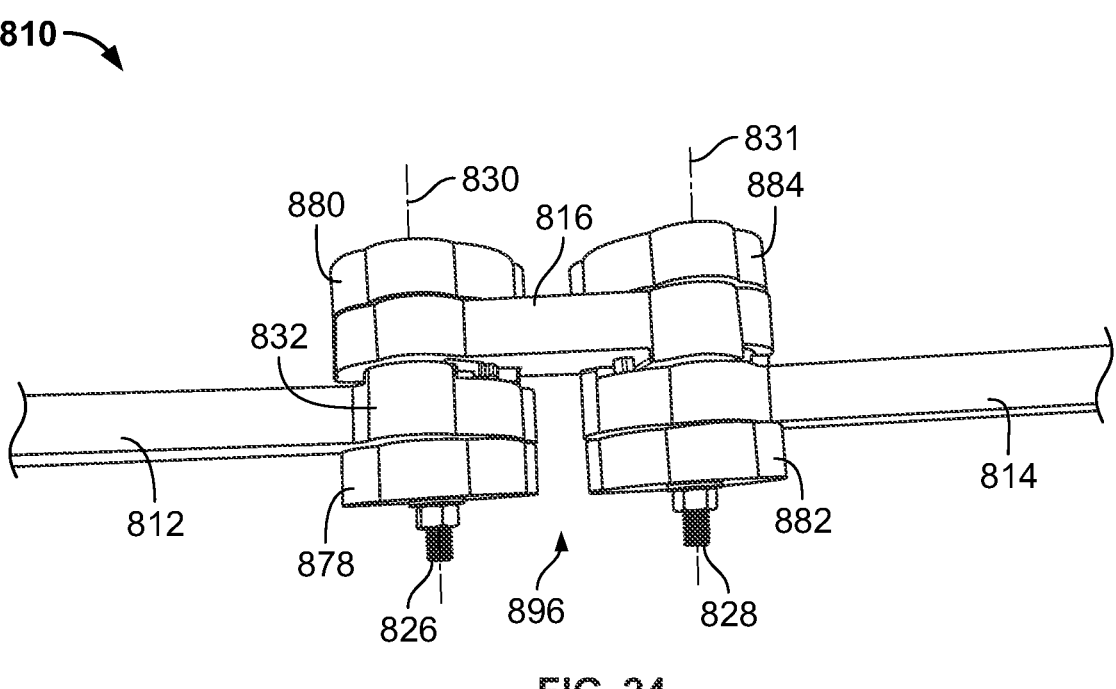

FIG. 24 is a top view illustration of the example bundle spacer of FIG. 22.

Figure 25:
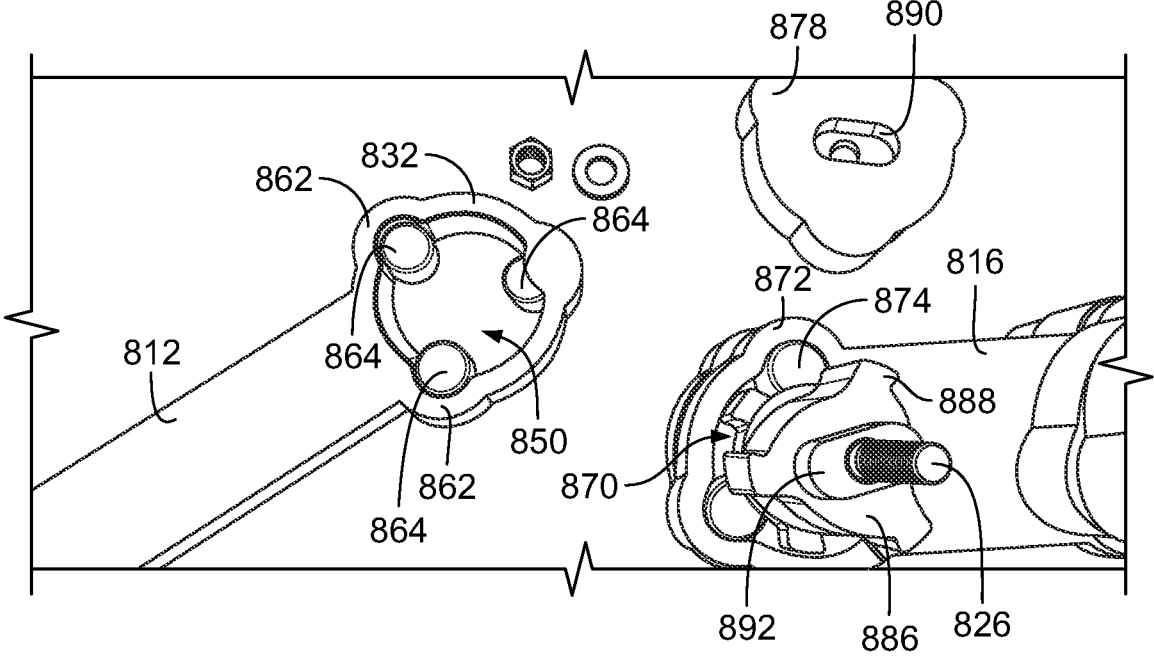

FIG. 25 is an enlarged illustration of a portion of the example bundle spacer of FIG. 22 in a partially disassembled condition.

Figure 26:
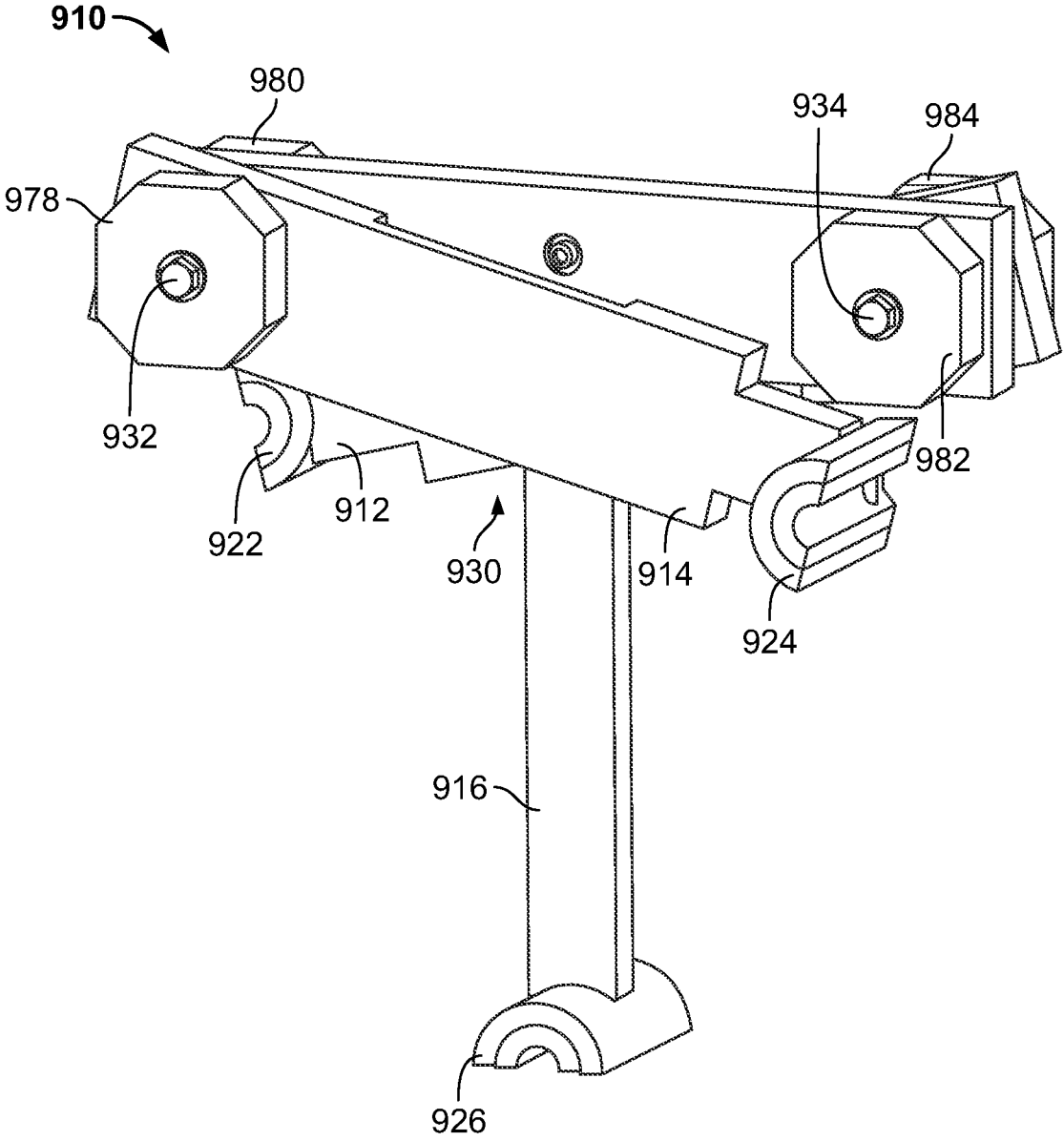

FIG. 26 is a perspective view illustration of another example bundle spacer in accordance with at least one aspect of the present disclosure.

Figure 27:
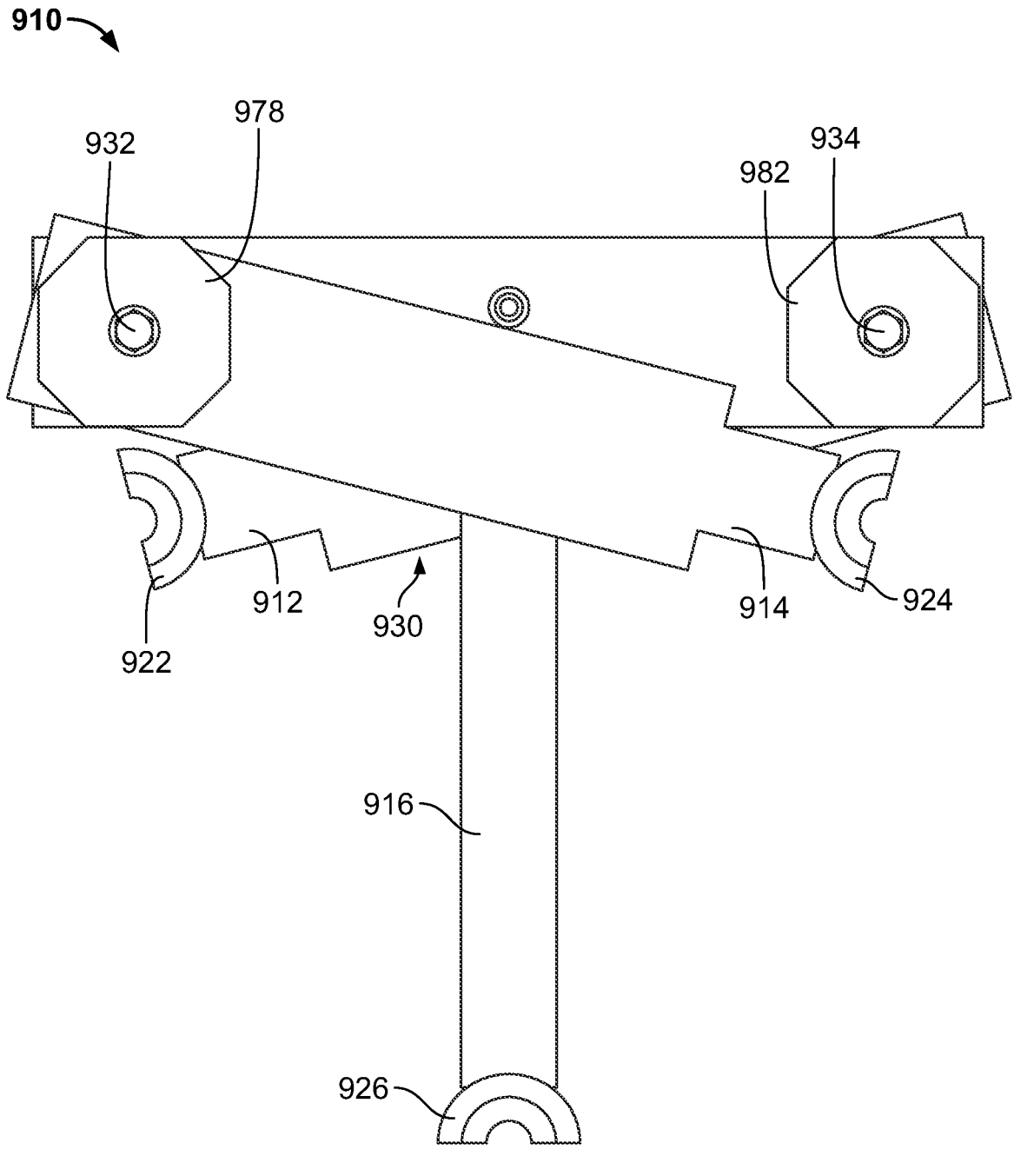

FIG. 27 is a plan view illustration of the example bundle spacer of FIG. 26.

Figure 28:
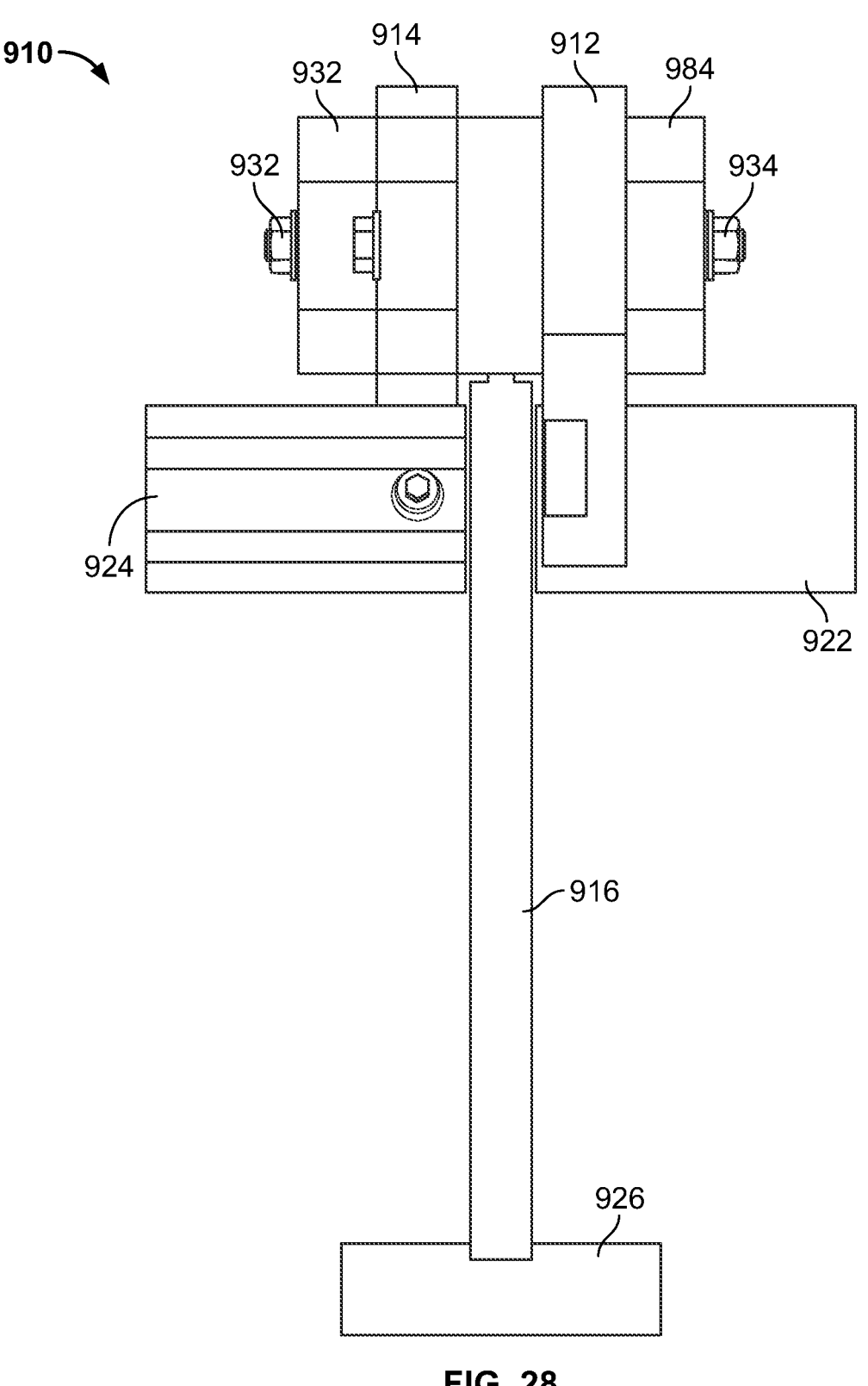

FIG. 28 is a side view illustration of the example bundle spacer of FIG. 26.

Figure 29:
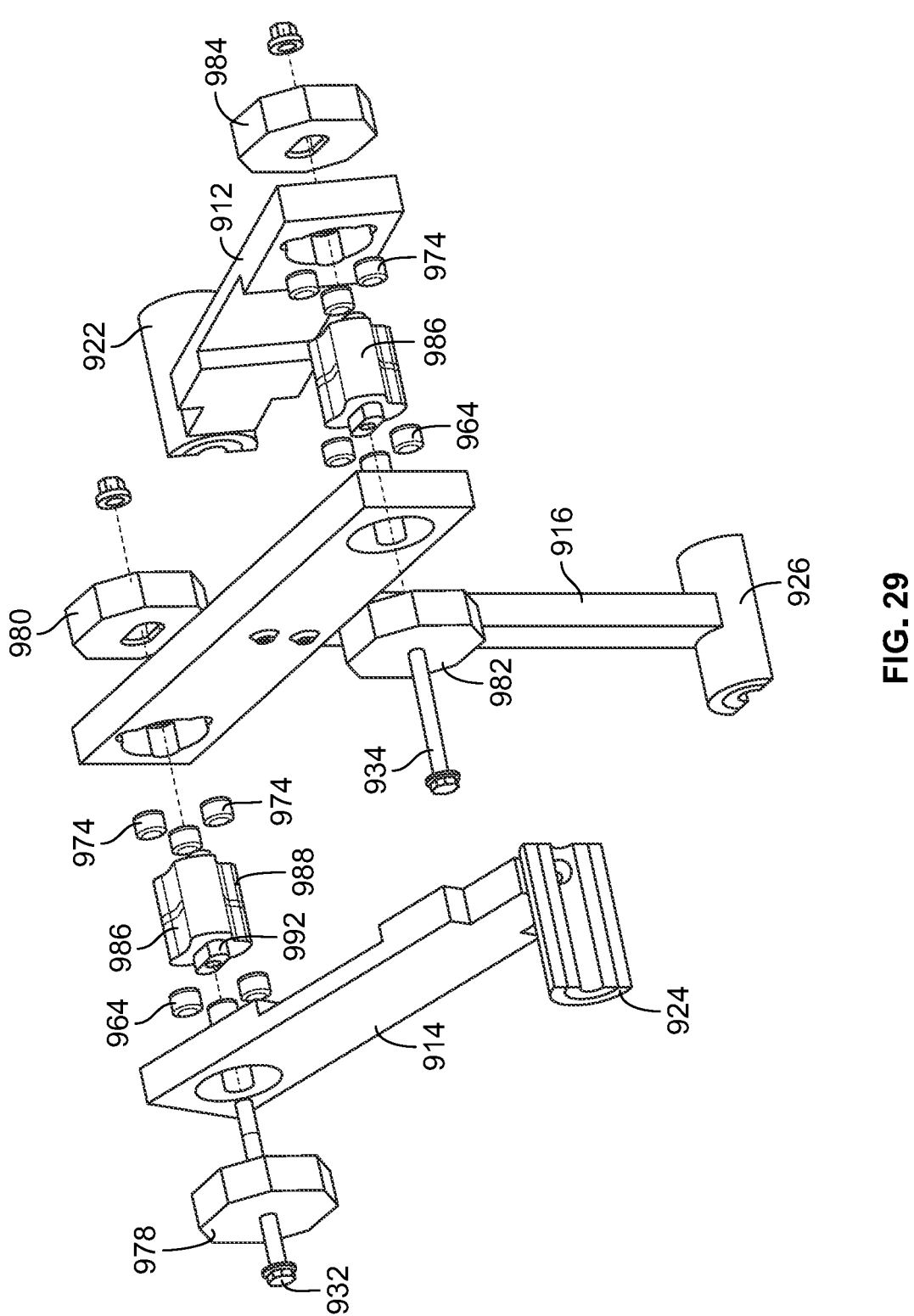

FIG. 29 is an exploded view illustration of the example bundle spacer of FIG. 26.

Figure 30:
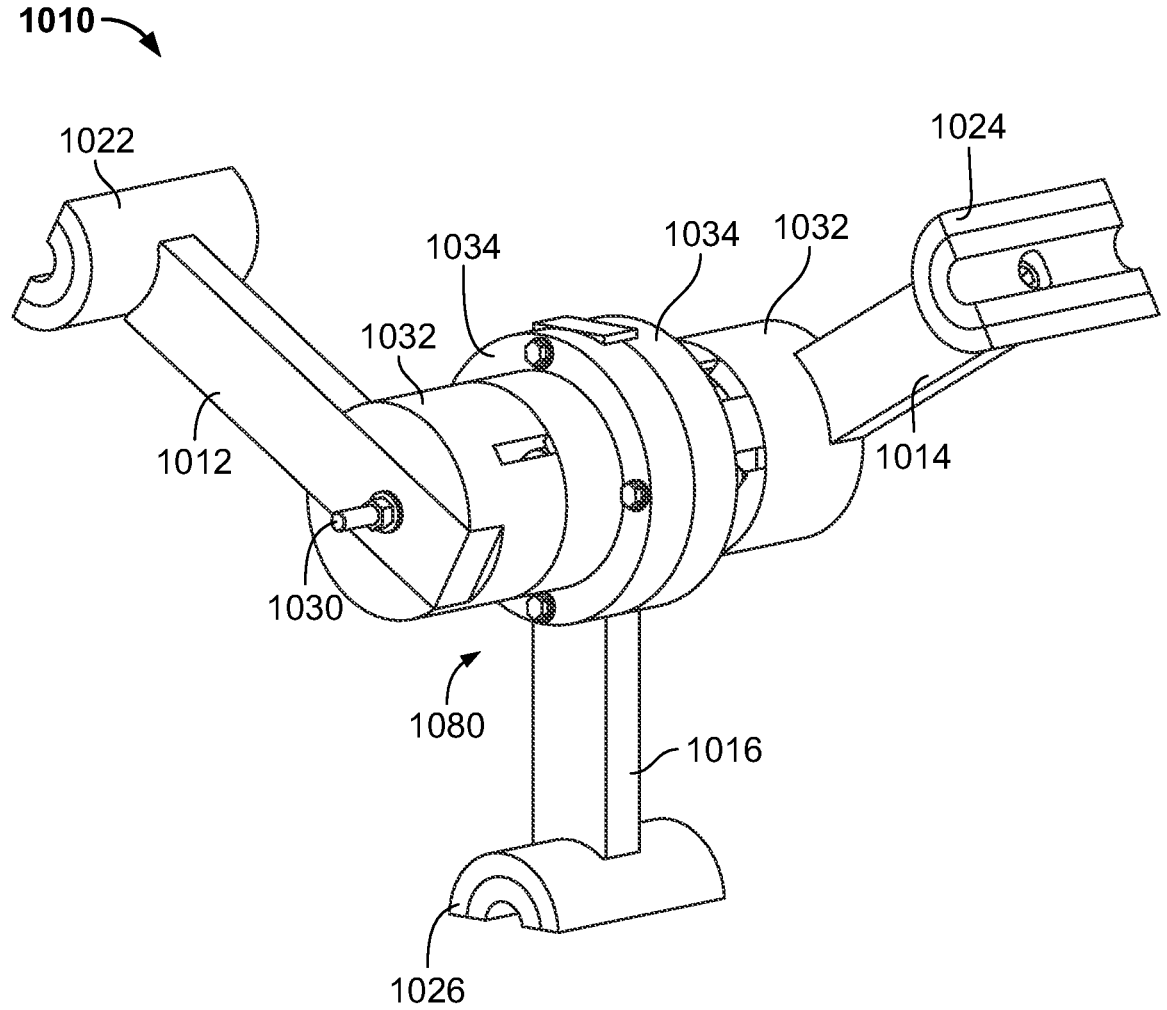

FIG. 30 is a perspective view illustration of another example bundle spacer in accordance with at least one aspect of the present disclosure.

Figure 31:
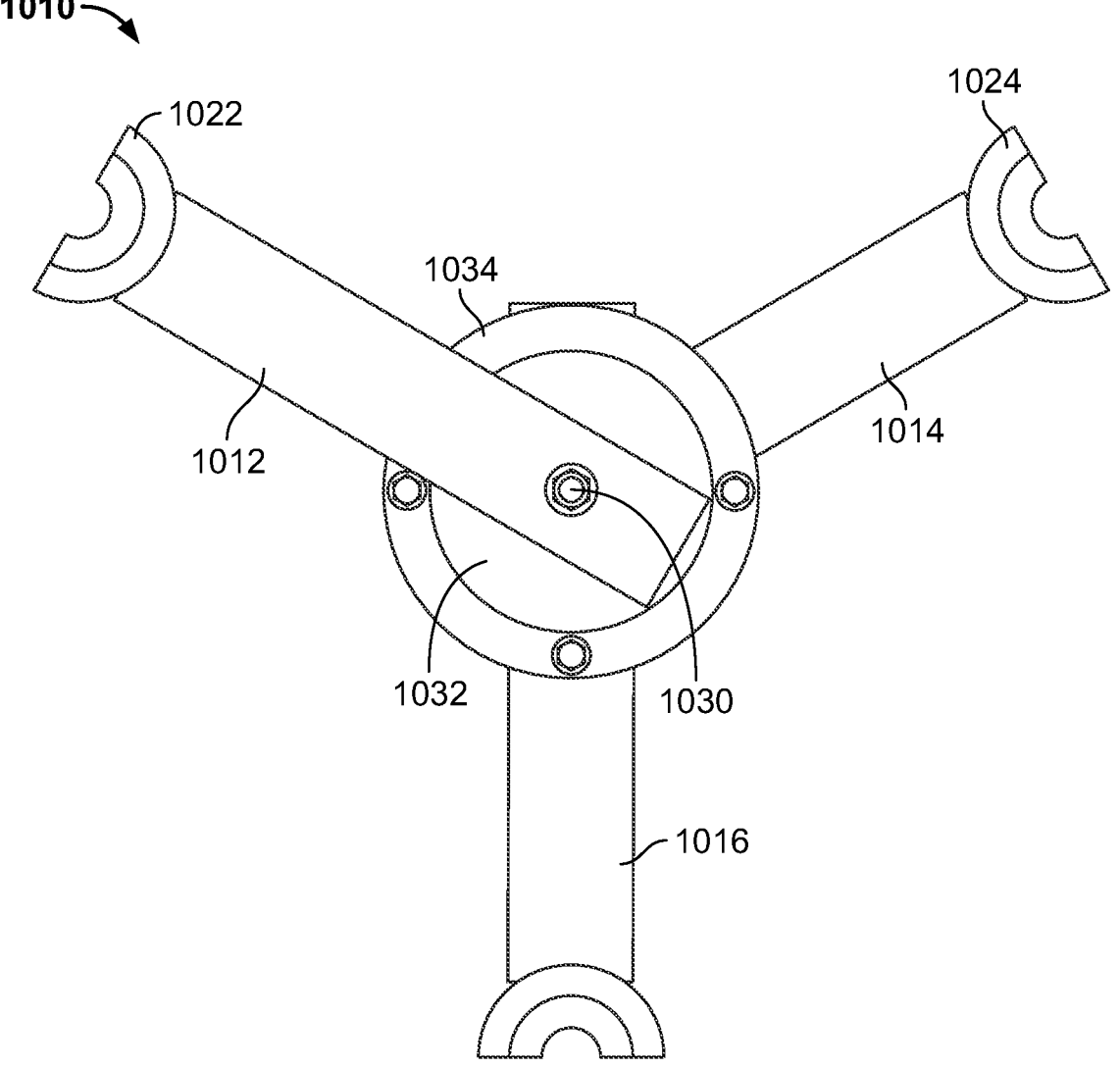

FIG. 31 is a plan view illustration of the example bundle spacer of FIG. 30.

Figure 32:
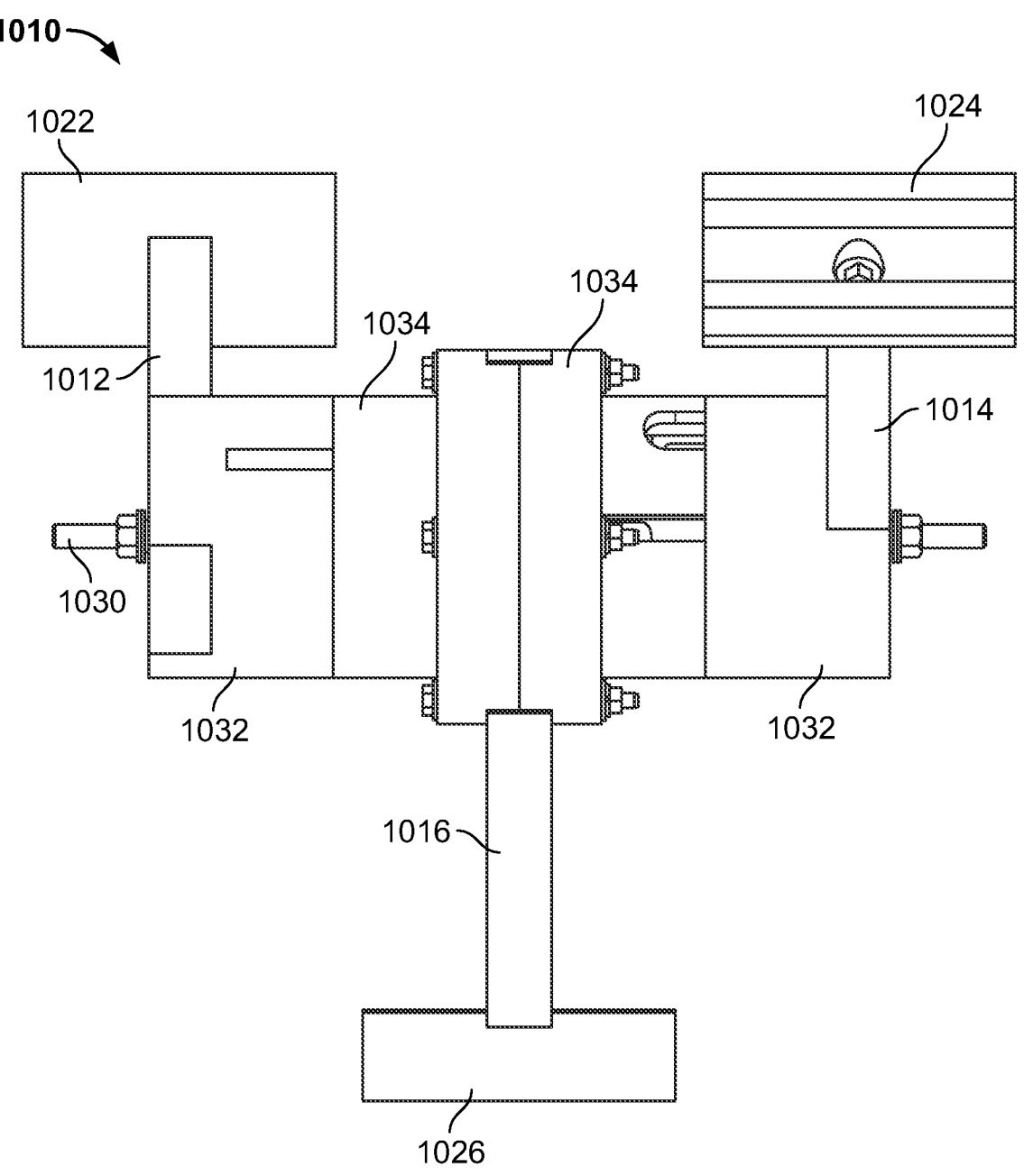

FIG. 32 is a side view illustration of the example bundle spacer of FIG. 30.

Figure 33:
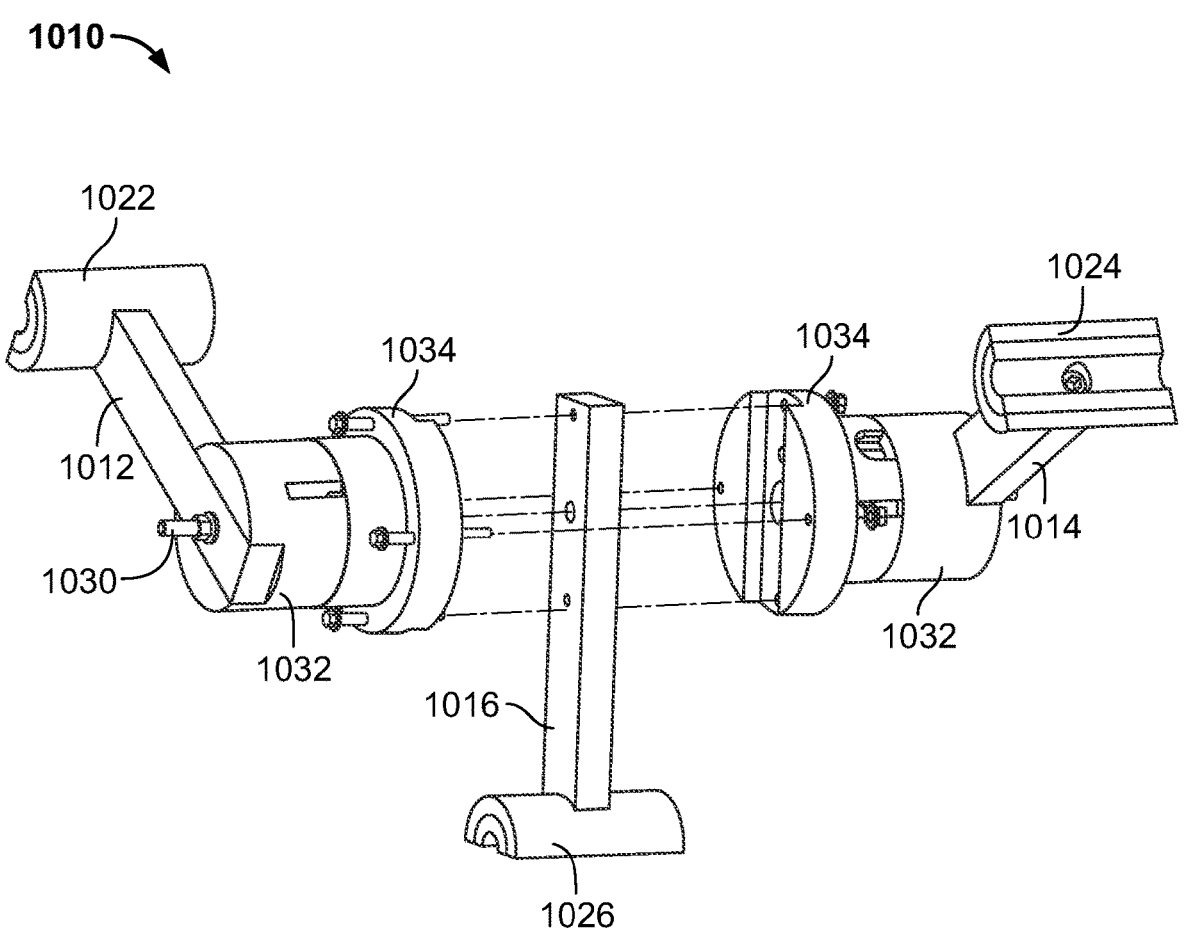

FIG. 33 is a partially exploded view illustration of the example bundle spacer of FIG. 30.

Figure 34:
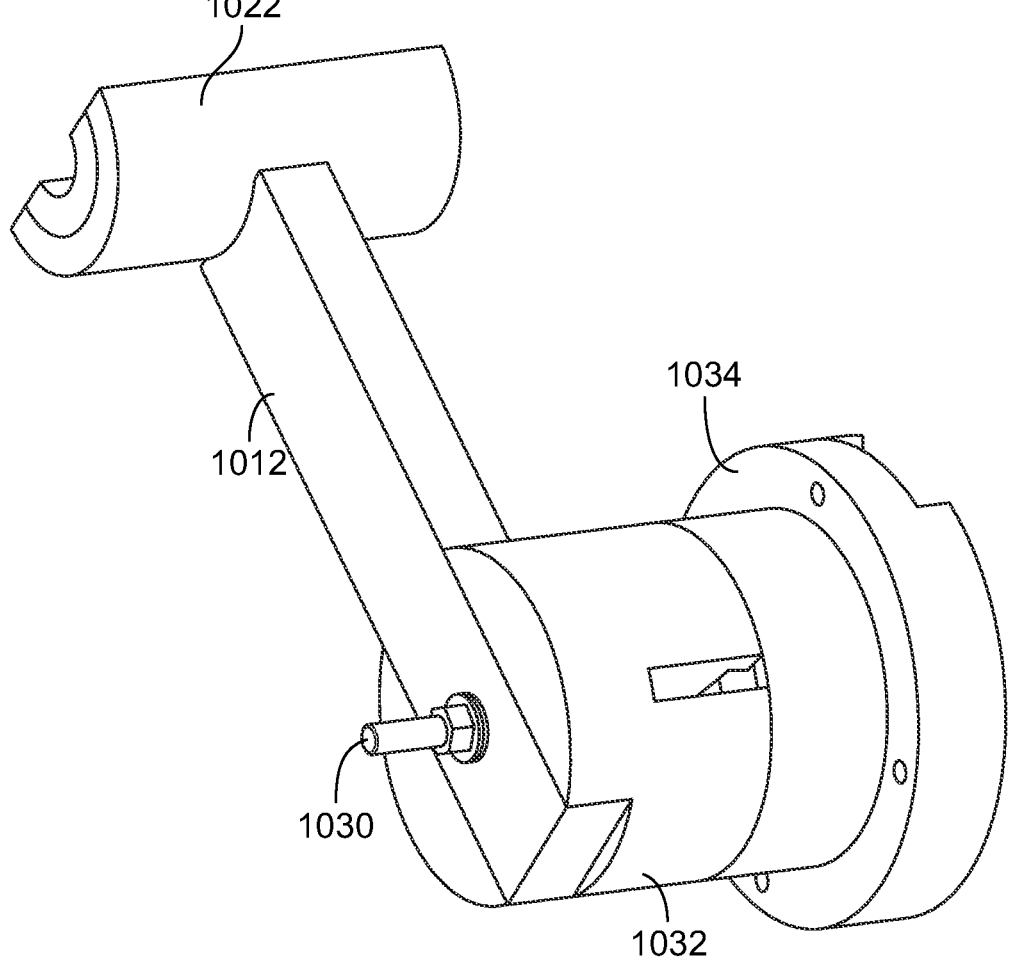

FIG. 34 is an enlarged view illustration of a portion of the example bundle spacer of FIG. 30.

Figure 35:
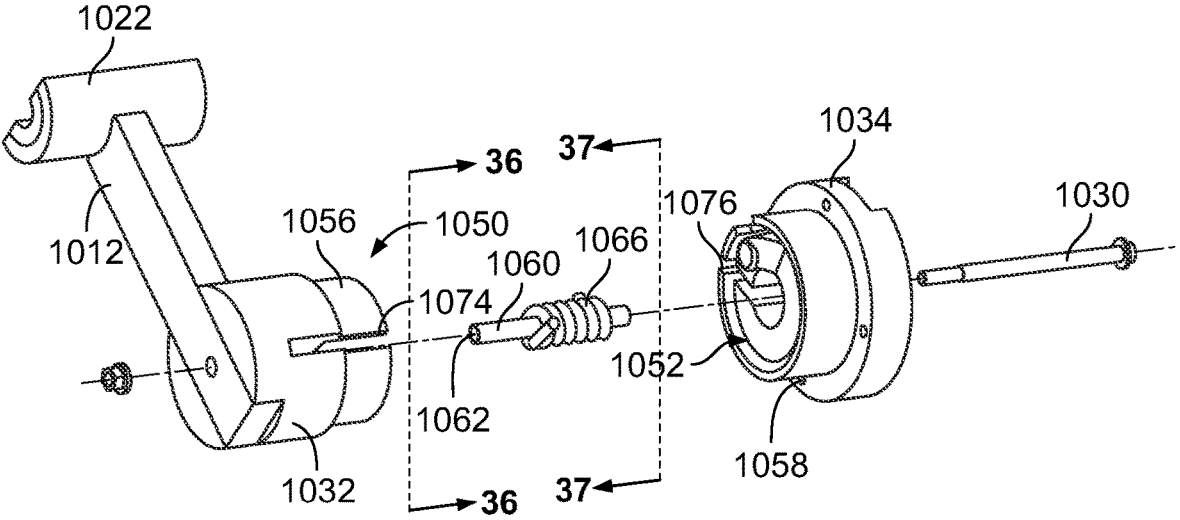

FIG. 35 is a partially exploded view illustration of the portion shown in example bundle spacer of FIG. 34.

Figure 36:
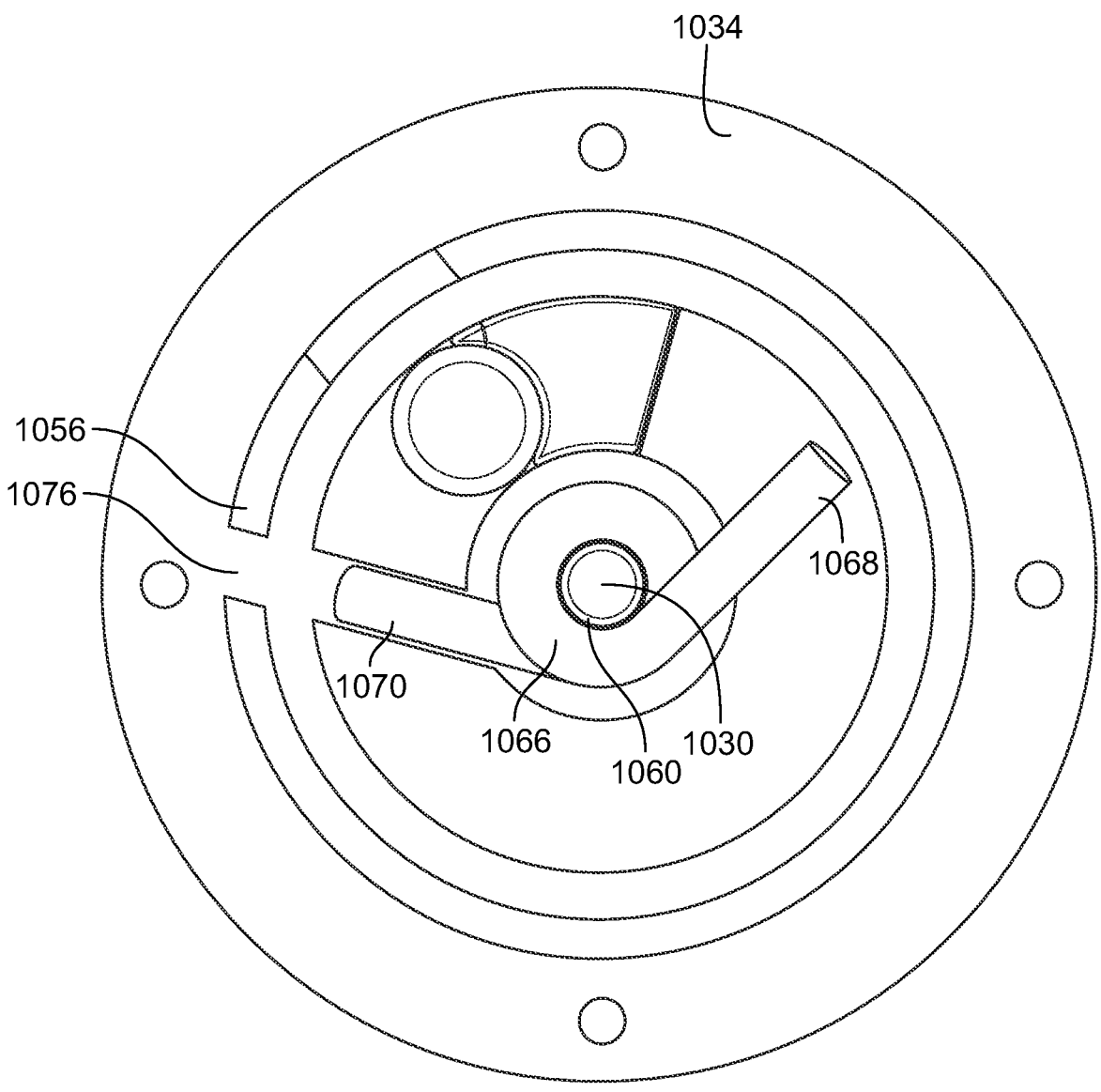

FIG. 36 is a view along line 36-36 in FIG. 35.

Figure 37:
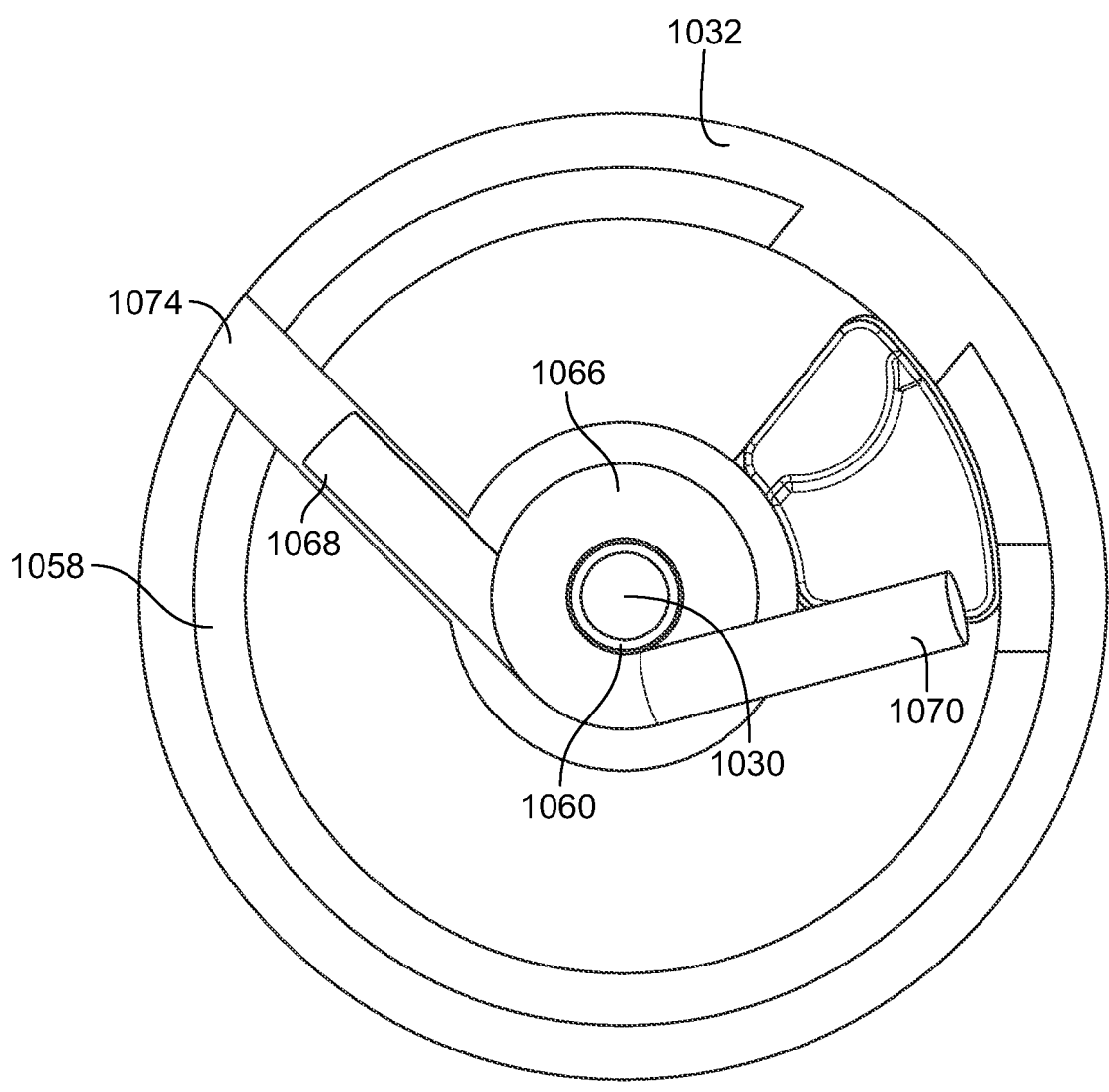

FIG. 37 is a view along line 37-37 in FIG. 35.

Figure 38:
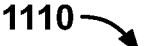
Figure 38:
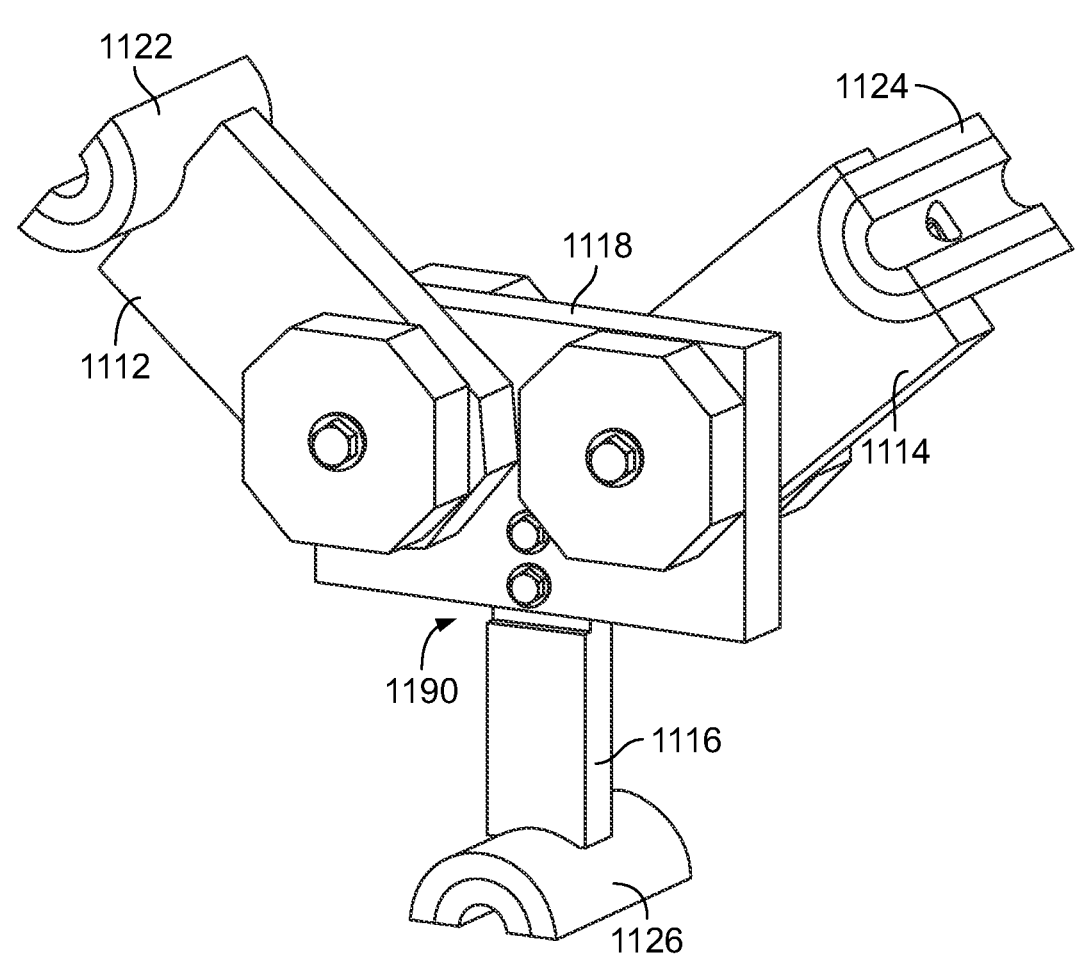

FIG. 38 is a perspective view illustration of another example bundle spacer in accordance with at least one aspect of the present disclosure.

Figure 39:
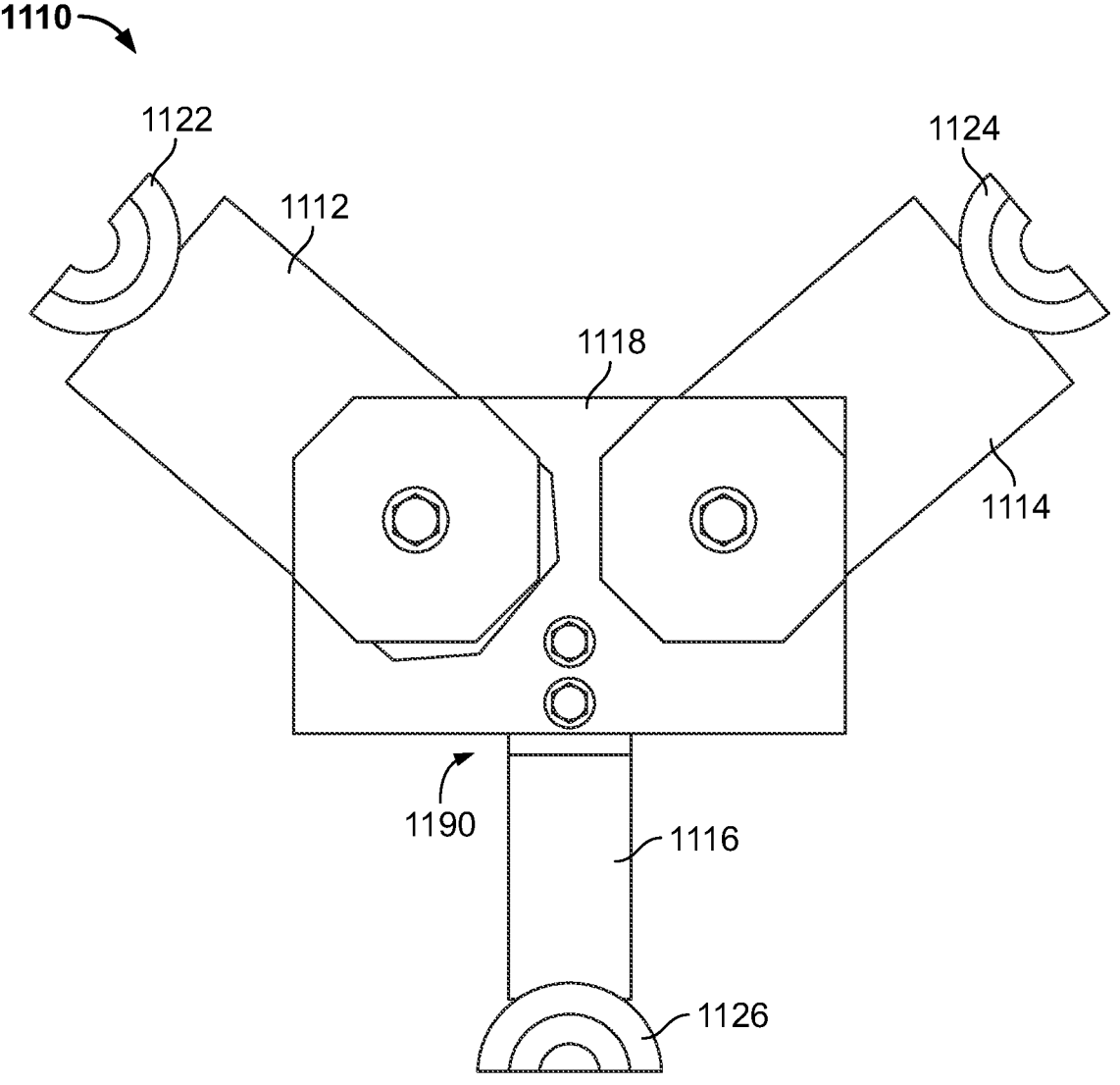

FIG. 39 is a plan view illustration of the example bundle spacer of FIG. 38.

Figure 40:
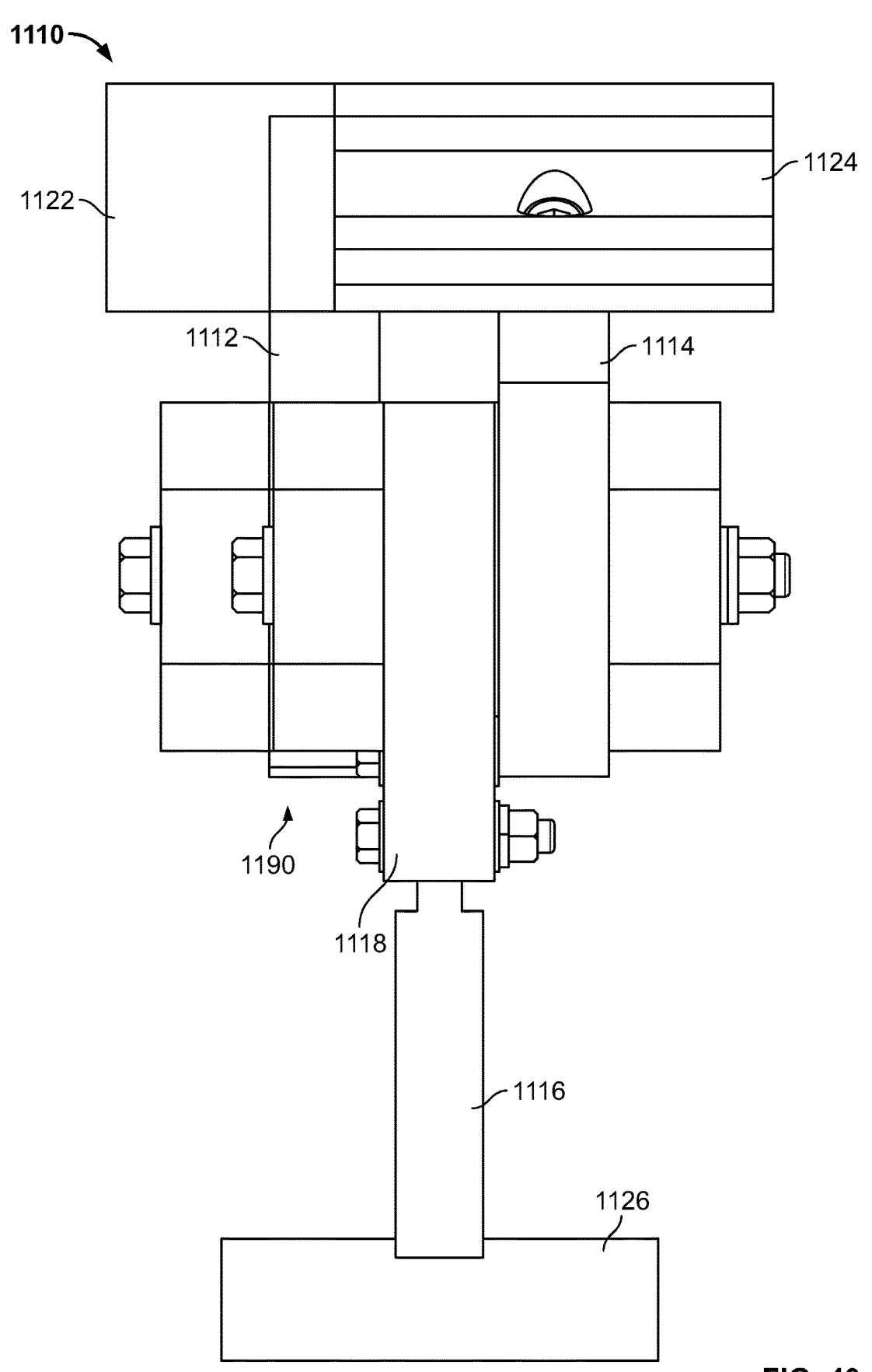

FIG. 40 is a side view illustration of the example bundle spacer of FIG. 38.

Figure 41:
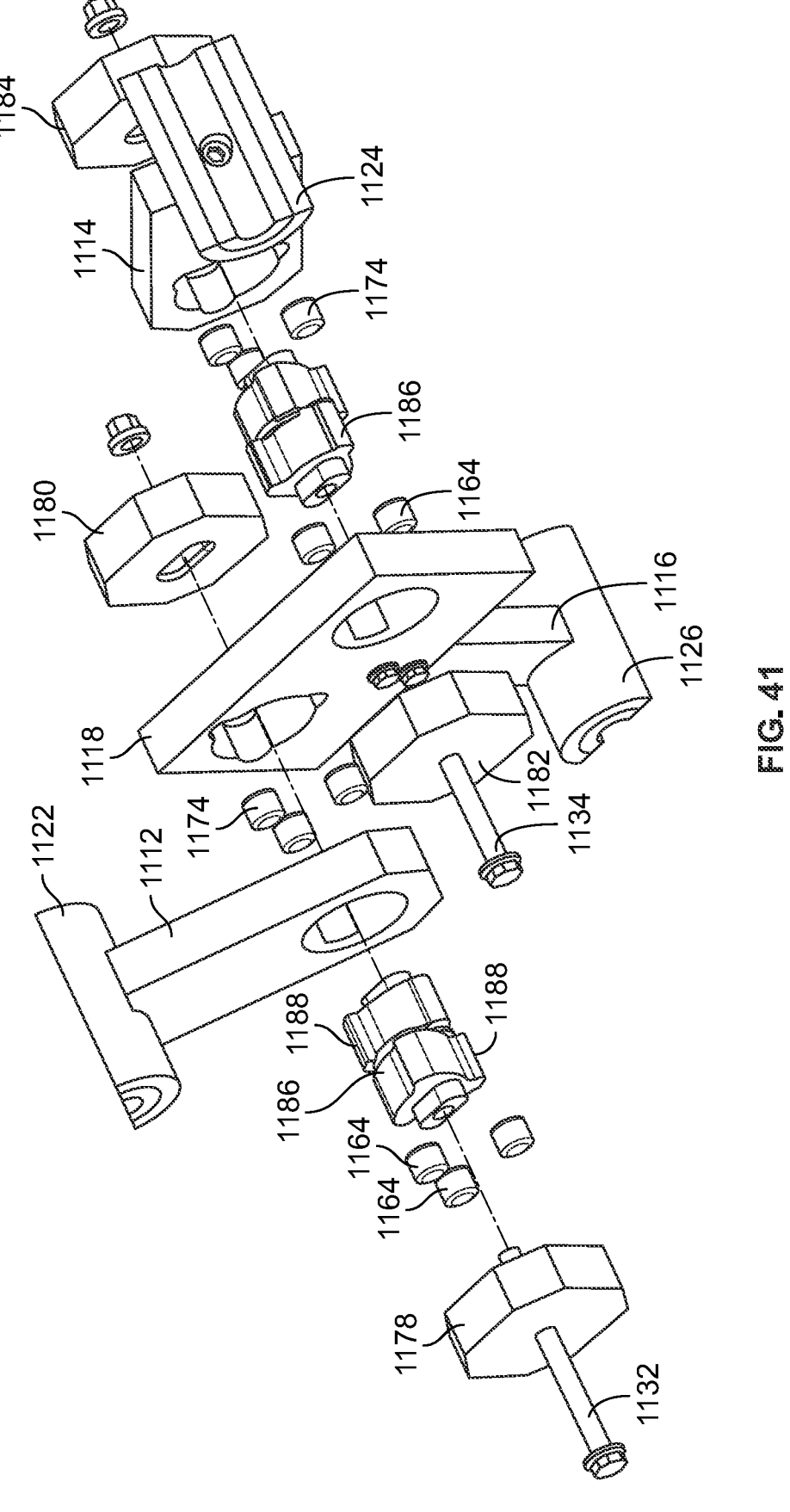

FIG. 41 is an exploded view illustration of the portion shown in example bundle spacer of FIG. 38.

Figure 42:
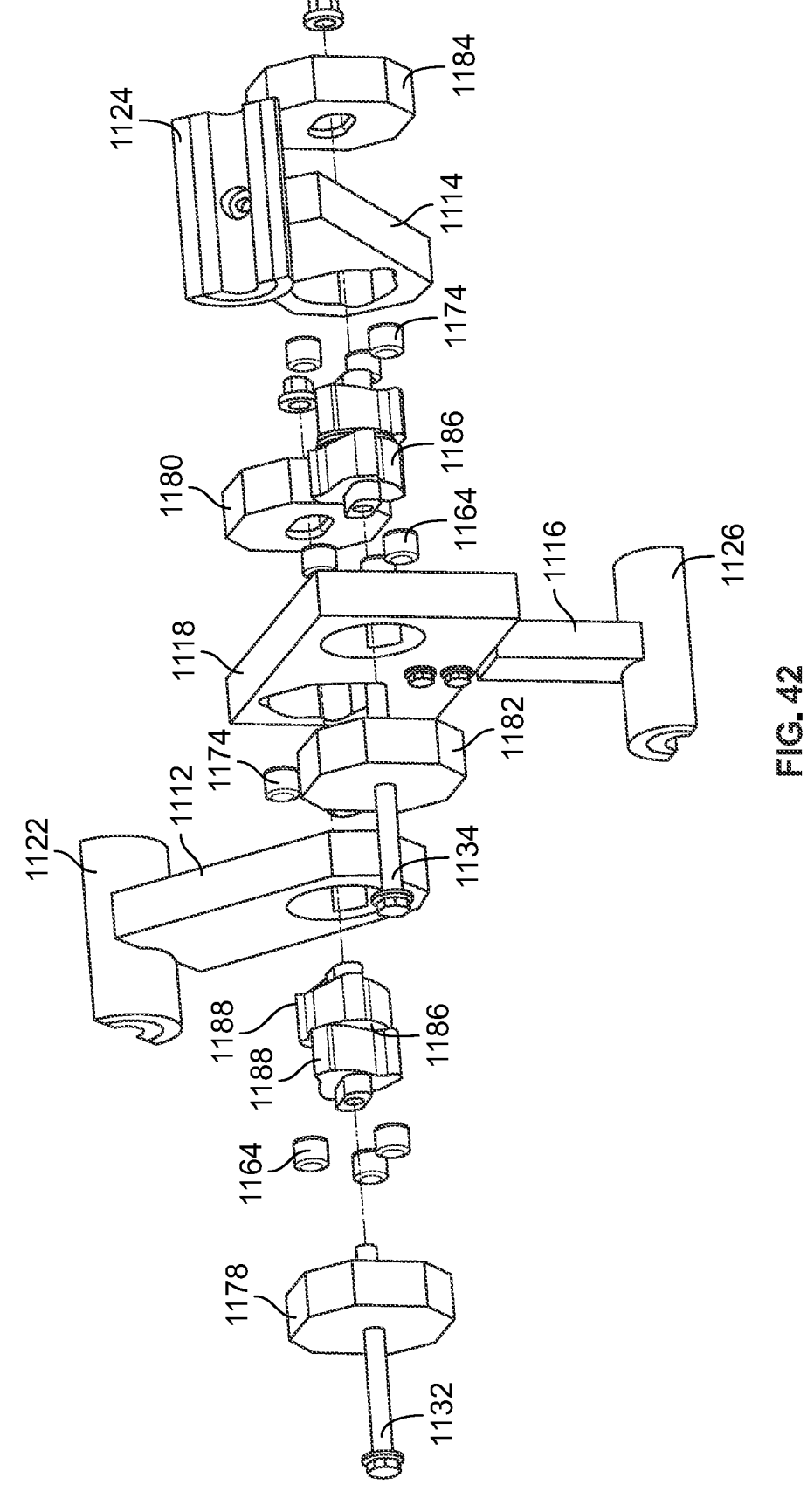

FIG. 42 is another exploded view illustration of the portion shown in example bundle spacer of FIG. 38.

DETAILED DESCRIPTION

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

One topic that may arise concerning the use of rigid spacers is during a rare short circuit event on an electrical line. During such an event, an extremely large amount of current will briefly pass through the electrical lines. This high amount of current creates a substantial magnetic field around each electrical line. These magnetic fields cause the electrical lines to be attracted towards one another with a force at times exceeding 5000 lbs. This force may cause the electrical lines to touch each other at locations between the rigid spacers, while continuing to be held apart at the locations where rigid spacers are present. As may be appreciated, such interspersed touching and separation causes the electrical lines to have a series of curves. This curving path is longer than the previously sustainably straight (i.e., non-curved), parallel path.

Figure 1:
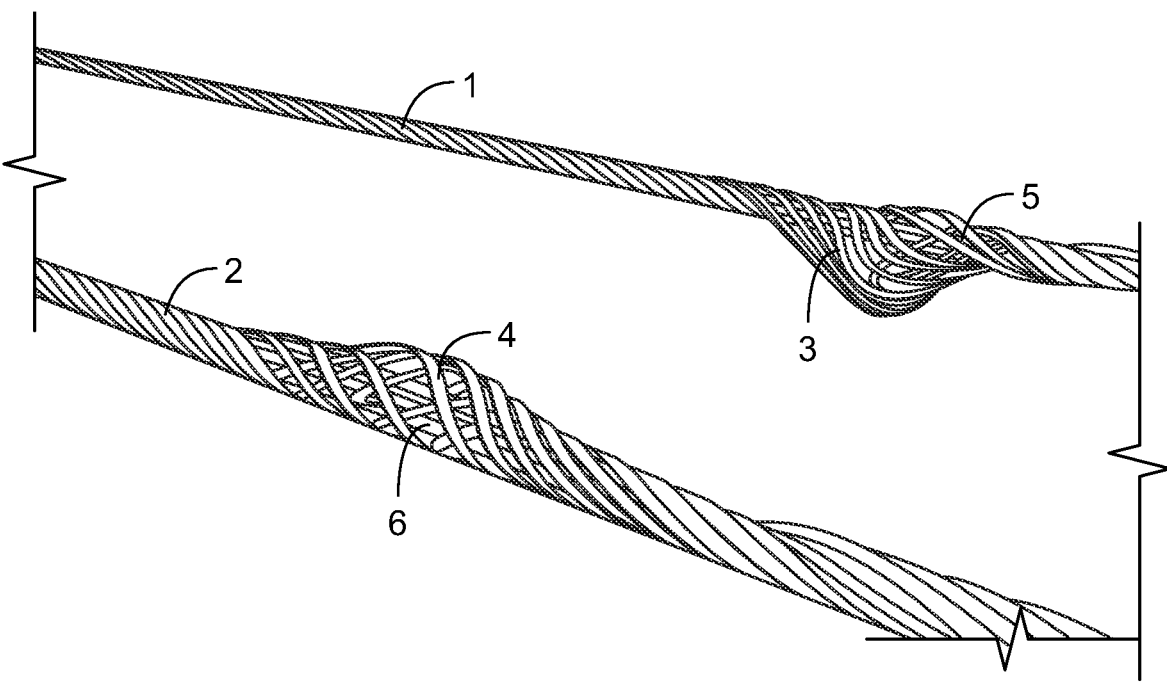
FIG. 1 is a perspective illustration of example electrical lines that have experienced birdcaging.
Figure 2:
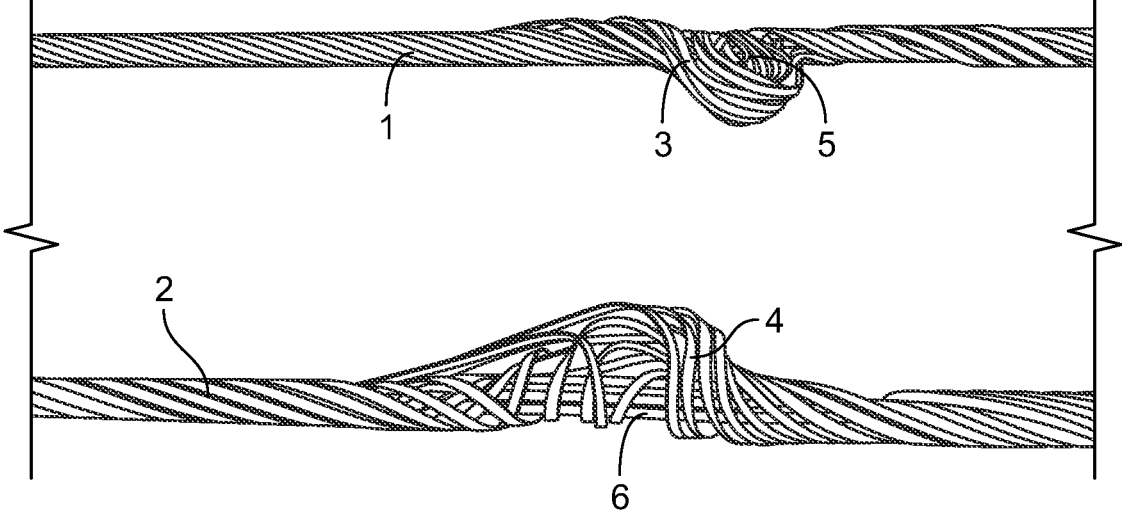
FIG. 2 is a plan view illustration of example electrical lines that have experienced birdcaging.

For some example electrical lines, the lines include soft outer aluminum conductor strands around a conductor core. The curving path may cause the aluminum strands to stretch. When the short circuit current is alleviated, the electrical lines attempt to go back to their previously straight/parallel path/shape. However, if the aluminum strands are stretched, such stretched aluminum strands are unable to regain their initial shape and may expand away from the conductor core in a phenomenon referred to a birdcaging. See within FIGS. 1 and 2 for example electrical lines 1, 2 that have experienced birdcaging 3, 4. Birdcaging exposed a respective conductor core 5, 6, comprising its strength/integrity and typically requires line repair or replacement of the damaged section.

It is to be appreciate that, in one or more examples, the present disclosure provides a bundle spacer that includes a first line connector to be connected to a first electrical line, a second line connector to be connected to a second electrical line and a body interposed between the first line connector and the second line connector. The body is actuatable to provide a variable distance between the first line connector and the second line connector and the first electrical line and the second electrical line connected thereto.

It is to be appreciate that, in one or more examples, the present disclosure provides a bundle spacer that maintains proper spacing between electrical lines during normal operating conditions, but, at a certain force, permits the electrical lines to move toward each other. The permitted movement toward each other may include permitting the electrical lines to come together and touch. The permitted movement is to help prevent undesired stretching. Within some examples such undesired stretching would occur within outer aluminum conductor strands of the electrical lines.

It is to be appreciate that, the maintenance of proper spacing and the permitted movement of the electrical lines toward each other is contemplated with a broad sense and may be accomplished via many different examples and embodiments. Such, different examples and embodiments are contemplated and within the scope of the present disclosure.

In accordance with one or more aspects, the present disclosure provides a bundle spacer that includes a first line connector to be connected to a first electrical line, a second line connector to be connected to a second electrical line, and a body interposed between the first line connector and the second line connector. The body is actuatable to provide a variable distance between the first line connector and the second line connector and the first electrical line and the second electrical line connected thereto.

In accordance with one or more aspects, the present disclosure provides a bundle spacer. The bundle spacer includes a first arm to be connected to a first electrical line. The bundle spacer includes a second arm to be connected to a second electrical line. The first arm and the second arm are movable relative to each other to provide a variable distance between the first electrical line and the second electrical line.

In accordance with one or more aspects, the present disclosure provides a bundle spacer. The bundle spacer includes a first arm to be connected to a first electrical line. The bundle spacer includes a second arm to be connected to a second electrical line. The first arm and the second arm are movable relative to each other. The bundle spacer includes a bias device that exerts a bias force on at least one of the first arm or the second arm. Relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance.

It is to be noted that the present disclosure includes the aspect of more than two line connectors for association with more than two electrical lines.

As some general, broadly contemplated examples that are within the scope of the present disclosure, please note the following. Some of the examples may use an included weight, or the weight of one or more electrical lines themselves, to maintain the spacing. The weight, if included and/or weight of line(s), provides a movement resistance force that may be overcome. Other examples may use elastic/resilient cushions or other types of spring elements to keep the electrical lines spaced apart while still allowing inward flex movement toward each other at certain loads. Some exemplary embodiments that present these examples are described following. It is to be appreciated and understood that the described examples/embodiments need not be specific limitations upon the present disclosure and that other examples/embodiments are contemplated and within the scope of the present disclosure.

Figure 3:
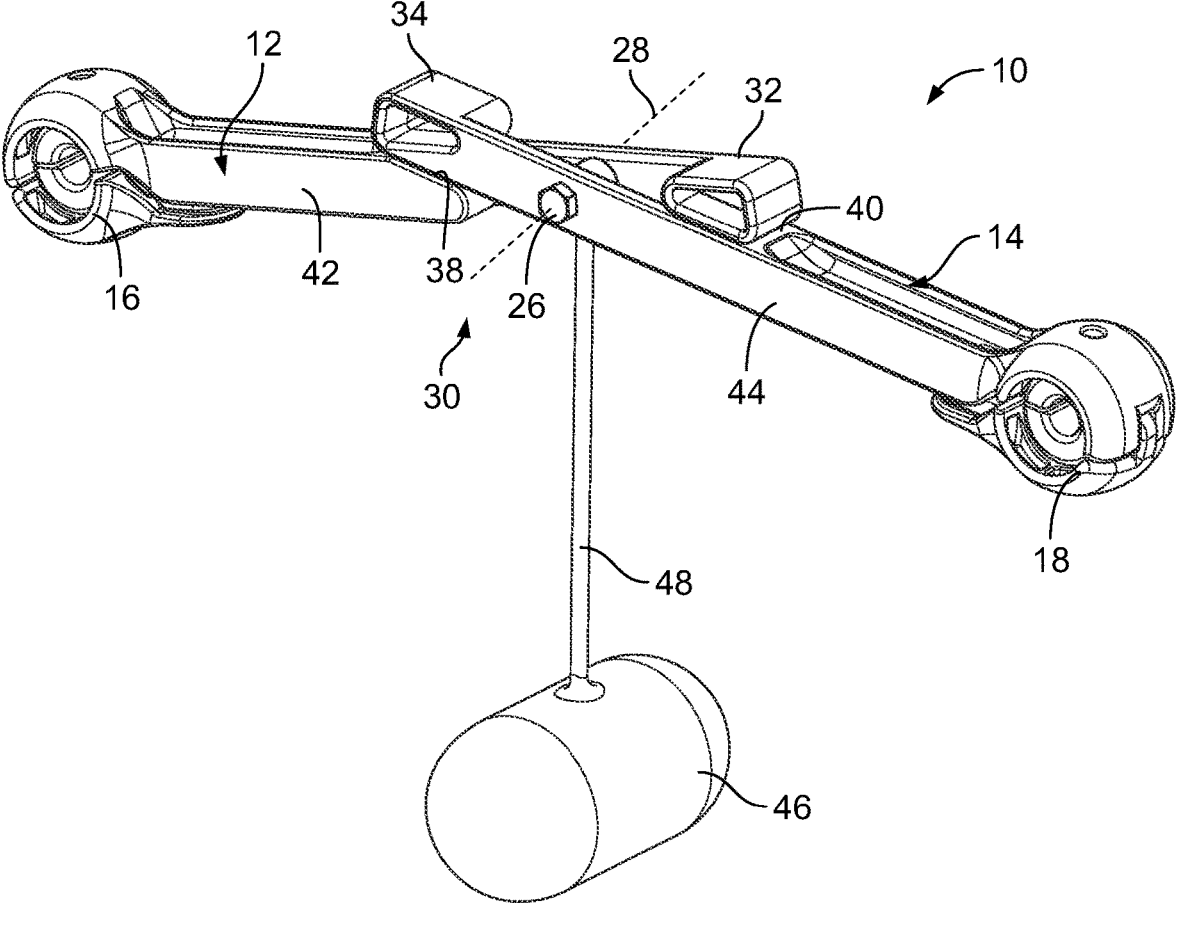
FIG. 3 is a perspective illustration of an example bundle spacer in accordance with at least one aspect of the present disclosure.

Referring to FIG. 3, an example of a bundle spacer 10 is shown. The bundle spacer 10 is for association/attachment to two electrical lines and is for maintenance of proper spacing between the lines, but also permits movement of the electrical lines via selective collapse of the bundle spacer 10.

The bundle spacer 10 includes first and second arms 12, 14. Each arm 12, 14 terminates at a respective connector 16, 18 (i.e., respective first and second connectors) for attachment to a respective electrical line. At the connectors 16, 18, each respective arm includes structures for attachment to the respective electrical line. Such structures may include clamping and/or gripping components (e.g., pivoted clamp with a tightening bolt), line protective/buffering components (e.g., a resilient grommet), and the like. Examples of such structures for attachment to electrical lines are known and such known structures may be utilized within the bundle spacer 10. Of course, other, different to-be-developed structures for attachment to electrical lines may also be utilized within the bundle spacer 10. As such, the specifics of the structures for attachment to the respective electrical line need not be specific limitations. Also, it is to be understood that the present disclosure includes the aspect of bundle spacers that have more than two connectors for association with more than two electrical lines. Thus, the examples, such as the example of FIG. 3 and other examples with two connectors for two electrical lines, need not be limitations upon the present disclosure. It is to be noted than other examples that have more than two (e.g., three) connectors for association with more than two (e.g., three) electrical lines are presented below within this disclosure. However, even those examples (e.g., with the number being three) need not be limitations upon the present disclosure. Thus, the present disclosure includes the number of connectors/electrical lines being two, three, four, or more.

Focusing again upon the example of FIG. 3, the first and second arms 12, 14 are pivotally connected to each other via a pivot member 26. The pivot member 26 may be a pin, bolt or similar that permits the first and second arms 12, 14 to pivotally move relative to each other about a pivot axis 28 that extends along the length of the pivot member 26. Such pivot movement may be described as a scissor movement of the first and second arms 12, 14.

In broad terms, the first and second arms 12, 14 between the respective connectors 16, 18 and the pivot member 26 connecting the first and second arms 12, 14 provide at least parts of an example body 30. It is to be appreciated that the body 30 is interposed between the first line connector and the second line connector. The body 30 is actuatable to provide a variable distance between the first line connector and the second line connector and the first electrical line and the second electrical line connected thereto. As such the body 30 is a dynamic body and within one aspect provides for a selectable collapsible as is described further following.

It is to be appreciated that contemporaneously with the pivot movement of the arms 12, 14, electrical lines, to which the connectors 16, 18 are attached, also move. Specifically, in the reference frame of the pivot axis 28 of the pivot member 26, the connectors 16, 18, and electrical lines therein, move in arcs. It is to be noted that as shown within FIG. 3, the connectors 16, 18, and electrical lines therein, are at positions that are relatively spaced away from each other. However, it is to be noted that as the connectors 16, 18, and electrical lines therein, move (i.e., in arcs about the pivot axis 28 of the pivot member 26), the connectors 16, 18, and electrical lines therein, may move closer to each other. It is to be noted that simultaneously with the connectors 16, 18, and electrical lines therein, moving closer to each other, the pivot axis 28 of the pivot member 26 is moved relatively higher relative to the connectors 16, 18, and electrical lines therein. Thus, the body 30 is actuatable to provide a variable distance between the first line connector 16 and the second line connector 16, and, accordingly, the distance between the first electrical line and the second electrical line connected thereto also is variable.

Each of the first and second arms 12, 14 includes a respective distal end portion 32, 34 that is located at the opposite end from the respective connectors 16, 18. These distal end portion 32, 34 also pivotally move about the pivot axis 28 of the pivot member 26.

Within the shown example, each of the first and second arms 12, 14 includes a respective stop surface 38, 40 located midway along the respective arm between the respective connector 16, 18 and the respective distal end portion 32, 34. For the position shown within FIG. 3 (i.e., having a relatively large spacing between the respective connectors 16, 18, and the electrical line therein), the distal end portion 32, 34 of each of the first and second arms 12, 14 abuts against the respective stop surface 38, 40 of the other arm. As such, FIG. 3 shows a "rest" position, with each of the first and second arms 12, 14 resting upon the respective stop surface 38, 40 of the other arm. Within the shown example of FIG. 3, the "rest" position is such that the first and second arms 12, 14 are not at an angle of 180° relative to each other and relative to the axis 28. Within the shown example of FIG. 3, the "rest" position is such that the first and second arms 12, 14 are at an obtuse angle relative to each other that is less than 180° and greater than 90°.

Within such "rest" position, the respective connectors 16, 18, and the electrical line therein, are at a greatest separation distance for the shown example of FIG. 3. Such is due to the presence of the stop surfaces 38, 40. It is to be noted that different separation distances may be obtained by modifications to the shown example of FIG. 3. For example, lengths of respective segments 42, 44 of the first and second arms 12, 14 that are between the respective connectors 16, 18 and the pivot member 26 may be modified. As another example, the location of the pivot member 26 along the extents of the first and second arms 12, 14 may be modified. As another example, the placement/configuration of the stop surfaces 38, 40 upon the first and second arms 12, 14 may be modified. All modification to obtain different separation distances are within the scope of the present disclosure.

A weight 46 is included within the bundle spacer 10 of FIG. 3. The weight 46 is to provide a bias force that urges (e.g., pulls) the first and second arms 12, 14 toward the rest position that is shown with FIG. 3. Such bias force is a gravity force that pulls the weight 46 relatively downward. Thus, the weight 46 is an example of a bias device.

Within the shown example of FIG. 3, note that the weight 46 is attached to the pivot member 26. Within the shown example, the weight 46 is connected via a suspension arm 48 to the pivot member 26. As such, the pulling force, via gravity, from the weight 46 is upon the pivot member 26. The pivot member 26 thus pulls downward upon the first and second arms 12, 14 at the location of the pivot axis 28. Such downward pulling force urges the distal end portions 32, 34 against the stop surfaces 38, 40 and thus also urges the connectors 16, 18, and electrical lines therein, relatively outward and away from each other. It is to be noted that, upon the occurrence of the connectors 16, 18, and electrical lines therein, being moved toward each other, the pivot member 26, and the attached weight 46, are moved relatively upward (i.e., relatively raised) and that such raising is against the bias of the downward pulling force of gravity.

It is to be appreciated that the use/placement of weight(s) within the bundle spacer 10 may be varied. For example, the weight 46 may be place above the pivot member 26. A downward force from gravity would still exist. Moreover, one or more weighs/weighted portions, which of course are subject to downward force from gravity, may be placed on/within the bundle spacer 10 so as to provide the bias force that biases the bundle spacer toward the rest position. For example, note that the distal end portions 32, 34 are shown in FIG. 3 to have hollow recesses. Weights may be placed into such hollow recesses. Recall that the first and second arms 12, 14 have a scissor action during pivot movement. As such, the distal end portions 32, 34 are relatively raised contemporaneous with the occurrence of the connectors 16, 18, and electrical lines therein, being moved toward each other. Thus, the relative raising (i.e., movement relatively upward) of the weighted distal end portions 32, 34 is against the bias of the downward pulling force of gravity.

It is to be appreciated that the amount of bias force provided by the weight(s) (e.g., weight 46) may be varied. Such variance may be due to size of the weight(s) and/or placement of the weight(s), etc. It is to be appreciated that all of the possible variations regarding use, number, size, placement, shape, etc. regarding weight(s) are contemplated and within the scope of the present application.

It is to be appreciated that the provided bias force that biases the bundle spacer 10 toward the rest position would be in opposition to one or more forces that may tend to urge the connectors 16, 18, and electrical lines therein, relatively toward each other. Herein such forces that may tend to urge such movement may be termed "approach-urging" forces in that such forces urge the connectors 16, 18, and electrical lines therein, to approach each other.

As such, it is to be broadly appreciated within one example aspect, the relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance. It is to be noted that the present disclosure includes the aspect of more than two line connectors for association with more than two electrical lines.

It is to be noted that an event that may be associated with the presence of an approach-urging force is a rare short circuit event. During such an event, an extremely large amount of current will briefly pass through the electrical lines. This high amount of current creates a substantial magnetic field around each electrical line. These magnetic fields cause the electrical lines to be attracted (i.e., approach-urging) towards one another. For some examples, the approach-urging force may exceed 5000 lbs.

It is to be appreciated that if the approach-urging force is greater than the bias force provided by the weight 46 (or other weight(s)), the first and second arm 12, 14 may move such that the connectors 16, 18, and electrical lines therein, approach each other.

It is to be noted that the amount of movement of the connectors 16, 18, and electrical lines therein, toward each other may be varied and dependent upon various factors, etc. It contemplated that the bundle spacer 10 may be constructed/configured such that the connectors 16, 18, and electrical lines therein, may be permitted to move toward each other until touching occurs. It is also contemplated that the bundle spacer 10 may be constructed/configured such that the connectors 16, 18, and electrical lines therein, are stopped and prohibited from touching. For examples in which the touching is prohibited, a final gap space between the connectors 16, 18, and electrical lines therein, at the point of stoppage may have any dimension. Various final gap space dimensions are contemplated. As such variants regarding the permitted movement toward touching and/or stoppage prior to touching are contemplated and within the scope of the present disclosure.

It is to be appreciated that the permitted movement of the connectors 16, 18, and electrical lines therein, toward each other may help prevent damage from occurring to the electrical lines. For some examples, the permitted movement may help prevent birdcaging. Of course, other damage may be prevented. It is to be appreciated, after the movement, which may prevent damage, the bundle spacer 10 returns the electrical lines to the distance-spacing associated with the rest position of the bundle spacer.

Figure 4:
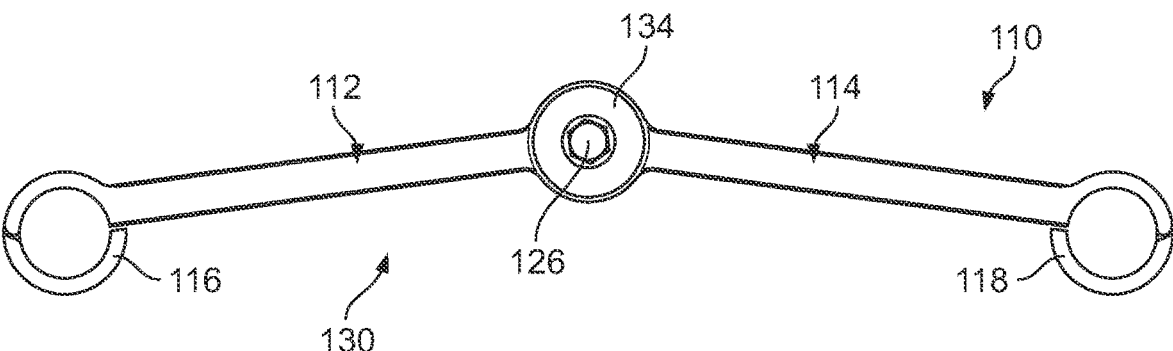
FIG. 4 is a plan view illustration of another example bundle spacer in accordance with at least one aspect of the present disclosure.
Figure 5:
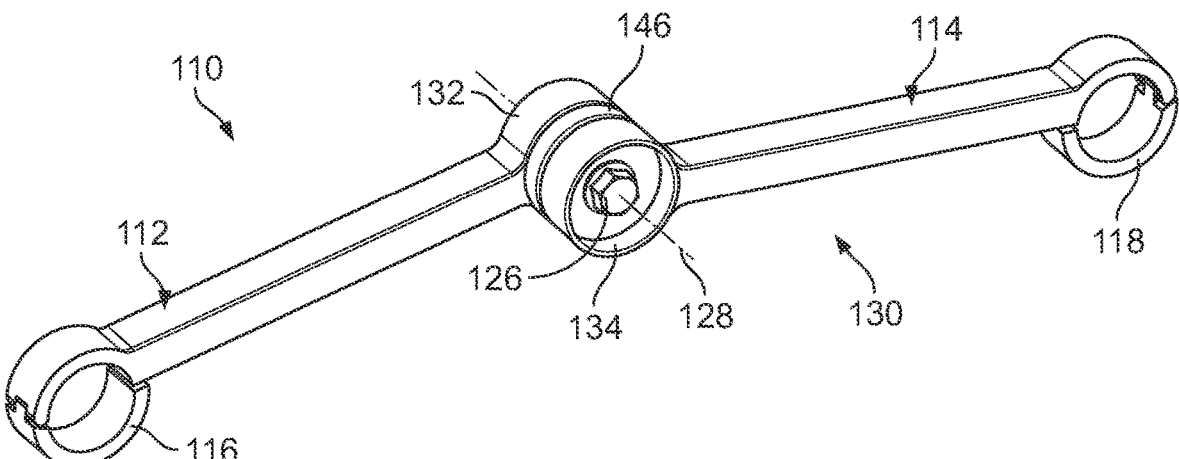
FIG. 5 is a perspective view illustration of the example bundle spacer of FIG. 4.
Figure 6:
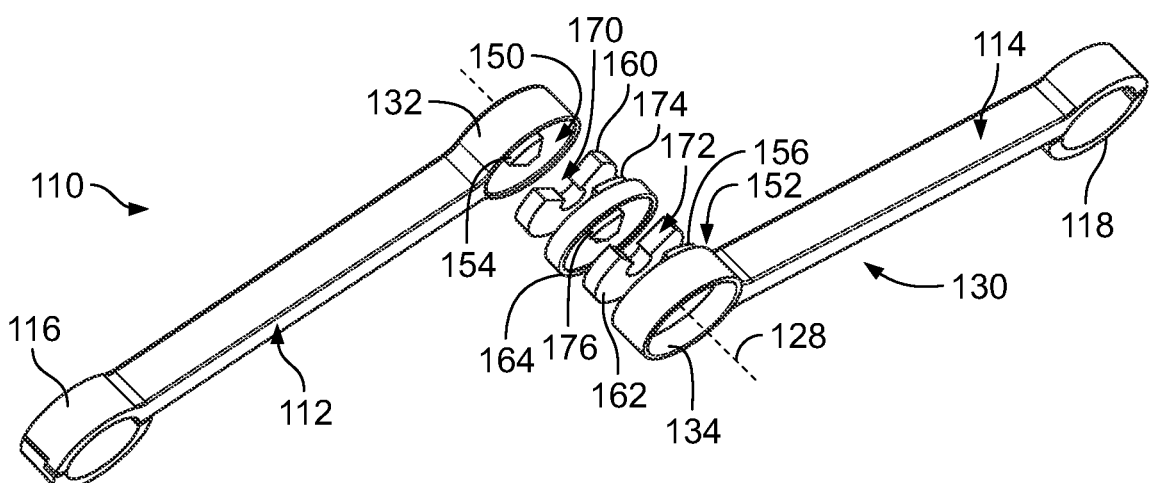
FIG. 6 is an exploded, perspective view illustration of the example bundle spacer of FIG. 4.

Referring to FIGS. 4-6, an example of a bundle spacer 110 is shown. The bundle spacer 110 is for association/connection to two electrical lines and is for maintenance of proper spacing between the lines, but also permits movement of the electrical lines via selective collapse of the bundle spacer 110.

The bundle spacer 110 includes first and second arms 112, 114. Each arm 112, 114 includes a respective connector 116, 118 (i.e., first and second connectors) for attachment to a respective electrical line. At the connectors 116, 118, each respective arm includes structures for attachment to the respective electrical line. Such structures may include clamping and/or gripping components (e.g., pivoted clamp with a tightening bolt), line protective/buffering components (e.g., a resilient grommet), and the like. Examples of such structures for attachment to electrical lines are known and such known structures may be utilized within the bundle spacer 110. Of course, other, different to-be-developed structures for attachment to electrical lines may also be utilized within the bundle spacer 110. As such, the specifics of the structures for attachment to the respective electrical line need not be specific limitations.

Each of the first and second arms 112, 114 includes a respective distal end portion 132, 134 that is located at the opposite end from the respective connectors 116, 118. The first and second arms 112, 114 are pivotally connected to each other at the distal end portions 132, 134 via a pivot member 126. The pivot member 126 may be a pin, bolt or similar that permits the first and second arms 112, 114 to pivotally move relative to each other about a pivot axis 128 (see FIGS. 5 and 6) that extends along the length of the pivot member. Such pivot movement may be described as an articulating movement of the first and second arms 112, 114. As will be discussed further following, the position of the first and second arms 112, 114 shown within FIGS. 4 and 5, may be considered to be a rest position for the bundle spacer 110.

It is to be appreciated that contemporaneously with the pivot movement of the first and second arms 112, 114, the electrical lines, to which the connectors 116, 118 are attached, also move. Specifically, in the reference frame of the pivot axis 128 of the pivot member 126, the connectors 116, 118, and electrical lines therein, move in arcs. It is to be noted that as shown within FIGS. 4 and 5, the connectors 116, 118, and electrical lines therein, are at positions that are relatively spaced away from each other. However, it is to be noted that as the connectors 116, 118, and electrical lines therein, move (i.e., in arcs about the pivot axis 128 of the pivot member 126), the connectors 116, 118, and electrical lines therein, may move closer to each other. It is to be noted that simultaneously with the connectors 116, 118, and electrical lines therein, moving closer to each other, the pivot axis 128 of the pivot member 126 is moved relatively higher relative to the connectors 116, 118, and electrical lines therein.

Focusing upon the distal end portions 132, 134 of the first and second arms 112, 114, each distal end portion in configured to have a respective hollow, annular recess 150, 152 (FIG. 6). Within each recess, a respective mechanical stop 154, 156 is provided. Each mechanical stop 154, 156 may be a projection that is within the respective recess 150, 152 that extends toward the opposite one of the first and second arms 112, 114. Each mechanical stop (i.e., projection) 154, 156 is radially spaced away from the axis 128 and the extension of the mechanical stop (i.e., projection) is parallel to the axis. Each mechanical stop (i.e., projection) 154, 156 is located at a respective sector of the annular space that is within the respective annular recess 150, 152 as referenced from the axis 128.

The example bundle spacer 110 includes one or more part(s) located between the first and second arms 112, 114. Specifically, the shown example has a series of parts that are located at/between the distal end portions 132, 134. The part(s) include at least one resilient bias member (e.g., 160). Within the shown example, the parts include two resilient bias members 160, 162 and an interposed disk 164.

Focusing upon the two bias members 160, 162, each bias member provides a rotational bias force that urges the first and second arms 112, 114 toward the rest position (see FIGS. 4 and 5). The bias members 160, 162 may have a variety of types, constructions, configurations, etc. For some examples, the bias members 160, 162 may be torsion springs. For some examples, the bias members 160, 162 may be coiled springs, such as compression springs or extension springs, with each coil spring being warped to follow a portion of the respective recess 150, 152. For some examples, the bias members 160, 162 may be resiliently compressive or expansive material (e.g., elastomeric or foam material). It is to be appreciated that many variations of the bias members 160, 162, and thus associated structures/configurations, are contemplated and are within the scope of the present disclosure. Such variety of bias members 160, 162 may be generally referred to be spring cushions.

Focusing upon the example shown within FIG. 6, the bias members 160, 162 are each resiliently compressive material (e.g., elastomeric or foam material). Each bias member 160, 162 has a general annular shape extending around the axis 128. However, each bias member 160, 162 has a respective gap space 170, 172 at a respective sector of the otherwise annular shape of the respective bias member, as referenced from the axis 128.

The bias member 160 is located within the recess 150 of the first arm 112. The bias member 160 is located relative to the mechanical stop (i.e., projection) 154 such that the mechanical stop 154 is located within the gap space 170 of the bias member 160.

The bias member 162 is located within the recess 152 of the second arm 114. The bias member 162 is located relative to the mechanical stop (i.e., projection) 156 such that the mechanical stop 156 is located within the gap space 172 of the bias member 162.

Turning to the interposed disk 164, the disk is axially supported by the pivot member (e.g., bolt, pin or the like) 126. Also, the disk 164 is rotatable relative to the first arm 112, and the disk 164 is rotatable relative to the second arm 114. One face of the disk 164 is directed toward the bias member 160, which is located within the recess 150 of the first arm 112, and the other face of the disk is directed toward the bias member 162, which is located within the recess 152 of the second arm 114.

Each face of the disk 164 is provided with a respective mechanical stop 174, 176. Each mechanical stop 174, 176 may be a projection that extends outwardly from the respective face of the disk 164. Each mechanical stop (i.e., projection) 174, 176 is radially spaced away from the axis 128 and the extension of the mechanical stop (i.e., projection) is parallel to the axis. Each mechanical stop (i.e., projection) 174, 176 is located at a respective sector of the disk 174 as referenced from the axis 128.

With the bias member 160 being located within the recess 150 and the mechanical stop 154 being located within the gap space 170 of the bias member 160, the mechanical stop 174 is also located within the gap space 170 of the bias member 160. The mechanical stop 174 is located adjacent to the mechanical stop 154. Another way of presenting such relationship is that the mechanical stop 154 is located within one portion of the sector associated within the gap space 170 and the mechanical stop 174 is located within another portion of the sector associated within the gap space 170. So, the mechanical stop 154 may abut/engage the bias member 160 at one end of the gap space 170 and the mechanical stop 174 may abut/engage the bias member 160 at the other end of the gap space 170.

With the bias member 162 being located within the recess 152 and the mechanical stop 156 being located within the gap space 172 of the bias member 162, the mechanical stop 176 is also located within the gap space 172 of the bias member 162. The mechanical stop 176 is located adjacent to the mechanical stop 156. Another way of presenting such relationship is that the mechanical stop 156 is located within one portion of the sector associated within the gap space 172 and the mechanical stop 176 is located within another portion of the sector associated within the gap space 172. So, the mechanical stop 156 may abut/engage the bias member 162 at one end of the gap space 172 and the mechanical stop 176 may abut/engage the bias member 162 at the other end of the gap space 172.

It is to be appreciated that relative rotation of the first and second arms 112, 114, with the first arm 112 rotating relatively counterclockwise and the second arm 114 rotating relatively clockwise, the bias members 160, 162 are resiliently compressed. Specifically, the bias member 160 is compressed between the mechanical stop 154 and the mechanical stop 174, and the bias member 162 is compressed between the mechanical stop 156 and the mechanical stop 176. Of course, a response to compression, each bias member 160, 162 responses with an urging force that urges decompression. Thus, the bias member 160 and/or the bias member 162 is/are examples of parts of a bias device. Such, urging force is a force urging the bundle spacer 110 toward its rest position as discussed further following.

With the shown example of the bundle spacer 110, bias members 160, 162 are not compressed when the mechanical stops 154, 156 and the mechanical stops 174, 176 exert zero or only de minimis force upon the bias members 160, 162. Such a state (e.g., non-compressed) of the bias members 160, 162 may be considered a resting condition of the bias members 160, 162. Such would occur when the mechanical stops 154, 156 and the mechanical stops 174, 176 are merely resting upon the bias members 160, 162. Another way of considering such topic is that the mechanical stops 154, 156 and/or the mechanical stops 174, 176 are not engaging the bias members 160, 162 or are merely touching, without pressing, upon the bias members 160, 162. The resting condition of the bias members 160, 162 is associated with the overall "rest" position of the bundle spacer 110 (see FIGS. 4 and 5).

Within the shown example of FIGS. 4 and 5, the "rest" position is such that the first and second arms 112, 114 are not at an angle of 180° relative to each other and relative to the axis 128. Within the shown example of FIGS. 4 and 5, the "rest" position is such that the first and second arms 112, 114 are at an obtuse angle relative to each other that is less than 180° and greater than 90°.

Within such "rest" position, the respective connectors 116, 118, and the electrical line therein, are at a greatest separation distance for the shown example of FIGS. 4 and 5. Such is due to the bias members 160, 162 being uncompressed. It is to be noted that different separation distances may be obtained by modifications to the shown example of FIGS. 4-6. For example, the lengths of the first and second arms 112, 114 may be modified, the sizes, dimensions, lengths, etc. of the mechanical stops 154, 156, and/or the mechanical stops 174, 176, and/or members 160, 162, including the gap spaces 170, 172 therein, may be modified. Various modifications are contemplated and are within the scope of the present disclosure.

Again, it is to be appreciated that bias members 160, 162 urge the connectors 116, 118, and electrical lines therein, outwardly away from each other and thus toward the rest position. It is to be noted that, upon the occurrence of the connectors 116, 118, and electrical lines therein, being moved toward each other, the bias members 160, 162 are compressed. The compression provides the outward bias force. As mentioned, the amount of bias force may be varied, and that variance is contemplated and within the scope of the present application.

The provided bias force that biases the bundle spacer 110 toward the rest position would be in opposition to one or more forces that may tend to urge the connectors 116, 118, and electrical lines therein, relatively toward each other. Herein such forces that may tend to urge such movement may be termed "approach-urging" forces in that such forces urge the connectors 116, 118, and electrical lines therein, to approach each other.

In broad terms, the first and second arms 112, 114 between the respective connectors 116, 118, the pivot member 126, the bias members 160, 162 and the disk 164 provide at least parts of an example body 130. It is to be appreciated that the body 130 is interposed between the first line connector 116 and the second line connector 118. The body 130 is actuatable to provide a variable distance between the first line connector and the second line connector and the first electrical line and the second electrical line connected thereto. As such the body 130 is a dynamic body and within one aspect provides for a selectable collapse. Thus, the body 130 is actuatable to provide a variable distance between the first line connector 116 and the second line connector 116, and, accordingly, the distance between the first electrical line and the second electrical line connected thereto also is variable. As such, it is to be broadly appreciated within one example aspect, the relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance. It is to be noted that the present disclosure includes the aspect of more than two line connectors for association with more than two electrical lines.

It is to be noted that an event that may be associated with the presence of an approach-urging force is a rare short circuit event. During such an event, an extremely large amount of current will briefly pass through the electrical lines. This high amount of current creates a substantial magnetic field around each electrical line. These magnetic fields cause the electrical lines to be attracted (i.e., approach-urging) towards one another. For some examples, the approach-urging force may exceed 5000 lbs.

It is to be noted that the amount of movement of the connectors 116, 118, and electrical lines therein, toward each other may be varied and dependent upon various factors, etc.

It contemplated that the bundle spacer 110 may be constructed/configured such that the connectors 116, 118, and electrical lines therein, may be permitted to move toward each other until touching occurs. It is also contemplated that the bundle spacer 110 may be constructed/configured such that the connectors 116, 118, and electrical lines therein, are stopped and prohibited from touching. For examples in which the touching is prohibited, a final gap space between the connectors 16, 18, and electrical lines therein, at the point of stoppage may have any dimension. Various final gap space dimensions are contemplated. As such variants regarding the permitted movement toward touching and/or stoppage prior to touching are contemplated and within the scope of the present disclosure.

It is to be appreciated that the permitted movement of the connectors 116, 118, and electrical lines therein, toward each other may help prevent damage from occurring to the electrical lines. For some examples, the permitted movement may help prevent birdcaging. Of course, other damage may be prevented. It is to be appreciated, after the movement, which may prevent damage, the bundle spacer 110 returns the electrical lines to the distance-spacing associated with the rest position of the bundle spacer.

Figure 7:
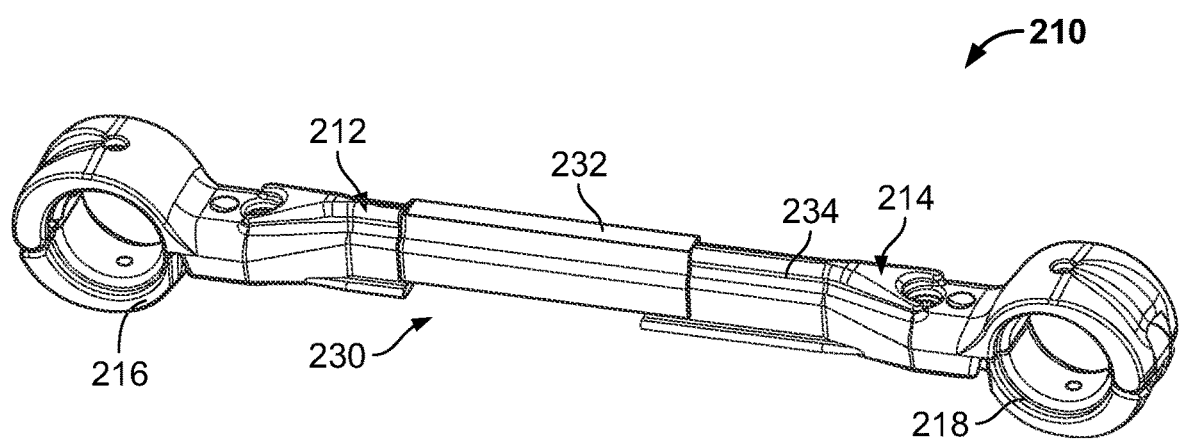
FIG. 7 is a perspective view illustration of another example bundle spacer in accordance with at least one aspect of the present disclosure.
Figure 8:
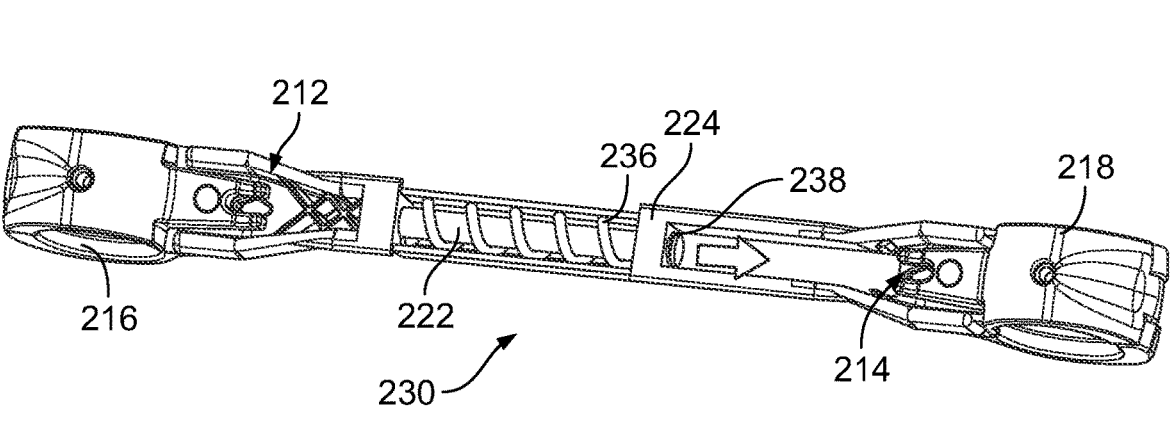
FIG. 8 is a reverse angle perspective view illustration of the example bundle spacer of FIG. 7.
Figure 9:
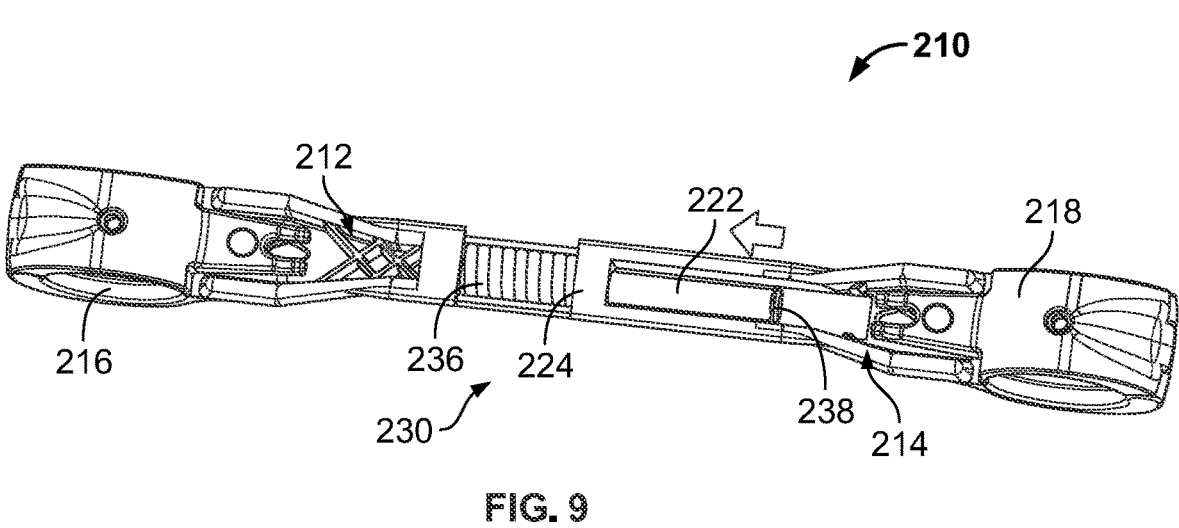
FIG. 9 is a view similar to FIG. 8, but the view is slightly enlarged and the view is subsequent to a compressive force applied to the example bundle spacer and relative movement of some portions of the example bundle spacer.

Referring to FIGS. 7-9, an example of a bundle spacer 210 is shown. The bundle spacer 210 is for association/connection to two electrical lines and is for maintenance of proper spacing between the lines, but also permits movement of the electrical lines via selective collapse of the bundle spacer 10.

The bundle spacer 210 includes first and second arms 212, 214. Each arm 212, 214 includes a respective connector 216, 218 for attachment to a respective electrical line. At the connectors 216, 218, each respective arm includes structures for attachment to the respective electrical line. Such structures may include clamping and/or gripping components (e.g., pivoted clamp with a tightening bolt), line protective/ buffering components (e.g., a resilient grommet), and the like. Examples of such structures for attachment to electrical lines are known and such known structures may be utilized within the bundle spacer 210. Of course, other, different to-be-developed structures for attachment to electrical lines may also be utilized within the bundle spacer 210. As such, the specifics of the structures for attachment to the respective electrical line need not be specific limitations.

Each of the first and second arms 212, 214 includes a respective inter-fitting guide track portions 232, 234 that are respectively located away from the respective connectors 216, 218. The inter-fitting guide track portions 232, 234 engage each other and allow relative sliding against each other. Such relative sliding allows the first and second arms 212, 214 to relatively move, linearly relative to each other. The relative linear sliding of the first and second arms 212, 214 varies the overall distance of the bundle spacer 210. Please see that FIGS. 7 and 8 show the bundle spacer 210 at a relatively longer length, and that FIG. 9 shows the bundle spacer 210 at a relatively shorter length (recall that FIG. 9 is slightly enlarged compared to FIGS. 7 and 8, so direct measurements taken from the figures should be in consideration of such enlargement). As will be discussed further following, the position of the first and second arms 212, 214 shown within FIGS. 7 and 8, may be considered to be a rest position for the bundle spacer 210.

The inter-fitting guide track portions 232, 234 may have any of various constructions/configurations to allow the relative sliding. As such, various grooves, channels, walls, projections, etc. may be utilized. Such various constructions/ configurations are within the scope of the present disclosure. It is to be appreciated that the linear movement of the first and second arms 212, 214 may be described as a telescoping movement of the first and second arms 212, 214.

It is to be appreciated that contemporaneously with the linear (e.g., telescoping) movement of the first and second arms 212, 214, the electrical lines, to which the connectors 216, 218 are attached, also move. Specifically, the connectors 216, 218, and electrical lines therein, move linearly toward, or away, from each other. It is to be noted that as shown within FIGS. 7 and 8, the connectors 216, 218, and electrical lines therein, are at positions that are relatively spaced away from each other a greatest amount. It is to be noted that as shown within FIG. 9, the connectors 216, 218, and electrical lines therein, are at positions that are relatively spaced away from each other a smallest amount. It is to be noted that simultaneously with the connectors 216, 218, and electrical lines therein, moving closer to each other, the first and second arms 212, 214 telescope into each other at the inter-fitting guide track portions 232, 234.

The example bundle spacer 210 includes one or more part(s), structures, constructions/configurations, etc. located therebetween the first and second arms 212, 214 that allow the first and second arms to relatively slide and also provide a resistance to sliding that reduces the overall length of the bundle spacer 210. The provided resistance is a bias toward the bundle spacer 210 having the greatest length as shown in FIGS. 7 and 8. It is to be appreciated that the part(s), structures, constructions/configurations, etc. that allow the sliding movement, but resist/provide bias, many be varied. Such variations are within the scope of the present disclosure.

Within the shown example, FIGS. 8 and 9 show an example of such possible variations. Note that the first arm 212 includes a guide pin 222 fixed thereon that may slide through a portion 224 of the second arm 214. A compression coil spring 236 extends in a helix around the guide pin 222 and abuts against the portion 224 of the second arm 214. The coil spring 236 provides a force that bias the coil spring 236 to expand along its axial length (i.e., along the guide pin 222). As such the coil spring 236 biases the bundle spacer 210 to have its greatest length (i.e., as shown in FIGS. 7 and 8). Moreover, the coil spring 236 biases the first and second arms 212, 214 such that the connectors 216, 218, and electrical lines therein, are furthest apart (i.e., as shown in FIGS. 7 and 8). Thus, the coil spring 236 is an example part of a bias device. In order to retain the first and second arms 212, 214 together (i.e., prevent disassembly), a snap ring 238 is secured to an end portion of the guide pin 222 on the side of the portion opposite to the side against which the coil spring 236 abuts.

In broad terms, the first and second arms 212, 214 between the respective connectors 216, 218, the guide pin 222 and the coil spring 236 provide at least parts of an example body 230. It is to be appreciated that the body 230 is interposed between the first line connector 216 and the second line connector 218. The body 230 is actuatable to provide a variable distance between the first line connector and the second line connector and the first electrical line and the second electrical line connected thereto. As such the body 230 is a dynamic body and within one aspect provides for a selectable collapse. Thus, the body 230 is actuatable to provide a variable distance between the first line connector 216 and the second line connector 216, and, accordingly, the distance between the first electrical line and the second electrical line connected thereto also is variable.

Within the shown example of the bundle spacer 210, the coil spring 236 has no or low compression for the position shown within FIGS. 7 and 8. With the no or low compression the coil spring 236 exerts zero or only de minimis force to urge the first and second arms 212, 214 further apart. Such may be considered a resting condition of the bundle spacer 210. Within such "rest" position, the respective connectors 216, 218, and the electrical line therein, are at a greatest separation distance.

It is to be noted that, upon the occurrence of the connectors 216, 218, and electrical lines therein, being moved toward each other, the coil spring 236 is compressed. The compression provides the outward bias force. As mentioned, the amount of bias force may be varied, and that variance is contemplated and within the scope of the present application. The provided bias force that biases the bundle spacer 110 toward the rest position would be in opposition to one or more forces that may tend to urge the connectors 216, 218, and electrical lines therein, relatively toward each other. Herein such forces that may tend to urge such movement may be termed "approach-urging" forces in that such forces urge the connectors 216, 218, and electrical lines therein, to approach each other.

As such, it is to be broadly appreciated within one example aspect, the relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance.

It is to be noted that an event that may be associated with the presence of an approach-urging force is a rare short circuit event. During such an event, an extremely large amount of current will briefly pass through the electrical lines. This high amount of current creates a substantial magnetic field around each electrical line. These magnetic fields cause the electrical lines to be attracted (i.e., approach-urging) towards one another. For some examples, the approach-urging force may exceed 5000 lbs.

A maximum spring compression, and blocking of further relative movement, is shown within FIG. 9. Note that the coil spring 236 is completely compressed such that all of the coil segments of the coil spring touch each other. Such complete compression of the coil spring 236 acts as a stop against further movement. Note that a maximum relative travel distance between the first and second arms 212, 214 is indicated by the amount of distance that the guide pin 222 now extends out from the portion 224 of the second arm 214. Such maximum relative travel distance occurs when the connectors 216, 218, and electrical lines therein, are at a closest permitted distance.

It is to be noted that the amount of movement of the connectors 216, 218, and electrical lines therein, toward each other may be varied and dependent upon various factors, etc. For example, the lengths of the guide pin 222, the coil spring 236 may be varied to change the relative travel length. Such variations are contemplated and within the scope of the present disclosure.

It is to be appreciated that the permitted movement of the connectors 216, 218, and electrical lines therein, toward each other may help prevent damage from occurring to the electrical lines. For some examples, the permitted movement may help prevent birdcaging. Of course, other damage may be prevented. It is to be appreciated, after the movement, which may prevent damage, the bundle spacer 210 returns the electrical lines to the distance-spacing associated with the rest position of the bundle spacer.

Figure 10:
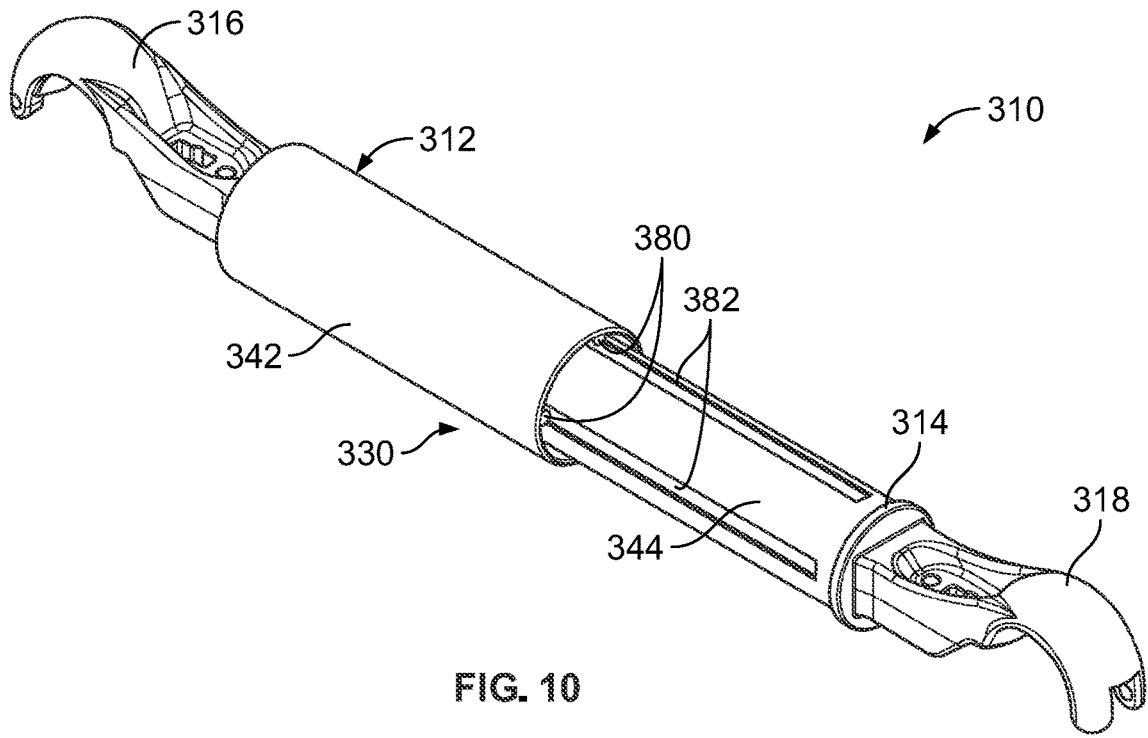
FIG. 10 is a perspective view illustration of another example bundle spacer in accordance with at least one aspect of the present disclosure.
Figures 11A, 11B:
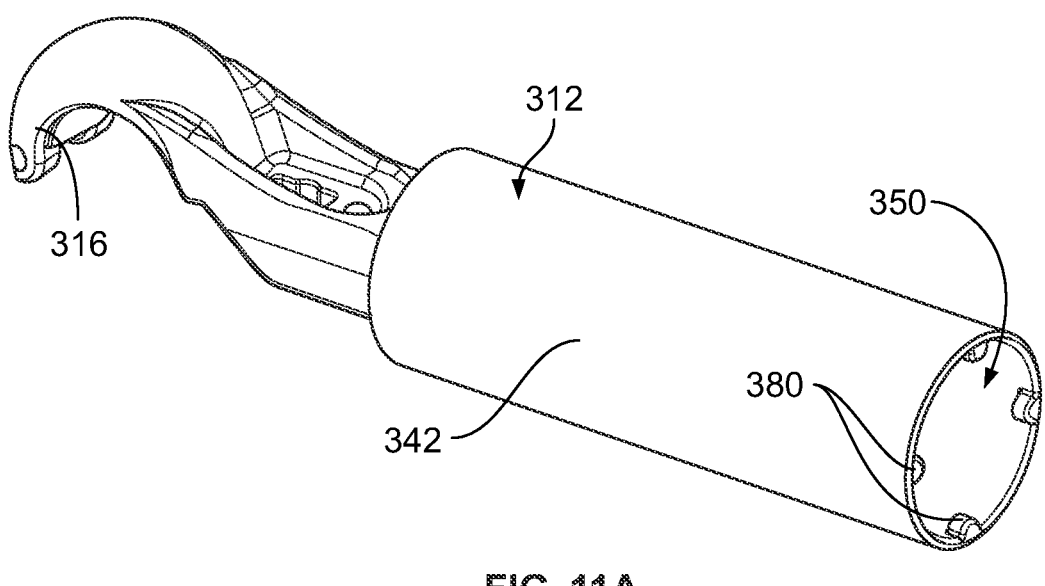
FIGS. 11A and 11B are perspective views of two disassembled portions of the example bundle spacer of FIG. 10.

As mentioned, variations/modifications to the presented examples are contemplated and within the scope of the present disclosure. For example, FIGS. 10, 11A and 11B show an example variation/modification for a linear-movement bundle spacer 310. Recall that FIGS. 7-9 presented an example of a linear movement bundle spacer 210. As such, some of the discussions presented for FIGS. 7-9 and the bundle spacer 210 have general applicability to the bundle spacer 310 (FIGS. 10, 11A and 11B).

As a brief explanation of the variation/difference provide by the bundle spacer 310, the bundle spacer 310 presents the aspect of the first and second arms 312, 314 respectively having concentric and telescoping/plunger tubular segments 342, 344. It is to be appreciated that a bias member, such as a coil spring, would be within a hollow interior 350 (FIG. 11A) of the tubular segment 342 and compressed when the tubular segment 344 telescopes/plunges into the hollow interior 350 of the tubular segment 342. As such, connectors 316, 318 (note that only one half of clamp members shown, it is to be appreciated that clamp will retain the respective electrical lines), and electrical lines therein, would be permitted to move closed together against the bias of the bias member (e.g., coil spring).

It is to be noted that a series of projections 380 on the first arm 312 and grooves 382 on the second arm 314 provide for ease of assembly and for guiding relative linear movement. For example, the first and second arms 312, 314 may be secured together via a quarter turn to align the projections 380 and grooves 382 once the tubular segment 344 of the second arm 314 is initially inserted into the tubular segment 342 of the first arm 312.

In broad terms, the first and second arms 312, 314 between the respective connectors 316, 318 provide at least parts of an example body 330. It is to be appreciated that the body 330 is interposed between the first line connector 316 and the second line connector 318. The body 330 is actuatable to provide a variable distance between the first line connector and the second line connector and the first electrical line and the second electrical line connected thereto. As such the body 330 is a dynamic body and within one aspect provides for a selectable collapse. Thus, the body 330 is actuatable to provide a variable distance between the first line connector 316 and the second line connector 316, and, accordingly, the distance between the first electrical line and the second electrical line connected thereto also is variable. As such, it is to be broadly appreciated within one example aspect, the relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance.

Figure 12:
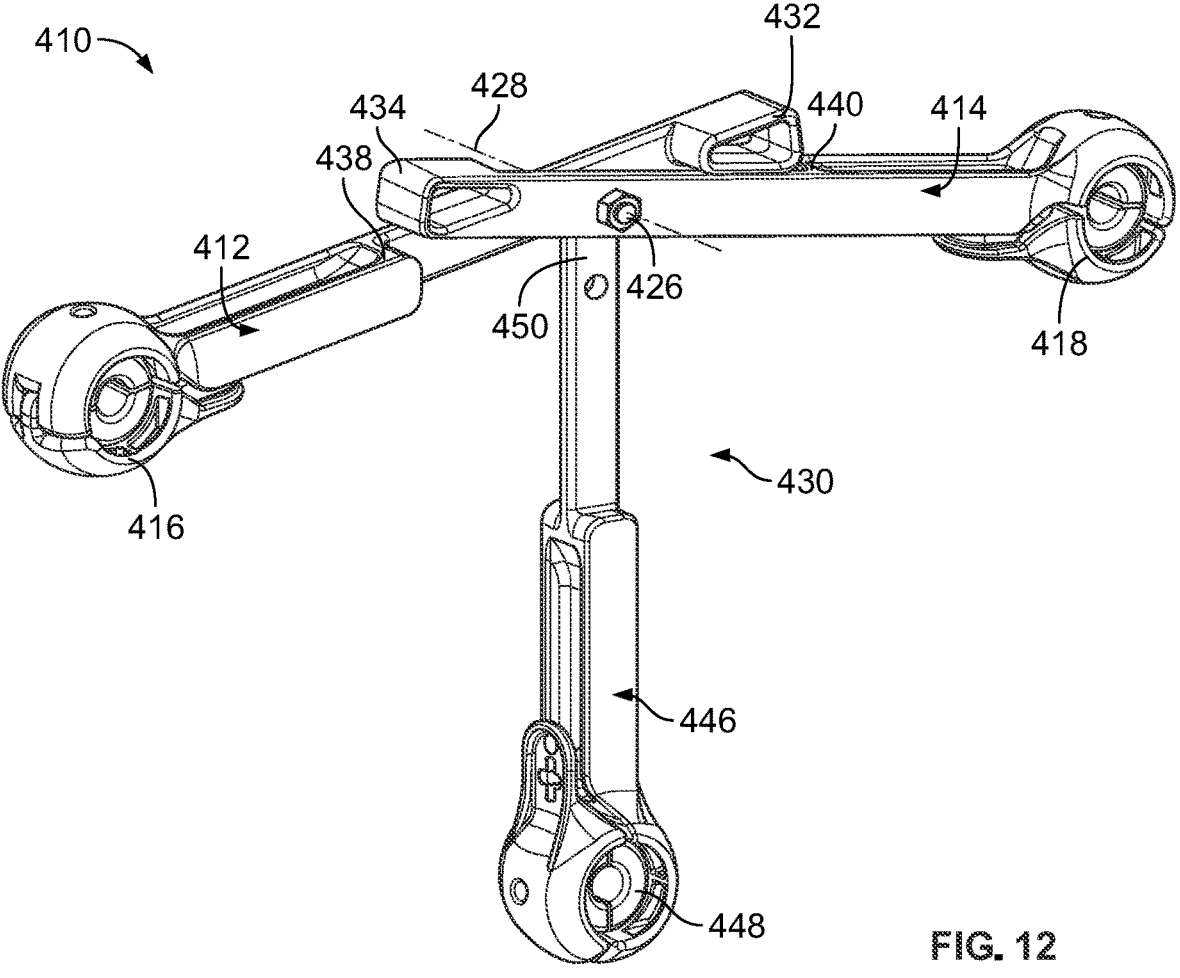
FIG. 12 is a perspective view illustration of another example bundle spacer in accordance with at least one aspect of the present disclosure.
Figure 13:
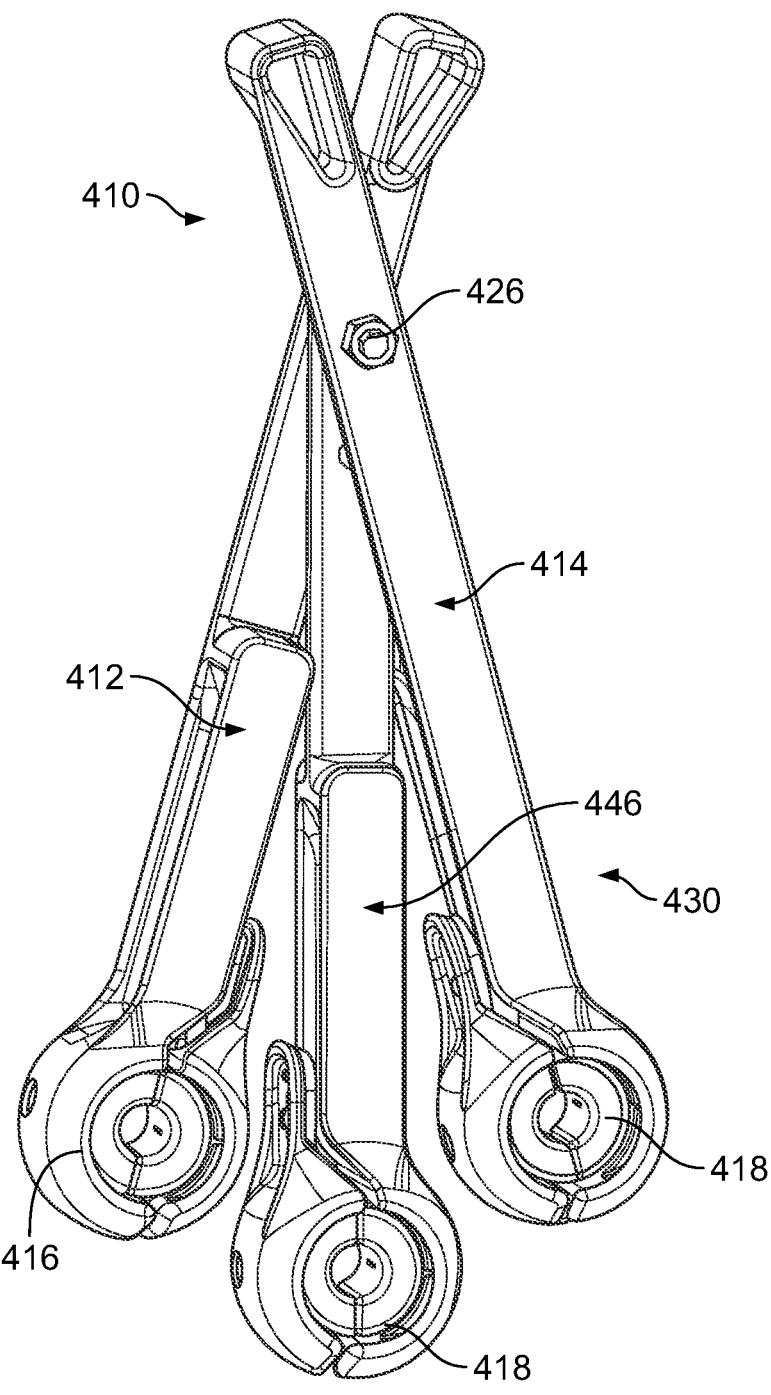
FIG. 13 is a view similar to FIG. 12, but subsequent to a compressive force applied to the example bundle spacer and relative movement of some portions of the example bundle spacer.

The above-presented examples are presented for use with two electrical lines. The present disclosure includes the aspect of bundle spacers that are for use with more than two electrical lines. Within some examples, the number of electrical lines is three. FIGS. 12 and 13 present an example for use with three electrical lines.

Referring to FIG. 12, an example of a bundle spacer 410 is shown. As mentioned, the bundle spacer 410 is for association/connection to three electrical lines and is for maintenance of proper spacing between the lines, but also permits movement of the electrical lines. It is to be noted that the bundle spacer 410 has some similarities to the bundle spacer 10 of FIG. 3. Discussions of the similarities presented concerning the bundle spacer 10 of FIG. 3 are generally applicable to the bundle spacer 410 (FIG. 12).

The bundle spacer 410 includes first and second arms 412, 414. Each arm 412, 414 includes a respective connector 416, 418 for attachment to a respective electrical line. At the connectors 416, 418, each respective arm includes structures for attachment to the respective electrical line. Such structures may include clamping and/or gripping components (e.g., pivoted clamp with a tightening bolt), line protective/buffering components (e.g., a resilient grommet), and the like. Examples of such structures for attachment to electrical lines are known and such known structures may be utilized within the bundle spacer 410. Of course, other, different to-be-developed structures for attachment to electrical lines may also be utilized within the bundle spacer 410. As such, the specifics of the structures for attachment to the respective electrical line need not be specific limitations.

The first and second arms 412, 414 are pivotally connected to each other via a pivot member 426. The pivot member 426 may be a pin, bolt or similar that permits the first and second arms 412, 414 to pivotally move relative to each other about a pivot axis 428 that extends along the length of the pivot member 426. Such pivot movement may be described as a scissor movement of the first and second arms 412, 414.

It is to be appreciated that contemporaneously with the pivot movement of the arms, electrical lines, to which the connectors 416, 418 are attached, also move. Specifically, in the reference frame of the pivot axis 428 of the pivot member 426, the connectors 416, 418, and electrical lines therein, move in arcs. It is to be noted that as shown within FIG. 12, the connectors 416, 418, and electrical lines therein, are at positions that are relatively spaced away from each other. However, it is to be noted that as the connectors 416, 418, and electrical lines therein, move (i.e., in arcs about the pivot axis 428 of the pivot member 426), the connectors 416, 418, and electrical lines therein, may move closer to each other. It is to be noted that simultaneously with the connectors 416, 418, and electrical lines therein, moving closer to each other, the pivot axis 428 of the pivot member 426 is moved relatively higher relative to the connectors 416, 418, and electrical lines therein.

Each of the first and second arms 412, 414 includes a respective distal end portion 432, 434 that is located at the opposite end from the respective connectors 416, 418. These distal end portions 432, 434 also pivotally move about the pivot axis 428 of the pivot member 426.

With the shown example, each of the first and second arms 412, 414 includes a respective stop surface 438, 440 located midway along the respective arm between the respective connector 416, 418 and the respective distal end portion 432, 434. For the position shown within FIG. 12 (i.e., having a relatively large spacing between the respective connectors 416, 418, and the electrical line therein), the distal end portion 432, 434 of each of the first and second arms 412, 414 almost abuts against the respective stop surface 438, 440 of the other arm.

Once the distal end portion 432, 434 of each of the first and second arms 412, 414 abuts against the respective stop surface 438, 440, the bundle spacer 410 would be at "rest." The "rest" position is such that the first and second arms 412, 414 are not at an angle of 180° relative to each other and relative to the axis 428. Within the shown example of FIG. 12, the "rest" position is such that the first and second arms 412, 414 are at an obtuse angle relative to each other that is less than 180° and greater than 90°.

Within such "rest" position, the respective connectors 416, 418, and the electrical line therein, are at a greatest separation distance. Such is due to the presence of the stop surfaces 438, 440. It is to be noted that different separation distances may be obtained by modifications such as similar to the modifications discussed regarding the example of FIG. 3.

In distinction from the example of FIG. 3, the bundle spacer 410 (FIG. 12) includes a third arm 446. The third arm 446 is at the general location of the weight 46 shown within FIG. 3 for the bundle spacer 10. For at least one aspect, the third arm 446 (FIG. 12) may provide at least some of the function(s) of the weight 46 (FIG. 3) for the bundle spacer 10. However, it is to be very clear that the third arm 446 may perform other function(s).

The third arm 446 is pivotally connected, at portion 450, to the first and second arms 412, 414 via the pivot member 426. The third arm 446 includes a respective connector 448 for attachment to a respective, third electrical line. At the connector 448, the third arm 446 includes structures for attachment to the respective electrical line. Such structures may include clamping and/or gripping components (e.g., pivoted clamp with a tightening bolt), line protective/buffering components (e.g., a resilient grommet), and the like. Examples of such structures for attachment to electrical lines are known and such known structures may be utilized within the bundle spacer 410. Of course, other, different to-be-developed structures for attachment to electrical lines may also be utilized within the bundle spacer 410. As such, the specifics of the structures for attachment to the respective electrical line need not be specific limitations.

Within the shown example of FIG. 12, it is to be noted that the third arm 446 and associated third electrical line, are is a suspension position relative to the pivot member 426. As such, the third arm 446 and associated third electrical line may act as a weight and provide as associated weight force, via gravity, to the pivot member 426. The weight force pulls upon the pivot member 426. The pivot member 426 thus pulls downward upon the first and second arms 412, 414 at the location of the pivot axis 428. Such downward pulling force urges the distal end portions 432, 434 against the stop surfaces 438, 440 and thus also urges the connectors 416, 418, and electrical lines therein, relatively outward and away from each other. The downward pulling force is a bias force. Thus, the third arm 446 and associated third electrical line are examples of parts of a bias device.

It is to be noted that, upon the occurrence of the connectors 416, 418, and electrical lines therein, being moved toward each other (see FIG. 13), the pivot member 426, and the third arm 446 and the associated third electrical line, are moved relatively upward (i.e., relatively raised) and that such raising is against the bias of the downward pulling force of gravity.

It is to be appreciated that the provided bias force that biases the bundle spacer 410 toward the rest position would be in opposition to one or more forces that may tend to urge the connectors 416, 418, and electrical lines therein, relatively toward each other. Herein such forces that may tend to urge such movement may be termed "approach-urging" forces in that such forces urge the connectors 416, 418, and electrical lines therein, to approach each other.

In broad terms, the first, second and third arms 412, 414 and 446 between the respective connectors 416, 418 and 448, and the pivot member 426 provide at least parts of an example body 430. It is to be appreciated that the body 430 is interposed between at least the first line connector 416 and the second line connector 418. The body 430 is actuatable to provide a variable distance between the first line connector and the second line connector and the first electrical line and the second electrical line connected thereto. As such the body 430 is a dynamic body and within one aspect provides for a selectable collapse. Thus, the body 430 is actuatable to provide a variable distance between at least the first line connector 416 and the second line connector 418, and, accordingly, the distance between the first electrical line and the second electrical line connected thereto also is variable.

As such, it is to be broadly appreciated within one example aspect, the relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance. It is to be noted that the present disclosure includes the aspect of more than two line connectors for association with more than two electrical lines.

It is to be noted that an event that may be associated with the presence of an approach-urging force is a rare short circuit event. During such an event, an extremely large amount of current will briefly pass through the electrical lines. This high amount of current creates a substantial magnetic field around each electrical line. These magnetic fields cause the electrical lines to be attracted (i.e., approach-urging) towards one another. For some examples, the approach-urging force may exceed 5000 lbs.

It is to be appreciated that if the approach-urging force is greater than the bias force, the first and second arm 412, 414 may move such that the connectors 416, 418, and electrical lines therein, approach each other.

It is to be noted that the amount of movement of the connectors 416, 418, and electrical lines therein, toward each other may be varied and dependent upon various factors, etc. It contemplated that the bundle spacer 410 may be constructed/configured such that the connectors 416, 418, and electrical lines therein, may be permitted to move toward each other and/or the connector 448 of the third arm 446 until touching occurs. It is also contemplated that the bundle spacer 410 may be constructed/configured such that the connectors 416, 418, and electrical lines therein, are stopped and prohibited from touching. For examples in which the touching is prohibited, a final gap space between the connectors 416, 418, and electrical lines therein, at the point of stoppage may have any dimension. Various final gap space dimensions are contemplated. As such variants regarding the permitted movement toward touching and/or stoppage prior to touching are contemplated and within the scope of the present disclosure.

In broad terms, the first, second and third arms 412, 414 and 446 between the respective connectors 416, 418 and 448, and the pivot member 426 provide at least parts of an example body 430. It is to be appreciated that the body 430 is interposed between at least the first line connector 416 and the second line connector 418. Such body 430 is also interposed between the third line connector 448 and the first and second line connectors 416, 418. The body 430 is actuatable to provide a variable distance between the first line connector 416 and the second line connector 418 and the first electrical line and the second electrical line connected thereto. Similarly, a variable distance is to between the third line connector 448 and each of the first and second line connectors 416, 418. As such the body 430 is a dynamic body and within one aspect provides for a selectable collapse. Thus, the body 430 is actuatable to provide a variable distance between at least the first line connector 416 and the second line connector 416, and, accordingly, the distance between the first electrical line and the second electrical line connected thereto also is variable.

It is to be appreciated that the permitted movement of the connectors 416, 418, 448, and electrical lines therein, toward each other may help prevent damage from occurring to the electrical lines. For some examples, the permitted movement may help prevent birdcaging. Of course, other damage may be prevented. It is to be appreciated, after the movement, which may prevent damage, the bundle spacer 410 returns the electrical lines to the distance-spacing associated with the rest position of the bundle spacer.

Figure 14:
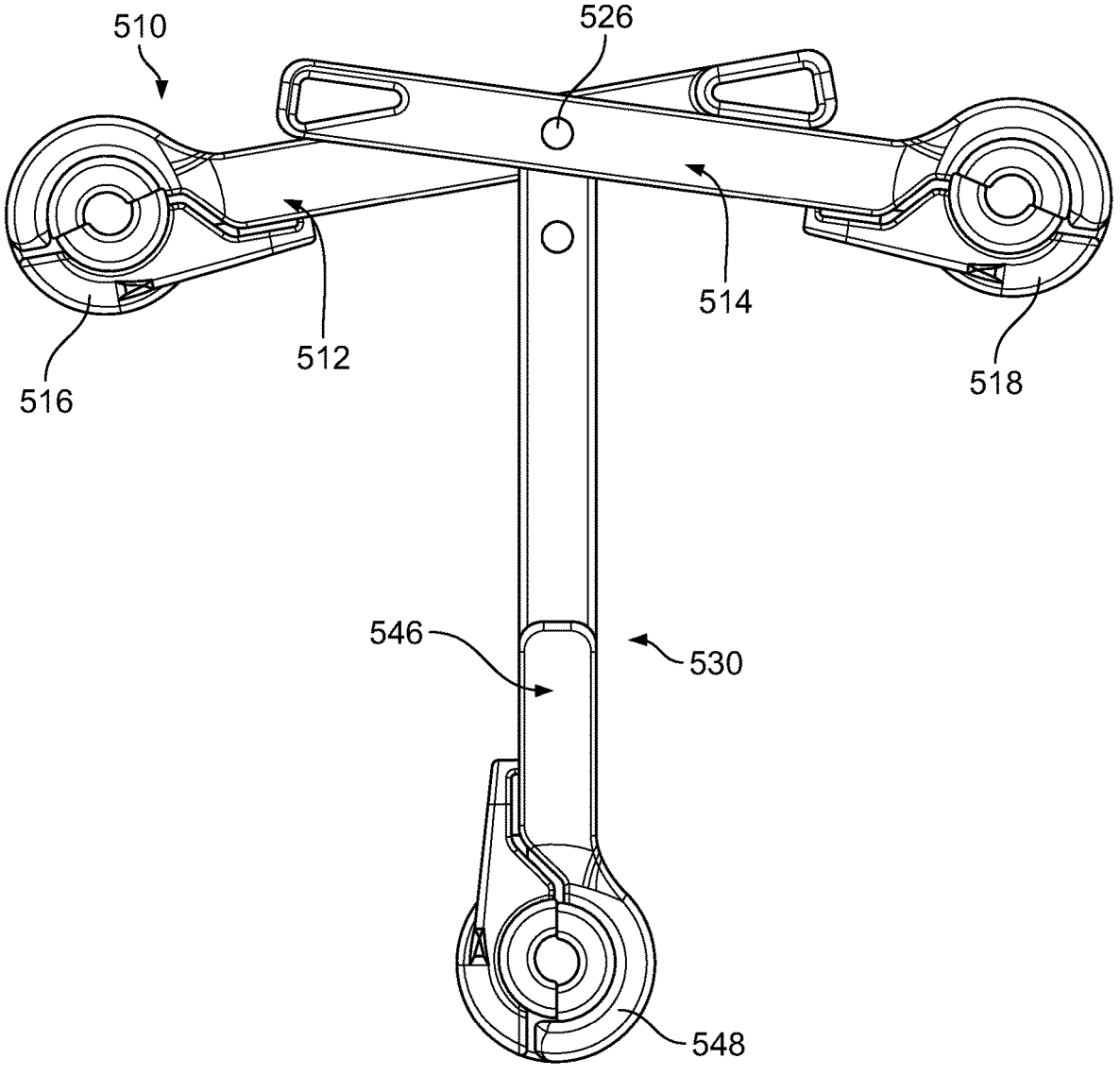
FIG. 14 is a plan view illustration of another example bundle spacer in accordance with at least one aspect of the present disclosure.
Figure 15:
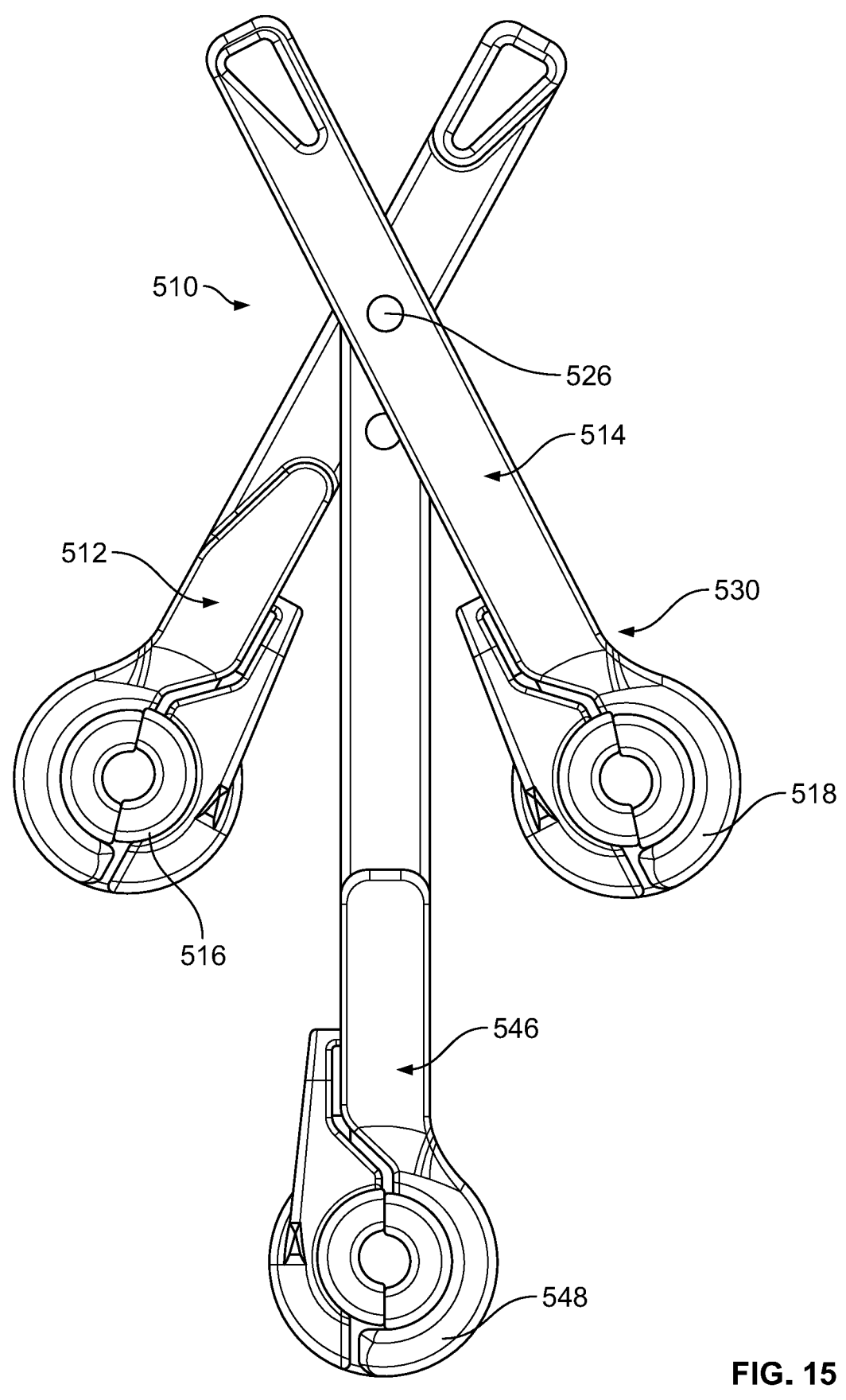
Figure 16:
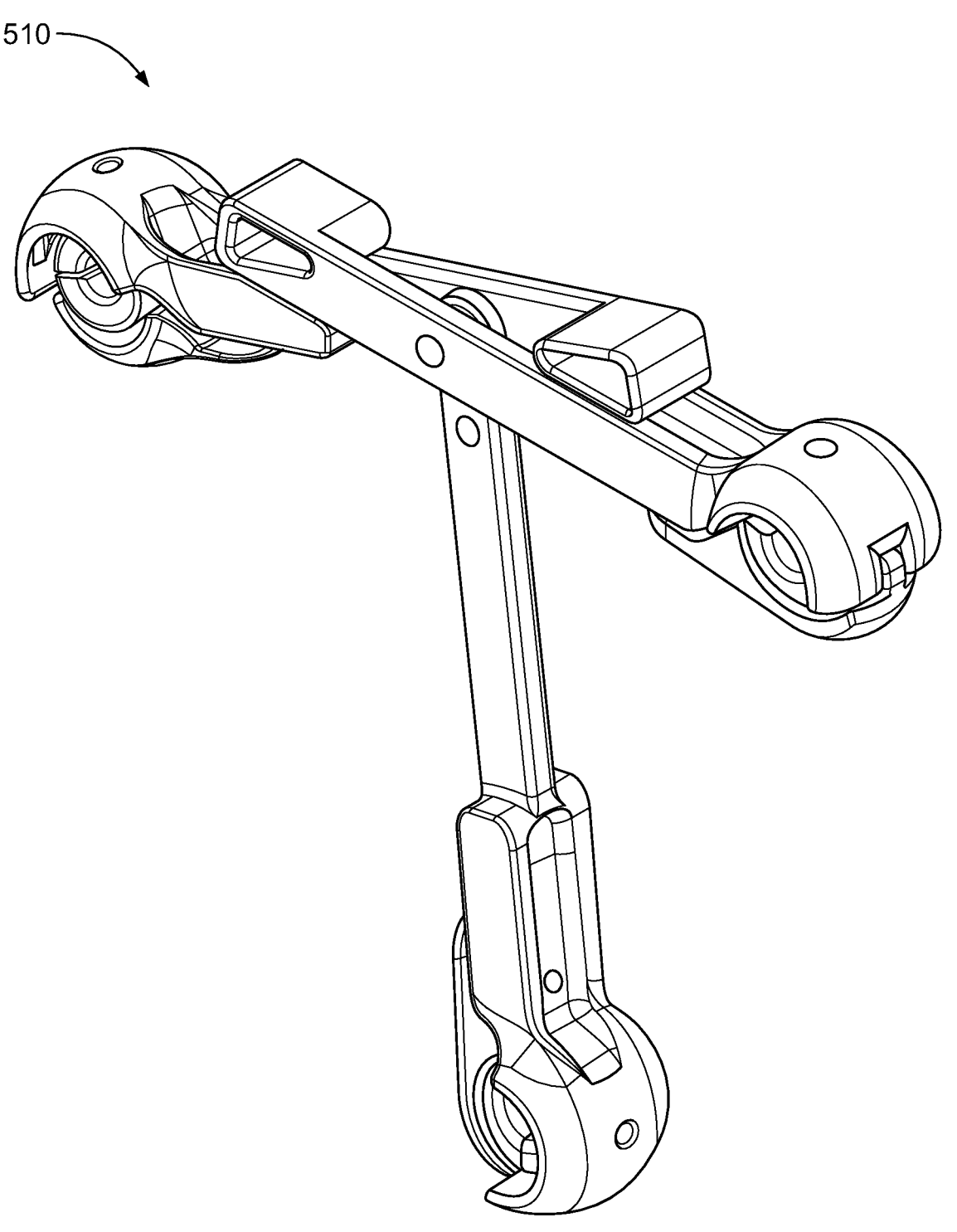
FIG. 16 is a reduced, perspective view of the example bundle spacer of FIG. 14.

FIGS. 14-16 present another example of a bundle spacer 510 for associate within three electrical lines. It is to be noted that the bundle spacer 510 has some similarities to the bundle spacer 410 of FIGS. 12 and 13. Discussions of the similarities presented concerning the bundle spacer 410 of FIGS. 12 and 13 are generally applicable to the bundle spacer 510 (FIGS. 14-16).

The bundle spacer 510 includes first-third arms 512, 514 and 546 that respectively have connectors 516, 518 and 548. The first-third arms 512, 514 and 546 are pivotally connected via a pivot member 526. It is to be noted that the first and second arms 12, 14 have respective lengths that are shorter than a length of the third arm 546.

It is to be appreciated that if the approach-urging force is greater than the bias force, the first and second arm 512, 514 may move such that the connectors 516, 518, and electrical lines therein, approach each other.

It is to be noted that the movement of the connectors 516, 518, and electrical lines therein, toward each other is such that touching is prevented. Note that due to the length of the third arm 546, the connectors 516, 518, and electrical lines therein, are above the connector 548, and electrical line therein. Also, note that respective stop surface 538, 540, located midway along the respective arms, block the connectors 516, 518, and electrical lines therein, from touching each other.

In broad terms, the first, second and third arms 512, 514 and 546 between the respective connectors 516, 518 and 548, and the pivot member 526 provide at least parts of an example body 530. It is to be appreciated that the body 530 is interposed between at least the first line connector 516 and the second line connector 518. Such body 530 is also interposed between the third line connector 548 and the first and second line connectors 516, 518. The body 530 is actuatable to provide a variable distance between the first line connector 516 and the second line connector 518 and the first electrical line and the second electrical line connected thereto. Similarly, a variable distance is to between the third line connector 548 and each of the first and second line connectors 516, 518. As such the body 530 is a dynamic body and within one aspect provides for a selectable collapse. Thus, the body 530 is actuatable to provide a variable distance between at least the first line connector 516 and the second line connector 516, and, accordingly, the distance between the first electrical line and the second electrical line connected thereto also is variable.

As such, it is to be broadly appreciated within one example aspect, the relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance. It is to be noted that the present disclosure includes the aspect of more than two line connectors for association with more than two electrical lines.

It is to be appreciated that the permitted movement of the connectors 516, 518, 548, and electrical lines therein, toward each other may help prevent damage from occurring to the electrical lines. For some examples, the permitted movement may help prevent birdcaging. Of course, other damage may be prevented. It is to be appreciated, after the movement, which may prevent damage, the bundle spacer 510 returns the electrical lines to the distance-spacing associated with the rest position of the bundle spacer.

FIGS. 17 and 18 present another example of a bundle spacer 610 for associate within three electrical lines. It is to be noted that the bundle spacer 610 has some similarities to the bundle spacer 410 of FIGS. 12 and 13 and/or the bundle spacer 510 of FIGS. 14-16. Discussions of the similarities presented concerning the bundle spacer 410 and 510 are generally applicable to the bundle spacer 610 (FIGS. 17 and 18).

The bundle spacer 610 includes first-third arms 612, 614 and 646 that respectively have connectors 616, 618 and 548. It is to be appreciated that portions (e.g., clamp halves) of the connectors 616, 618 and 548 are omitted from the drawing figures. However, it is to be appreciated that complete connectors will retain the respective electrical lines.

The third arm 646 is T-shaped. The first arm 612 is pivotally connected via a pivot member 626A to the third arm 646 at one side of the top of the T shape. The second arm 614 is pivotally connected via a pivot member 626B to the third arm 646 at the other side of the top of the T shape.

It is to be appreciated that if the approach-urging force is greater than the bias force, the first and second arm 612, 614 may move such that the connectors 616, 618, and electrical lines therein, approach each other.

It is to be noted that the movement of the connectors 616, 618 and 648, and electrical lines therein, toward each other is such that touching may occur. However, it is also contemplated that the arms 612, 614 and 648 may be constructed/configured such that touching is prevented.

In broad terms, the first, second and third arms 612, 614 and 646 between the respective connectors 616, 618 and 648, and the pivot member 626 provide at least parts of an example body 630. It is to be appreciated that the body 630 is interposed between at least the first line connector 616 and the second line connector 618. The body 630 is actuatable to provide a variable distance between the first line connector 616 and the second line connector 618 and the first electrical line and the second electrical line connected thereto. As such the body 630 is a dynamic body and within one aspect provides for a selectable collapse. Thus, the body 630 is actuatable to provide a variable distance between at least the first line connector 616 and the second line connector 616, and, accordingly, the distance between the first electrical line and the second electrical line connected thereto also is variable.

As such, it is to be broadly appreciated within one example aspect, the relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance. It is to be noted that the present disclosure includes the aspect of more than two line connectors for association with more than two electrical lines.

It is to be appreciated that the permitted movement of the connectors 616, 618 and 648, and electrical lines therein, toward each other may help prevent damage from occurring to the electrical lines. For some examples, the permitted movement may help prevent birdcaging. Of course, other damage may be prevented. It is to be appreciated, after the movement, which may prevent damage, the bundle spacer 610 returns the electrical lines to the distance-spacing associated with the rest position of the bundle spacer.

Referring to FIGS. 19-21, an example of a bundle spacer 710 is shown. The bundle spacer 710 is for association/connection to two electrical lines and is for maintenance of proper spacing between the lines, but also permits movement of the electrical lines via selective collapse of the bundle spacer 710.

The bundle spacer 710 includes first and second arms 712, 714. Each arm 712, 714 includes a respective connector (i.e., first and second connectors) for attachment to a respective electrical line. It is to be appreciated that within the shown example the arms are truncated (i.e., shown as torn-off) and thus the first and second connectors, while present, are not shown. It is to be appreciated that such truncation may be considered as an indication that the arms may be of varied length. Also, it is to be appreciated that not showing the specifics of the first and second connectors may be considered as an indication that the connectors may have varied construction. Such indications of varied length and/or varied construction are applicable to all of the examples presented within this disclosure.

For completeness of discussion, at the connectors, each respective arm includes structures for attachment to the respective electrical line. Such structures may include clamping and/or gripping components (e.g., pivoted clamp with a tightening bolt), line protective/buffering components (e.g., a resilient grommet), and the like. Examples of such structures for attachment to electrical lines are known and such known structures may be utilized within some of the other bundle spacers disclosed within this disclosure. Of course, other, different to-be-developed structures for attachment to electrical lines may also be utilized. As such, the specifics of the structures for attachment to the respective electrical line need not be specific limitations.

Each of the first and second arms 712, 714 includes a respective distal end portion 732, 734 that is located at the opposite end from the respective connectors. The first and second arms 712, 714 are pivotally connected to each other at the distal end portions 732, 734 via a pivot member 726. The pivot member 726 may be a pin, bolt or similar that permits the first and second arms 712, 714 to pivotally move relative to each other about a pivot axis 728 (FIG. 19) that extends along the length of the pivot member. Note that within FIG. 20, the shown example of the pivot member 726 is a bolt, nut, washer, etc. combination, that is shown removed from the first and second arms 712, 714. Also note that the pivot member 726 is removed and not shown within FIG. 21.

Focusing upon the pivot movement of the first and second arms 712, 714, such pivot movement may be described as an articulating movement of the first and second arms 712, 714. As will be discussed further following, the position of the first and second arms 712, 714 shown within FIG. 19 may be considered to be a rest position for the bundle spacer 710.

It is to be appreciated that contemporaneously with the pivot movement of the first and second arms 712, 714, the electrical lines, to which the connectors are attached, also move. Specifically, in the reference frame of the pivot axis 728 of the pivot member 726, the connectors, and electrical lines therein, move in arcs. It is to be appreciated that the connectors, and electrical lines therein, may be at positions that are relatively spaced away from each other. However, it is to be noted that as the connectors, and electrical lines therein, move (i.e., in arcs about the pivot axis 728 of the pivot member 726), the connectors, and electrical lines therein, may move closer to each other. It is to be noted that simultaneously with the connectors, and electrical lines therein, moving closer to each other, the pivot axis 728 of the pivot member 726 may move relatively higher relative to the connectors, and electrical lines therein.

Focusing upon the distal end portions 732, 734 of the first and second arms 712, 714, the distal end portions 732, 734 are generally enlarged so as to enclose/contain structures, parts and the like as discussed following. Each distal end portion 732, 734 is configured to have a respective hollow, annular recess 750, 752 (FIGS. 20 and 21). The two recesses 750, 752 mate together and generally define a hollow interior to enclose/contain structures, parts and the like. It is to be appreciated that the distal end portions 732, 734 may have structures that inter-fit, nest or the like to help align the distal end portions 732, 734 together, help retain the distal end portions together, and guide movement of the distal end portions. Within the shown example, the structures include respective annular rings 756, 758 that are relatively concentric and nest together.

A spindle shaft 760 is located within the hollow interior and extends between the distal end portions 732, 734. The spindle shaft 760 has a through bore 762 and the pivot member 726 extends therethrough. A helical spring 766 has a plurality of coils that extend in a helical spiral and two ends 768 that extend out, along respective tangential directions, from the helical spiral. The helical spring 766 is located within the hollow interior. Also, the helical spring 766 is located round the spindle shaft 760, with the two ends 768, 770 extending out away from the spindle shaft. Each respective end 768, 770 of the helical spring extends to a respective structure within each distal portion 732, 734.

Within the distal portion 732 of the first arm 712 a hole 774 is provided within the recess 750. A respective one (e.g., 768) of the ends of the helical spring 766 is located into the hole 774. As such, the end 768 of the helical spring 766 is held relative to the distal portion 732 and thus the first arm 712.

Within the distal portion 734 of the second arm 714 a slot 776 is provided within the recess 752. A respective one (e.g., 770) of the ends of the helical spring 766 is located into the slot 776. As such, the end 770 of the helical spring 766 is held relative to the distal portion 734 and thus the second arm 714.

With the ends 768, 770 of the spring 766 respectively held, pivot movement of the two arms 712, 714 causes torsional movement and stress of the spring. Specifically, as the spring 766 is stressed, the spring provides a resistive force. The resistance is against the pivot movement of the first and second arms 712, 714. As pivot movement continues, the resistive force may increase.

Within each recess 750, 752, a respective mechanical stop 780, 782 is provided. Each mechanical stop 780, 782 may be a projection that is within the respective recess 750, 752.

Each mechanical stop (i.e., projection) 780, 782 is radially spaced away from the axis of the bore 762 and the extension of the mechanical stop (i.e., projection) is parallel to the axis. Each mechanical stop (i.e., projection) 780, 782 is located at a respective sector of the space that is within the respective annular recess 750, 752 as referenced from the axis of the bore 762. The mechanical stop (i.e., projection) 780, 782 may abut/engage each other to provide a rotational limit for the first and second arms 712, 714.

In broad terms, the first and second arms 712, 714, and the rest of the shown structures within FIGS. 19-21 between the respective connectors provide at least parts of an example body 730. It is to be appreciated that the body 730 is interposed between at least the first line connector and the second line connector. The body 730 is actuatable to provide a variable distance between the first line connector and the second line connector and the first electrical line and the second electrical line connected thereto. As such the body 730 is a dynamic body and within one aspect provides for a selectable collapse. Thus, the body 730 is actuatable to provide a variable distance between at least the first line connector and the second line connector, and, accordingly, the distance between the first electrical line and the second electrical line connected thereto also is variable.

Recall that the resting condition may be as shown within FIG. 19. Within the rest position, the spring 766 may have little or no stress therein. it is to be appreciated that the spring 766 urges the first and second arms 712, 714, and held electrical lines at respective connectors, outwardly away from each other and thus toward the rest position.

It is to be noted that, upon the occurrence of the connectors, and electrical lines therein, being moved toward each other, the spring 766 is stressed to provide the resistive force. The resistive force provides the outward bias force. As mentioned, the amount of bias force may be varied, and that variance is contemplated and within the scope of the present application.

The provided bias force that biases the bundle spacer 710 toward the rest position would be in opposition to one or more forces that may tend to urge the connectors, and electrical lines therein, relatively toward each other. Herein such forces that may tend to urge such movement may be termed "approach-urging" forces in that such forces urge the connectors, and electrical lines therein, to approach each other.

It is to be noted that the amount of movement of the connectors, and electrical lines therein, toward each other may be varied and dependent upon various factors, etc. It contemplated that the bundle spacer 710 may be constructed/configured such that the connectors, and electrical lines therein, may be permitted to move toward each other until touching occurs. It is also contemplated that the bundle spacer 710 may be constructed/configured such that the connectors, and electrical lines therein, are stopped and prohibited from touching. For examples in which the touching is prohibited, a final gap space between the connectors, and electrical lines therein, at the point of stoppage may have any dimension. Various final gap space dimensions are contemplated. As such variants regarding the permitted movement toward touching and/or stoppage prior to touching are contemplated and within the scope of the present disclosure.

As such, it is to be broadly appreciated within one example aspect, the relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance.

It is to be appreciated that the permitted movement of the connectors, and electrical lines therein, toward each other may help prevent damage from occurring to the electrical lines. For some examples, the permitted movement may help prevent birdcaging. Of course, other damage may be prevented. It is to be appreciated, after the movement, which may prevent damage, the bundle spacer 710 returns the electrical lines to the distance-spacing associated with the rest position of the bundle spacer.

Referring to FIGS. 22-25, an example of a bundle spacer 810 is shown. The bundle spacer 810 is for association/connection to two electrical lines and is for maintenance of proper spacing between the lines, but also permits movement of the electrical lines via selective collapse of the bundle spacer 810.

The bundle spacer 810 includes first and second arms 812, 814, and a center member 816. Each arm 812, 814 includes a respective connector (i.e., first and second connectors) for attachment to a respective electrical line. It is to be appreciated that within the shown example the arms 812, 814 are truncated (i.e., shown as torn-off) and thus the first and second connectors, while present, are not shown. It is to be appreciated that such truncation may be considered as an indication that the arms may be of varied length. Also, it is to be appreciated that not showing the specifics of the first and second connectors may be considered as an indication that the connectors may have varied construction. Such indications of varied length and/or varied construction are applicable to all of the examples presented within this disclosure.

For completeness of discussion, at the connectors, each respective arm includes structures for attachment to the respective electrical line. Such structures may include clamping and/or gripping components (e.g., pivoted clamp with a tightening bolt), line protective/buffering components (e.g., a resilient grommet), and the like. Examples of such structures for attachment to electrical lines are known and such known structures may be utilized within some of the other bundle spacers disclosed within this disclosure. Of course, other, different to-be-developed structures for attachment to electrical lines may also be utilized. As such, the specifics of the structures for attachment to the respective electrical line need not be specific limitations.

Each of the first and second arms 812, 814 includes a respective distal end portion 832, 834 that is located at the opposite end from the respective connectors. The first and second arms 812, 814 are each pivotally connected to the center member 816 via a respective pivot member 826, 828. Each pivot member 826, 828 may be a pin, bolt or similar that permits the first and second arms 812, 814 to pivotally move relative to the center member 816 about a respective pivot axis 830, 831 (FIG. 24) that extends along the length of the respective pivot member. Note that within the shown examples of the pivot members 826, 828 are a bolt, nut, washer, etc. combination. Also note that the bolt, nut, washer combination is shown disassembled within FIG. 25.

Focusing upon the respective pivot movements of the first and second arms 812, 814, such pivot movements may be described as an articulating movement of the first and second arms 812, 814. As will be discussed further following, the position of the first and second arms 812, 814 shown within FIG. 22 may be considered to be a rest position for the bundle spacer 810.

It is to be appreciated that contemporaneously with the pivot movements of the first and second arms 812, 814, the electrical lines, to which the connectors are attached, also move. Specifically, in the reference frame of each respective pivot axis 830, 831, the respective connectors, and electrical lines therein, move in arcs. It is to be appreciated that the connectors, and electrical lines therein, may be at positions that are relatively spaced away from each other. However, it is to be noted that as the connectors, and electrical lines therein, move (i.e., in an arc about the respective pivot axis 830, 831), the connectors, and electrical lines therein, may move closer to each other. It is to be noted that simultaneously with the connectors, and electrical lines therein, moving closer to each other, center member 816 may move relatively higher relative to the connectors, and electrical lines therein.

Focusing upon the distal end portions 832, 834 of the first and second arms 812, 814, the distal end portions are generally enlarged so as to enclose/contain structures, parts and the like as discussed following. Each distal end portion 832, 834 is configured to have a respective hollow area 850, 852 (FIGS. 23 and 25).

It is to be appreciated that within the shown example, the distal end portions 832, 834 are similar and as such, only the distal end portion 832 of the first arm 812 is discussed. It is to be appreciated that the discussion is applicable to the distal end portion 834 of the second arm 814.

As shown within FIG. 25, the hollow area 850 extends completely through the distal end portion 832. An interior surface that bounds the hollow area is shaped to have three lobes 862. Three resiliently compressive members 864 are located within the hollow area 850 and are also at least partially located within the three lobes 862. Optionally, the distal end portion 832 may include a partial retainer to help hold the respective compressive member 864 in place within the hollow area 850 and the respective lobe 862.

Each compressive member 864 has a generally cylindrical shape and may be considered a roller. Each compressive member 864 is made of materials that permits the compressive member to be resiliently compressed in response to applied force. Within some examples the material is a rubber material, an elastomeric material, or similar.

At a respective end of the center member 816, the center member also includes a hollow area 870, with the hollow area having three respective lobes 872. Three compressive members 874 are located within the hollow area 870 and also located at least partially within the three respective lobes 872. The compressive members 874 are generally the same as the compressive members 864.

Two end plates 878, 880 are associated with the first arm 812 and the center member 816. Specifically, the end plates 878, 880 are to cover the hollow areas 850, 870 of the first arm 812 and the center member 816. The end plates 878, 880 are located axially along the axis 831. When the respective pivot member (e.g., bolt) 826 is tight/secure, the endplates 878, 880 retain the first arm 812 and the center member 816 together and also retain the portions that are within the hollow areas 850, 870. Within the shown example, the endplates 878, 880 include lobes that correspond to the lobes and/or compressive members 864, 874 to help retain the compressive members. It is to be recalled that the second arm 814 and the respective, other end of the center member 816 have similar constrictions/portions. As such, endplates 882, 884 are shown and identified, with an understanding that the above discussions are applicable.

A twist member 886 is located within the hollow areas 850, 870 and located adjacent to, and in engagement with, the compressive members 864, 874. The twist member includes a plurality of fingers 888 that bear upon and compress the compressive members 864, 874 during relative rotation of the twist member 886 relative to the first arm 812 and/or the center member 816. Specifically, there are six finger 888. One finger 888 is associated with each of the six compressive members 864, 874. Moreover, it is to be recalled that there are three compressive members 864 within the hollow area 850, and there are three compressive members 874 within the hollow area 870. In other words, two groups of three each. During relative rotation, each finger squeezes, and elastically compresses, the respective compressive member.

It is to be appreciated that the configuration and arrangement of the fingers 888 on the twist member 886 may be varied. With the shown example, the group of three fingers 888 that are within the hollow area 850 are rotationally offset from the group of three fingers 888 that are within the hollow area 870.

With the shown example, the endplates 882, 884 each have recesses 890 that mate with projections 892 on the twist member 886. The projections 892 within the recesses 890 provide a keyed rotational locking. As such, the endplates 882, 884 are key-locked to rotate with the twist member 886. Of course, such may be varied.

Again, all of such portions, etc. are similarly provided for the second arm 814 and associated portion of the center member 816.

In broad terms, the first and second arms 812, 814, and the rest of the shown structures within FIGS. 22-25 between the respective connectors provide at least parts of an example body 896. It is to be appreciated that the body 896 is interposed between at least the first line connector and the second line connector. The body 896 is actuatable to provide a variable distance between the first line connector and the second line connector and the first electrical line and the second electrical line connected thereto. As such the body 896 is a dynamic body and within one aspect provides for a selectable collapse. Thus, the body 896 is actuatable to provide a variable distance between at least the first line connector and the second line connector, and, accordingly, the distance between the first electrical line and the second electrical line connected thereto also is variable.

Recall that the resting condition may be as shown within FIG. 23. Within the rest position, the compressive members 864, 874 may have little or no compression applied thereto. it is to be appreciated that the compressive members 864, 874 urge the first and second arms 812, 814, and held electrical lines at respective connectors, outwardly away from each other and thus toward the rest position.

It is to be noted that, upon the occurrence of the connectors, and electrical lines therein, being moved toward each other, the compressive members 864, 874 are elastically compressed to provide the resistive force. The resistive force provides the outward bias force. As mentioned, the amount of bias force may be varied, and that variance is contemplated and within the scope of the present application.

The provided bias force that biases the bundle spacer 810 toward the rest position would be in opposition to one or more forces that may tend to urge the connectors, and electrical lines therein, relatively toward each other. Herein such forces that may tend to urge such movement may be termed "approach-urging" forces in that such forces urge the connectors, and electrical lines therein, to approach each other.

As such, it is to be broadly appreciated within one example aspect, the relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance. It is to be noted that the present disclosure includes the aspect of more than two line connectors for association with more than two electrical lines.

It is to be noted that the amount of movement of the connectors, and electrical lines therein, toward each other may be varied and dependent upon various factors, etc. It contemplated that the bundle spacer 810 may be constructed/configured such that the connectors, and electrical lines therein, may be permitted to move toward each other until touching occurs. It is also contemplated that the bundle spacer 810 may be constructed/configured such that the connectors, and electrical lines therein, are stopped and prohibited from touching. For examples in which the touching is prohibited, a final gap space between the connectors, and electrical lines therein, at the point of stoppage may have any dimension. Various final gap space dimensions are contemplated. As such variants regarding the permitted movement toward touching and/or stoppage prior to touching are contemplated and within the scope of the present disclosure.

It is to be appreciated that the permitted movement of the connectors, and electrical lines therein, toward each other may help prevent damage from occurring to the electrical lines. For some examples, the permitted movement may help prevent birdcaging. Of course, other damage may be prevented. It is to be appreciated, after the movement, which may prevent damage, the bundle spacer 810 returns the electrical lines to the distance-spacing associated with the rest position of the bundle spacer.

It is to be appreciated that the present disclosure presents a broad array of examples and that the scope of the present disclosure is to be appreciated as being broad. As further examples of the broad scope, it is to be appreciated that the various structures, functions, aspects, etc. that are within the various presented exampled may be cross-exchanged or similar.

FIGS. 26-29 show an example bundle spacer 910 that includes at least an aspect from the examples shown with FIGS. 12-18 and includes at least an aspect from the example shown with FIGS. 22-25. Specifically, it is to be recalled that the examples shown with FIGS. 12-18 have three arms for engagement with three respective electrical lines. The bundle spacer 910 of FIGS. 26-29 includes three arms, with each arm engaging with one of three respective electrical lines.

Also, it is to be appreciated that the example shown with FIGS. 22-25 includes two arms that pivotally move relative to a central member. The bundle spacer 910 of FIGS. 26-29 includes two arms that pivotally move relative to a central arm.

Further, it is to be appreciated that the example shown with FIGS. 22-25 includes resiliently compressive members. The bundle spacer 910 of FIGS. 26-29 includes resiliently compressive members.

Focusing upon the bundle spacer 910 of FIGS. 26-29, the spacer is for association/connection to three electrical lines and is for maintenance of proper spacing between the lines, but also permits movement of the electrical lines. The bundle spacer 910 includes first, second and third arms 912, 914 and 916. Each arm 912, 914 and 916 includes a respective connector 922, 924 and 926 for attachment to a respective electrical line.

As will be appreciated, the connectors 922, 924 and 926 each includes structures for attachment to the respective electrical line. Such structures may include clamping and/or gripping components (e.g., pivoted clamp with a tightening bolt), line protective/buffering components (e.g., a resilient grommet), and the like. It is to be appreciated that FIGS. may not show all of the structures of the connectors 922, 924 and 926. Examples of such structures for attachment to electrical lines are known and such known structures may be utilized within the bundle spacer 910. Of course, other, different to-be-developed structures for attachment to electrical lines may also be utilized within the bundle spacer 410. As such, the specifics of the structures for attachment to the respective electrical line need not be specific limitations.

The third arm 916 is T-shaped. The first and second arms 912, 914 are each pivotally connected, via a respective pivot member 932, 934 to the third arm 916 at one side of the top of the T shape. At each pivot connection, there is configuration to resist pivoting via the use of resiliently compressive members similar to the example of FIGS. 22-25. Specifically, FIG. 29 shows end plates 978, 980, 982 and 984, resiliently compressive members 964, 974 (i.e., four sets of three within each set), associated twist members 986 that each have three fingers 988 that bear upon and compress the compressive members 964, 974 during relative rotation of the twist member 986 relative to the first, second and third arms 912, 914 and 916. During relative rotation, each finger 988 of the respective twist member 986 squeezes, and elastically compresses, the respective compressive members 964, 974.

In broad terms, the first, second and third arms 912, 914 and 916 between the respective connectors 922, 924 and 926, and the other shown structures provide at least parts of an example body 930. The body 930 is actuatable to provide a variable distance between the first line connector 922 and the second line connector 924 and the first electrical line and the second electrical line connected thereto. Such actuation and variable distances are also to be appreciated regarding the third electrical line. As such the body 930 is a dynamic body and within one aspect provides for a selectable collapse. Thus, the body 930 is actuatable to provide a variable distance between at least the first line connector 922 and the second line connector 924, and, accordingly, the distance between the first electrical line and the second electrical line connected thereto also is variable. Again, such is also applicable regarding the third line connector 926.

As such, it is to be broadly appreciated within one example aspect, the relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance. It is to be noted that the present disclosure includes the aspect of more than two line connectors for association with more than two electrical lines.

It is to be appreciated that the permitted movement of the connectors 922, 924, 926, and electrical lines therein, toward each other may help prevent damage from occurring to the electrical lines. For some examples, the permitted movement may help prevent birdcaging. Of course, other damage may be prevented. It is to be appreciated, after the movement, which may prevent damage, the bundle spacer 910 returns the electrical lines to the distance-spacing associated with the rest position of the bundle spacer.

FIGS. 30-37 show an example bundle spacer 1010 that includes at least an aspect from the examples shown with FIGS. 12-18, includes at least an aspect from the example shown with FIGS. 22-25 and includes at least an aspect from the example shown with FIGS. 19-21. Specifically, it is to be recalled that the examples shown with FIGS. 12-18 have three arms for engagement with three respective electrical lines. The bundle spacer 1010 of FIGS. 30-37 includes three arms, with each arm engaging with one of three respective electrical lines.

Also, it is to be appreciated that the example shown with FIGS. 22-25 includes two arms that pivotally move relative to a central member. The bundle spacer 1010 of FIGS. 30-37 includes two arms that pivotally move relative to a central arm.

Further, it is to be appreciated that the example shown with FIGS. 19-21 includes a helical spring. The bundle spacer 1010 of FIGS. 30-37 includes two of such helical springs.

Focusing upon the bundle spacer 1010 of FIGS. 30-37, the spacer is for association/connection to three electrical lines and is for maintenance of proper spacing between the lines, but also permits movement of the electrical lines. The bundle spacer 1010 includes first, second and third arms 1012, 1014 and 1016. Each arm 1012, 1014 and 1016 includes a respective connector 1022, 1024 and 1026 for attachment to a respective electrical line. As will be appreciated, the connectors 1022, 1024 and 1026 each includes structures for attachment to the respective electrical line. Such structures may include clamping and/or gripping components (e.g., pivoted clamp with a tightening bolt), line protective/buffering components (e.g., a resilient grommet), and the like. Examples of such structures for attachment to electrical lines are known and such known structures may be utilized within the bundle spacer 1010. Of course, other, different to-be-developed structures for attachment to electrical lines may also be utilized within the bundle spacer 1010. As such, the specifics of the structures for attachment to the respective electrical line need not be specific limitations.

A single pivot member 1030 extends through all three of the arms 1012, 1014 and 1016. Recall that the example of FIGS. 19-21 utilized enlarged distal ends (i.e., distal from the connection to the respective wires) of each arm to enclose a helical biasing spring. Such allowed for relative pivoting about the pivot member of the example of FIGS. 19-21.

As mentioned, the bundle spacer 1010 of FIGS. 30-37 has three arms 1012, 1014 and 1016, and the single pivot member 1030 extending there through. The third arm 1016 may be considered to be a center arm. Thus, it may be considered that there may be relative pivoting between the first arm 1012 and the third, center arm 1016. Also, it may be considered that there may be relative pivoting between the second arm 1014 and the third, center arm 1016. To provide for such relative pivoting, structure that is similar to the structure at/within the enlarged distal ends of the example of FIGS. 19-21 is utilized within bundle spacer 1010 of FIGS. 30-37.

Specifically, interposed between the first arm 1012 and the third arm 1016 is a set of two, relatively rotatable housings 1032, 1034, with each housing providing an interior recess 1050, 1052 (FIG. 35). The two recesses 1050, 1052 mate together and generally define a hollow interior to enclose/contain structures, parts and the like. It is to be appreciated that the housings 1050, 1052 may have structures that inter-fit, nest or the like to help align the housings together, help retain the housings together, and guide rotational movement of the housings. Within the shown example, the structures include respective annular rings 1056, 1058 (FIGS. 36 and 37) that are relatively concentric and nest together.

A spindle shaft 1060 is located within the hollow interior and extends between the two housings 1032, 1034. The spindle shaft 1060 has a through bore 1062 and the pivot member 1030 extends therethrough. A helical spring 1066 has a plurality of coils that extend in a helical spiral and two ends 1068, 1070 that extend out, along respective tangential directions, from the helical spiral. The helical spring 1066 is located within the hollow interior. Also, the helical spring 1066 is located around the spindle shaft 1060, with the two ends 1068, 1070 extending out away from the spindle shaft. Each respective end 1068, 1070 of the helical spring extends to a respective structure within each housing 1032, 1034.

Within each housing 1032, 1034 a respective slot 1074, 1076 is provided. A respective one (e.g., 1068) of the ends of the helical spring 1066 is located into each slot. As such, the two ends 1068, 1070 of the helical spring 1066 are respectively held.

With the ends 1068, 1070 of the spring 1066 respectively held, relative pivot movement between the first and third arms 1012, 1016 causes torsional movement and stress of the spring. Specifically, as the spring 1066 is stressed, the spring provides a resistive force. The resistance is against the pivot movement of the first and third arms 1012, 1016. As pivot movement continues, the resistive force may increase.

A similar arrangement of two housings 1032, 1034 (see FIGS. 30-33), helical spring and spindle are interposed between the second and this arms and functions similarly to permit pivot movement, but also resist movement via the spring. It is to be appreciated that plural housings 1032, 1034 may be attached/connected to the first, second and third arms 1012, 1014, 1016 and/or to each other via any of various attachment/connection arrangements. For example, within the shown example bundle spacer 1010, the first and second arms 1012, 1014, fit into a recess on a face of a respective housings 1032. The pivot member 1030 is a bolt arrangement that functions to retain the first and second arms 1012, 1014 into the recesses. As a further example, a plurality of fasteners (e.g., bolts) hold the two housings 1034 together, with the third arm 1016 trapped therebetween within recesses on faces of the two housings 1034. Some of such fasteners may even pass through the third arm 1016.

It is to be noted that, upon the occurrence of the connectors, and electrical lines therein, being moved toward each other, each spring 1066 is stressed to provide the resistive force. The resistive force provides the outward bias force. As mentioned, the amount of bias force may be varied, and that variance is contemplated and within the scope of the present application.

The provided bias force that biases the bundle spacer 1010 toward the rest position would be in opposition to one or more forces that may tend to urge the connectors, and electrical lines therein, relatively toward each other. Herein such forces that may tend to urge such movement may be termed "approach-urging" forces in that such forces urge the connectors, and electrical lines therein, to approach each other.

In broad terms, the first, second and third arms 1012, 1014 and 1016 between the respective connectors 1022, 1024 and 1026, and the other shown structures provide at least parts of an example body 1080. The body 1080 is actuatable to provide a variable distance between the first line connector 1022 and the second line connector 1024 and the first electrical line and the second electrical line connected thereto. Such actuation and variable distances are also to be appreciated regarding the third electrical line. As such the body 1080 is a dynamic body and within one aspect provides for a selectable collapse. Thus, the body 1080 is actuatable to provide a variable distance between at least the first line connector 1022 and the second line connector 1024, and, accordingly, the distance between the first electrical line and the second electrical line connected thereto also is variable. Again, such is also applicable regarding the third line connector 1026.

As such, it is to be broadly appreciated within one example aspect, the relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance. It is to be noted that the present disclosure includes the aspect of more than two line connectors for association with more than two electrical lines.

It is to be appreciated that the permitted movement of the connectors 1022, 1024, 1026, and electrical lines therein, toward each other may help prevent damage from occurring to the electrical lines. For some examples, the permitted movement may help prevent birdcaging. Of course, other damage may be prevented. It is to be appreciated, after the movement, which may prevent damage, the bundle spacer 1010 returns the electrical lines to the distance-spacing associated with the rest position of the bundle spacer.

It is to be noted that the amount of movement of the connectors, and electrical lines therein, toward each other may be varied and dependent upon various factors, etc. It contemplated that the bundle spacer 1010 may be constructed/configured such that the connectors, and electrical lines therein, may be permitted to move toward each other until touching occurs. It is also contemplated that the bundle spacer 1010 may be constructed/configured such that the connectors, and electrical lines therein, are stopped and prohibited from touching. For examples in which the touching is prohibited, a final gap space between the connectors, and electrical lines therein, at the point of stoppage may have any dimension. Various final gap space dimensions are contemplated. As such variants regarding the permitted movement toward touching and/or stoppage prior to touching are contemplated and within the scope of the present disclosure.

Again, it is to be appreciated that the present disclosure presents a broad array of examples and that the scope of the present disclosure is to be appreciated as being broad. As further examples of the broad scope, it is to be appreciated that the various structures, functions, aspects, etc. that are within the various presented exampled may be cross-exchanged or similar.

FIGS. 38-42 show an example bundle spacer 1110 that includes at least some aspects from the example shown with FIGS. 26-29. Specifically, it is to be recalled that the example shown with FIGS. 26-29 have three arms for engagement with three respective electrical lines. The bundle spacer 1110 of FIGS. 38-42 includes three arms, with each arm engaging with one of three respective electrical lines.

Also, it is to be appreciated that the example shown with FIGS. 26-29 includes resiliently compressive members. The bundle spacer 1110 of FIGS. 38-42 includes resiliently compressive members.

Focusing upon the bundle spacer 1110 of FIGS. 38-42, the spacer is for association/connection to three electrical lines and is for maintenance of proper spacing between the lines, but also permits movement of the electrical lines. The bundle spacer 1110 includes first, second and third arms 1112, 1114 and 1116. Each arm 1112, 1114 and 1116 includes a respective connector 1122, 1124 and 1126 for attachment to a respective electrical line. As will be appreciated, the connector 1122, 1124 and 1126 each includes structures for attachment to the respective electrical line. Such structures may include clamping and/or gripping components (e.g., pivoted clamp with a tightening bolt), line protective/buffering components (e.g., a resilient grommet), and the like. Examples of such structures for attachment to electrical lines are known and such known structures may be utilized within the bundle spacer 1110. Of course, other, different to-be-developed structures for attachment to electrical lines may also be utilized within the bundle spacer 1110. As such, the specifics of the structures for attachment to the respective electrical line need not be specific limitations.

The third arm 1116 may be T-shaped. Alternatively, the third arm 1116 may be provided as a two-piece constriction, with a second member 1118 providing the top of the "T" shape. For a two-piece construction, fasteners (e.g., bolts) connect the two pieces.

The first and second arms 1112, 1114 are each pivotally connected, via a respective pivot member 1132, 1134 to the third arm 1116 at one side of the top of the T shape. At each pivot connection, there is configuration to resist pivoting via the use of resiliently compressive members similar to the example of FIGS. 22-25. Specifically, FIGS. 41 and 42 shows end plates 1178, 1180, 1182 and 1184, resiliently compressive members 1164, 1174 (i.e., four sets of three within each set), associated twist members 1186 that each have fingers 1188 that bear upon and compress the compressive members 1164, 1174 during relative rotation of the twist member 1186 relative to the first, second and third arms 1112, 1114 and 1116. During relative rotation, each finger 1188 of the respective twist member 1186 squeezes, and elastically compresses, the respective compressive members 1164, 1174.

In broad terms, the first, second and third arms 1112, 1114 and 1116 between the respective connectors 1122, 1124 and 1126, and the other shown structures provide at least parts of an example body 11900. The body 1190 is actuatable to provide a variable distance between the first line connector 1122 and the second line connector 1124 and the first electrical line and the second electrical line connected thereto. Such actuation and variable distances are also to be appreciated regarding the third electrical line. As such the body 1190 is a dynamic body and within one aspect provides for a selectable collapse. Thus, the body 1190 is actuatable to provide a variable distance between at least the first line connector 1122 and the second line connector 1124, and, accordingly, the distance between the first electrical line and the second electrical line connected thereto also is variable. Again, such is also applicable regarding the third line connector 1126.

As such, it is to be broadly appreciated within one example aspect, the relative movement between the first arm and the second arm does not occur such that the first electrical line is separated from the second electrical line by a first distance when the bias force is greater than a second force. Relative movement between the first arm and the second arm does occur such that the first electrical line is separated from the second electrical line by a second distance when the bias force is less than the second force. The first distance is greater than the second distance. It is to be noted that the present disclosure includes the aspect of more than two line connectors for association with more than two electrical lines.

It is to be appreciated that the permitted movement of the connectors 1122, 1124, 1126, and electrical lines therein, toward each other may help prevent damage from occurring to the electrical lines. For some examples, the permitted movement may help prevent birdcaging. Of course, other damage may be prevented. It is to be appreciated, after the movement, which may prevent damage, the bundle spacer 1110 returns the electrical lines to the distance-spacing associated with the rest position of the bundle spacer.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A bundle spacer comprising:
a first line connector to be connected to a first electrical line;
a second line connector to be connected to a second electrical line;
a body interposed between the first line connector and the second line connector, the body being actuatable to provide a variable distance between the first line connector and the second line connector and the first electrical line and the second electrical line connected thereto; and
a bias device coupled to the body, wherein:
the bias device exerts a first force in a first direction on a first portion of the body coupled to the first line connector;
the bias device exerts a second force in a second direction on a second portion of the body coupled to the second line connector;
the first direction is different than the second direction;
the body is in an unactuated state when a third force less than the first force is exerted on the first portion of the body in a third direction opposite the first direction and a fourth force less than the second force is exerted on the second portion of the body in a fourth direction opposite the second direction;
the body is in an actuated state when at least one of third force is greater than the first force or the fourth force is greater than the second force;
the first electrical line is separated from the second electrical line by a first distance when the body is in the unactuated state;
the first electrical line is separated from the second electrical line by a second distance when the body is in the actuated state; and
the first distance is greater than the second distance.
2. The bundle spacer claimed within claim 1, wherein the third force is a function of an electrical current in at least one of the first electrical line or the second electrical line.
3. The bundle spacer claimed within claim 1, wherein the fourth force is a function of an electrical current in at least one of the first electrical line or the second electrical line.
4. The bundle spacer claimed within claim 1, wherein the third force and the fourth force are a function of an electrical current in at least one of the first electrical line or the second electrical line.

5. The bundle spacer claimed within claim 1, wherein at least one of the third force or the fourth force is a function of an electrical current in at the first electrical line and the second electrical line.
6. The bundle spacer claimed within claim 1, wherein the body comprises:
a first arm coupled to the first line connector.
7. The bundle spacer claimed within claim 6, wherein the body comprises:
a second arm coupled to the second line connector.
8. The bundle spacer claimed within claim 1, wherein at least one of the first line connector or the second line connector is at least partially annular.
9. The bundle spacer claimed within claim 1, wherein the bias device comprises a resilient member that biases the first arm and the second arm toward a rest position whereby the body is in an unactuated state.
10. The bundle spacer claimed within claim 9, wherein the resilient member is compressed during relative movement between a first arm and a second arm to provide the variable distance.
11. The bundle spacer claimed within claim 1, wherein the first line has a first circular cross-sectional shape and the first line connector is at least partially annual to correspond to the first cross-sectional shape.
12. The bundle spacer claimed within claim 11, wherein the second line has a second circular cross-sectional shape and the second line connector is at least partially annual to correspond to the second cross-sectional shape.
13. The bundle spacer claimed within claim 7, comprising a third line connector to be connected to a third electrical line.
14. The bundle spacer claimed within claim 13, wherein the body comprises a third arm coupled to the third line connector.
15. The bundle spacer claimed within claim 14, wherein:
the first arm has a first length;
the second arm has a second length;
the third arm has a third length; and
the third length is different than at least one of the first length or the second length.
16. A bundle spacer comprising:
a first arm to be connected to a first electrical line; and
a second arm to be connected to a second electrical line, wherein:
the first arm and the second arm are movable relative to each other to provide a variable distance between the first electrical line and the second electrical line;
the first arm and the second arm are slidably connected to each other to provide the variable distance; and
the first arm telescopes into the second arm.
17. The bundle spacer claimed within claim 16, comprising a bias device coupled to at least one of the first arm or the second arm to facilitate the variable distance.
18. The bundle spacer claimed within claim 16, wherein the first line has a first circular cross-sectional shape and at least some of the first arm is at least partially annual to correspond to the first cross-sectional shape.
19. The bundle spacer claimed within claim 18, wherein the second line has a second circular cross-sectional shape and at least some of the second arm is at least partially annual to correspond to the second cross-sectional shape.
20. A bundle spacer comprising:
a first arm to be connected to a first electrical line;
a second arm to be connected to a second electrical line, wherein the first arm and the second arm are movable relative to each other, and a bias device that exerts a bias force on at least one of the first arm or the second arm, wherein:

relative movement between the first arm and the second arm does not occur such that the first electrical line is separated from the second electrical line by a first distance when the bias force is greater than a second force;

relative movement between the first arm and the second arm does occur such that the first electrical line is separated from the second electrical line by a second distance when the bias force is less than the second force; and the first distance is greater than the second distance.

\* \* \* \* \*